(12) United States Patent
Luo et al.

(10) Patent No.: US 12,459,941 B2
(45) Date of Patent: Nov. 4, 2025

(54) TRICYCLIC IRAK INHIBITORS

(71) Applicant: Rigel Pharmaceuticals, Inc., South San Francisco, CA (US)

(72) Inventors: Zhushou Luo, South San Francisco, CA (US); Simon Shaw, South San Francisco, CA (US); Ihab Darwish, South San Francisco, CA (US); Esteban Masuda, South San Francisco, CA (US); Chrystelle Lamagna, South San Francisco, CA (US)

(73) Assignee: Rigel Pharmaceuticals, Inc., South San Francisco, CA (US)

( * ) Notice: Subject to any disclaimer, the term of this patent is extended or adjusted under 35 U.S.C. 154(b) by 56 days.

(21) Appl. No.: 18/192,813

(22) Filed: Mar. 30, 2023

(65) Prior Publication Data
US 2023/0312568 A1    Oct. 5, 2023

Related U.S. Application Data

(60) Provisional application No. 63/325,957, filed on Mar. 31, 2022.

(51) Int. Cl.
*C07D 471/04* (2006.01)
*C07F 7/08* (2006.01)
(52) U.S. Cl.
CPC .......... *C07D 471/04* (2013.01); *C07F 7/0812* (2013.01)
(58) Field of Classification Search
CPC .......... A61P 31/04; A61P 31/12; A61P 35/00; C07D 471/04; C07F 7/0812
See application file for complete search history.

(56) References Cited

FOREIGN PATENT DOCUMENTS

| WO | WO2015150995 A1 | 8/2015 |
|---|---|---|
| WO | WO2017025849 A1 | 2/2017 |
| WO | WO2019089422 A1 | 5/2019 |
| WO | WO2020264490 A1 | 12/2020 |
| WO | WO2021011724 A1 | 1/2021 |

*Primary Examiner* — Jeffrey H Murray
*Assistant Examiner* — Daniel John Burkett
(74) *Attorney, Agent, or Firm* — Jones Day

(57) ABSTRACT

Disclosed embodiments concern compounds according to Formula I

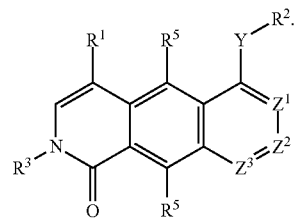

Formula I

In some embodiments, the compounds are useful as kinase inhibitors, such as interleukin receptor associated kinases (IRAK) inhibitors. Also disclosed are compositions comprising such inhibitors, and methods of making and using the compounds and compositions. The disclosed compounds and/or compositions may be used to treat or prevent a kinase-associated disease or condition, particularly an IRAK-associated disease or condition.

13 Claims, No Drawings

TRICYCLIC IRAK INHIBITORS

CROSS REFERENCE TO RELATED APPLICATION

This application claims the benefit of the earlier filing date of U.S. provisional patent application No. 63/325,957, filed Mar. 31, 2022, which is incorporated herein by reference in its entirety.

FIELD

This disclosure concerns compounds, and embodiments of a method for making and using the compounds, such as for inhibiting kinases, particularly interleukin receptor-associated kinase (IRAK), and for treating diseases and conditions related to IRAK.

BACKGROUND

Interleukin-1 receptor-associated kinases (IRAKs) are important mediators of signaling processes, such as toll-like receptors (TLR) and interleukin-1 receptor (IL-1R) signaling processes. IRAKs have been implicated in modulating signaling networks that control inflammation, apoptosis, and cellular differentiation. Four IRAK genes have been identified in the human genome (IRAK1, IRAK2, IRAK3 and IRAK4), and studies have revealed distinct, non-redundant biological roles. IRAK1 and IRAK4 have been shown to exhibit kinase activity.

SUMMARY

Disclosed herein are embodiments of a compound having a structure according to Formula I

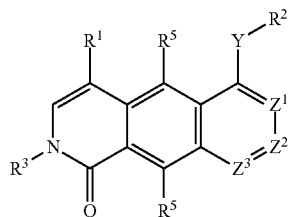

Formula I

With respect to Formula I, Y is $O(CR^dR^d)_n$ or $N(R^4)(CR^dR^d)_n$, and in some embodiments, Y is —OCH$_2$—. n is 1, 2, 3 or 4. $Z^1$, $Z^2$ and $Z^3$ are selected from $CR^5$ and N, wherein at least one of $Z^1$, $Z^2$ and $Z^3$ is N. $R^1$ is H, halo, cyano, —SO$_2$alkyl, N$_3$, Si(C$_{1-6}$alkyl)$_3$, heterocycloalkyl, heteroaryl, or $R^a$. $R^2$ is aryl, heteroaryl, cycloalkyl or heterocycloalkyl. Each of $R^3$ and $R^4$ independently is H or $R^a$, and in some embodiments, $R^3$ is H. Each $R^5$ independently is H, alkyl, halo, cyano, —OR$^d$, —SR$^d$, or —NR$^cR^c$, and in some embodiments, each $R^5$ is H.

Also with respect to the formula, each $R^a$ is independently selected from C$_{1-6}$ alkyl, C$_{2-6}$ alkenyl, C$_{2-6}$ alkynyl, C$_{1-6}$haloalkyl, aralkyl, or C$_{3-8}$ cycloalkyl, and may be optionally substituted with 1, 2, or 3 $R^b$. Each $R^b$ is independently selected from OH, —OR$^a$, halo, oxo, —NR$^cR^c$, —C(O)OR$^d$, —C(O)NR$^cR^c$, —N(R$^d$)C(O)OR$^a$, or —N(R$^d$)C(O)NR$^cR^c$. Each $R^c$ is independently selected from R$^d$ or two R$^c$, together with the nitrogen atom to which they are attached, form a C$_{2-8}$ heterocyclyl optionally having one or two additional heteroatoms selected from O and NR$^d$ and optionally substituted with one or more of the same or different $R^a$ or $R^b$. And each $R^d$ is independently selected from hydrogen and C$_{1-6}$ alkyl.

In some embodiments of Formula I, the compound has a structure according to Formula II or Formula III

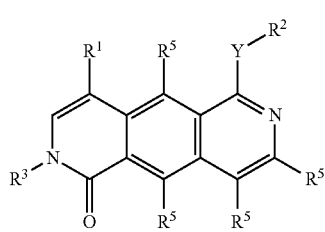

Formula II

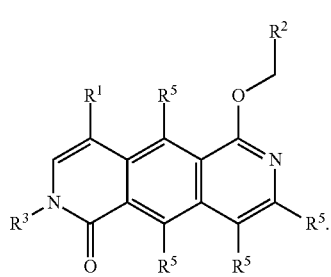

Formula III

In some embodiments of Formulas I, II, and III, $R^1$ is $R^a$, and may be C$_{1-6}$alkyl optionally substituted with 1, 2 or 3 $R^b$.

In any embodiments of Formulas I, II and III, $R^2$ may be five or six-membered heterocycloalkyl, such as pyrrolidinyl, piperidinyl, piperazinyl or morpholinyl. In some embodiments, $R^2$ is

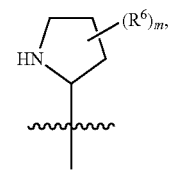

where m is 0, 1, 2, or 3, and each $R^6$ independently is $R^a$ or $R^b$. And in certain embodiments, $R^2$ is

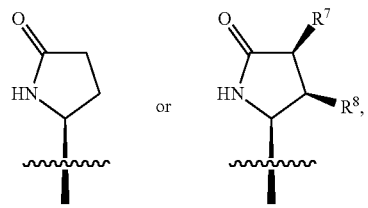

and each of $R^7$ and $R^8$ independently is halo or C$_{1-6}$alkyl.

In some embodiments, the compound has a structure according to Formula IV-B, IV-C, or IV-D

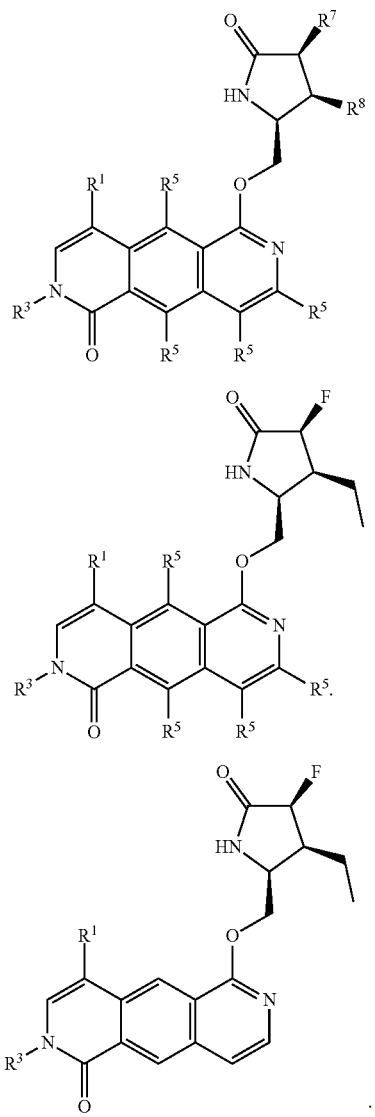

In any embodiments, the compound may selectively inhibit IRAK4.

In any embodiments, the compound may be in the form of a pharmaceutically acceptable salt.

Also disclosed herein is a pharmaceutical composition comprising a compound disclosed herein, and a pharmaceutically acceptable excipient.

A method for inhibiting an IRAK enzyme is disclosed herein. The method may comprise contacting the enzyme with an effective amount of a compound disclosed herein. In some embodiments, contacting the enzyme comprises administering the compound to a subject.

Also disclosed herein is a method for treating a subject for a disease or condition wherein an IRAK inhibitor is indicated. The method may comprise administering to the subject an effective amount of a compound disclosed herein, or a pharmaceutical composition thereof. The disease or condition may comprise an auto-immune disease, inflammatory disorder, cardiovascular disease, neurodegenerative disorder, allergic disorder, multi-organ failure, kidney disease, platelet aggregation, a hyperproliferative disorder, transplantation, sperm motility, erythrocyte deficiency, graft rejection, lung injury, respiratory disease, ischemic condition, bacterial infection, viral infection, immune regulatory disorder or a combination thereof. In some embodiments, the disease or condition comprises aplastic anemia, atopic dermatitis, pustular psoriasis, palmoplantar pustulosis, primary biliary cirrhosis, pyoderma, sclerosing cholangitis, systemic juvenile idiopathic arthritis, hidradenitis suppurativa, cytokine release syndrome, or myelodysplastic syndromes (MDS).

In some embodiments, the disease or condition comprises a lymphoid neoplasm. The lymphoid neoplasm may be selected from myeloproliferative neoplasms (MPN) excluding polycythemia vera, myeloid/lymphoid neoplasms with PDGFRA rearrangement, myeloid/lymphoid neoplasms with PDGFRB rearrangement, myeloid/lymphoid neoplasms with FGFR1 rearrangement, myeloid/lymphoid neoplasms with PCM1-JAK2, myelodysplastic/myeloproliferative neoplasms (MDS/MPN), myeloid sarcoma, myeloid proliferations related to Down syndrome, blastic plasmacytoid dendritic cell neoplasm, B-lymphoblastic leukemia/lymphoma; and/or T-lymphoblastic leukemia/lymphoma. In some embodiments, the lymphoid neoplasm is a myeloproliferative neoplasm selected from chronic myeloid leukemia (CML), chronic neutrophilic leukemia (CNL), primary myelofibrosis (PMF), essential thrombocythemia, chronic eosinophilic leukemia, or a combination thereof. in certain embodiments, the lymphoid neoplasm is chronic myeloid leukemia.

In any embodiments, the method may further comprise identifying the subject having from the lymphoid neoplasm. In certain embodiments, the lymphoid neoplasm is chronic myelomonocytic leukemia and identifying the subject comprises identifying a subject having a persistent peripheral blood monocytosis of $\geq 1 \times 10^9$/L and monocytes accounting for $\geq 10\%$ of the white blood cell (WBC) differential count, and rearrangements in the PDGFRA, PDGFRB or FGFR1 genes and the PCM1-JAK2 fusion gene are not observed.

The foregoing and other objects, features, and advantages of the technology will become more apparent from the following detailed description.

DETAILED DESCRIPTION

I. Definitions

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference in their entirety, unless otherwise specified.

Unless otherwise indicated, all numbers expressing quantities of components, molecular weights, percentages, temperatures, times, and so forth, as used in the specification or claims, are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is expressly recited.

Unless explained otherwise, all technical and scientific terms used herein have the same meaning as commonly understood by one of ordinary skill in the art to which this disclosure pertains. Although methods and materials similar or equivalent to those described herein can be used in the practice or testing of the present disclosure, suitable methods and materials are described below. The materials, methods, and examples are illustrative only and not intended to be limiting.

When chemical structures are depicted or described, unless explicitly stated otherwise, all carbons are assumed to include implicit hydrogens such that each carbon conforms to a valence of four. For example, in the structure on the left-hand side of the schematic below there are nine hydrogen atoms implied. The nine hydrogen atoms are depicted in the right-hand structure.

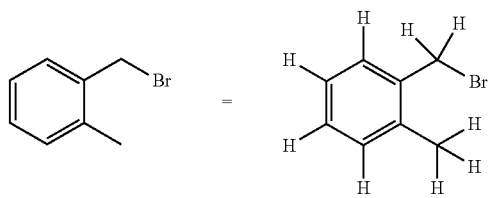

Sometimes a particular atom in a structure is described in textual formula as having a hydrogen or hydrogen atoms, for example —CH$_2$CH$_2$—. It will be understood by a person of ordinary skill in the art that the aforementioned descriptive techniques are common in the chemical arts to provide brevity and simplicity to description of organic structures.

If a group R is depicted as "floating" on a ring system, as for example in the group:

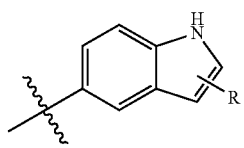

then, unless otherwise defined, a substituent R can reside on any atom of the fused bicyclic ring system, so long as a stable structure is formed that conforms to standard valence conditions as understood by a person of ordinary skill in the art. In the example depicted, the R group can reside on an atom in either the 5-membered or the 6-membered ring of the indolyl ring system, including the heteroatom by replacing the explicitly recited hydrogen, but excluding the atom carrying the bond with the "⌇" symbol and the bridging carbon atoms.

When there are more than one such depicted "floating" groups, as for example in the formulae:

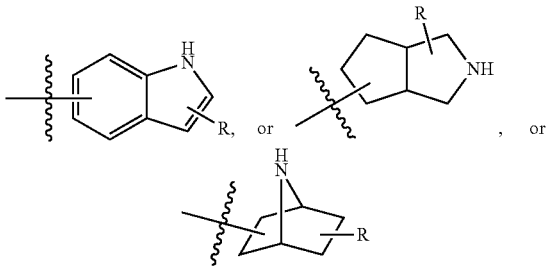

where there are two groups, namely, the R and the bond indicating attachment to a parent structure; then, unless otherwise defined, each "floating" group can reside on any atoms of the ring system, again assuming each replaces a depicted, implied, or expressly defined hydrogen on the ring system and a chemically stable compound would be formed by such an arrangement.

When a group R is depicted as existing on a ring system containing saturated carbons, for example as in the formula:

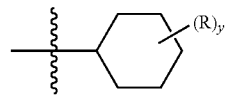

where, in this example, y can be more than one, and assuming each R replaces a currently depicted, implied, or expressly defined hydrogen on the ring; then, unless otherwise defined, two R's can reside on the same carbon. A simple example is when R is a methyl group. The depicted structure can exist as a geminal dimethyl on a carbon of the depicted ring (an "annular" carbon). In another example, two R's on the same carbon, including that same carbon, can form a ring, thus creating a spirocyclic ring (a "spirocyclyl" group) structure. For example, shown below two Rs can form a piperidine ring in a spirocyclic arrangement with the cyclohexane, as

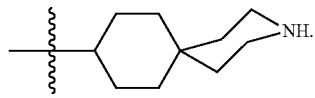 [SMILES: *C1CCC2(CCNCC2)CC1]

As used herein, the term "substituted" refers to all subsequent modifiers in a term, for example in the term "substituted arylC$_{1-8}$alkyl," substitution may occur on the "C$_{1-8}$alkyl" portion, the "aryl" portion or both portions of the arylC$_{1-8}$alkyl group.

"Substituted," when used to modify a specified group or moiety, means that at least one, and perhaps two or more, hydrogen atoms of the specified group or moiety is independently replaced with the same or different substituent groups as defined below. In a particular embodiment, a group, moiety or substituent may be substituted or unsubstituted, unless expressly defined as either "unsubstituted" or "substituted." Accordingly, any of the groups specified herein may be unsubstituted or substituted. In particular embodiments, the substituent may or may not be expressly defined as substituted, but is still contemplated to be optionally substituted. For example, an "alkyl" or a "pyrazolyl" moiety may be unsubstituted or substituted, but an "unsubstituted alkyl" or an "unsubstituted pyrazolyl" is not substituted.

"Substituents" or "substituent groups" for substituting for one or more hydrogen atoms on saturated carbon atoms in the specified group or moiety are, unless otherwise specified, —$R^{60}$, halo, =O, —$OR^{70}$, —$SR^{70}$, —$N(R^{80})_2$, haloalkyl, perhaloalkyl, —CN, —$NO_2$, =$N_2$, —$N_3$, —$SO_2R^{70}$, —$SO_3^-M^+$, —$SO_3R^{70}$, —$OSO_2R^{70}$, —$OSO_3^-M^+$, —$OSO_3R^{70}$, —$P(O)(O^-)_2(M^+)_2$, —$P(O)(O^-)_2M^{2+}$, —$P(O)(OR^{70})O^-M^+$, —$P(O)(OR^{70})_2$, —$C(O)R^{70}$, —$C(S)R^{70}$, —$C(NR^{70})R^{70}$, —$CO_2^-M^+$, —$CO_2R^{70}$, —$C(S)OR^{70}$, —$C(O)N(R^{80})_2$, —$C(NR^{70})(R^{80})_2$, —$OC(O)R^{70}$, —$OC(S)R^{70}$, —$OCO_2^-M^+$, —$OCO_2R^{70}$, —$OC(S)OR^{70}$, —$NR^{70}C(O)R^{70}$, —$NR^{70}C(S)R^{70}$, —$NR^{70}CO_2^-M^+$, —$NR^{70}CO_2R^{70}$, —$NR^{70}C(S)OR^{70}$, —$NR^{70}C(O)N(R^{80})_2$, —$NR^{70}C(NR^{70})R^{70}$ or —$NR^{70}C(NR^{70})N(R^{80})_2$, where $R^{60}$ is $C_{1-10}$aliphatic, heteroaliphatic, or cycloaliphatic, typically, $C_{1-6}$aliphatic, more typically $C_{1-6}$alkyl, where $R^{60}$ optionally may be substituted; each $R^{70}$ is independently for each occurrence hydrogen or $R^{60}$; each $R^{80}$ is independently for each occurrence $R^{70}$ or alternatively, two $R^{80}$ groups, taken together with the nitrogen atom to which they are attached, form a 3- to 7-membered heterocycloaliphatic, which optionally includes from 1 to 4 of the same or different additional heteroatoms selected from O, N and S, of which N optionally has $R^{70}$ substitution, such as H or $C_1$-$C_3$alkyl substitution; and each $M^+$ is a counter ion with a net single positive charge. Each $M^+$ is independently for each occurrence, for example, an alkali metal ion, such as $K^+$, $Na^+$, $Li^+$; an ammonium ion, such as $^+N(R^{70})_4$; a protonated amino acid ion, such as a lysine ion, or an arginine ion; or an alkaline metal earth ion, such as $[Ca^{2+}]_{0.5}$, $[Mg^{2+}]_{0.5}$, or $[Ba^{2+}]_{0.5}$ (a subscript "0.5" means, for example, that one of the counter ions for such divalent alkali earth ions can be an ionized form of a compound of the present disclosure and the other is a typical counter ion such as chloride, or two ionized compounds can serve as counter ions for such divalent alkali earth ions, or alternatively, a doubly ionized compound can serve as the counter ion for such divalent alkali earth ions). As specific examples, —$N(R^{80})_2$ includes —$NH_2$, —NH-alkyl, —NH-pyrrolidin-3-yl, N-pyrrolidinyl, N-piperazinyl, 4N-methyl-piperazin-1-yl, N-morpholinyl and the like. Any two hydrogen atoms on a single carbon also can be replaced with, for example, =O, =$NR^{70}$, =N—$OR^{70}$, =$N_2$ or =S.

Substituent groups for replacing hydrogen atoms on unsaturated carbon atoms in groups containing unsaturated carbons are, unless otherwise specified, —$R^{60}$, halo, —$O^-M^+$, —$OR^{70}$, —$SR^{70}$, —$S^-M^+$, —$N(R^{80})_2$, perhaloalkyl, —CN, —OCN, —SCN, —NO, —$NO_2$, —$N_3$, —$SO_2R^{70}$, —$SO_3^-M^+$, —$SO_3R^{70}$, —$OSO_2R^{70}$, —$OSO_3^-M^+$, —$OSO_3R^{70}$, —$PO_3^{-2}(M^+)_2$, —$PO_3^{-2}M^{2+}$, —$P(O)(OR^{70})O^-M^+$, —$P(O)(OR^{70})_2$, —$C(O)R^{70}$, —$C(S)R^{70}$, —$C(NR^{70})R^{70}$, —$CO_2^-M^+$, —$CO_2R^{70}$, —$C(S)OR^{70}$, —$C(O)NR^8OR^{80}$, —$C(NR^{70})N(R^{70})_2$, —$OC(O)R^{70}$, —$OC(S)R^{70}$, —$OCO_2^-M^+$, —$OCO_2R^{70}$, —$OC(S)OR^{70}$, —$NR^{70}C(O)R^{70}$, —$NR^{70}C(S)R^{70}$, —$NR^{70}CO_2^-M^+$, —$NR^{70}CO_2R^{70}$, —$NR^{70}C(S)OR^{70}$, —$NR^{70}C(O)N(R^{80})_2$, —$NR^{70}C(NR^{70})R^{70}$ or —$NR^{70}C(NR^{70})N(R^{80})_2$, where $R^{60}$, $R^{70}$, $R^{80}$ and $M^+$ are as previously defined, provided that in case of substituted alkene or alkyne, the substituents are not —$O^-M^+$, —$OR^{70}$, —$SR^{70}$, or —$S^-M^+$.

Substituent groups for replacing hydrogen atoms on nitrogen atoms in groups containing such nitrogen atoms are, unless otherwise specified, —$R^{60}$, —$O^-M^+$, —$OR^{70}$, —$SR^{70}$, —$S^-M^+$, —$N(R^{80})_2$, perhaloalkyl, —CN, —NO, —$NO_2$, —$S(O)_2R^{70}$, —$SO_3^-M^+$, —$SO_3R^{70}$, —$OS(O)_2R^{70}$, —$OSO_3^-M^+$, —$OSO_3R^{70}$, —$PO_3^{2-}(M^+)_2$, —$PO_3^{2-}M^{2+}$, —$P(O)(OR^{70})O^-M^+$, —$P(O)(OR^{70})(OR^{70})$, —$C(O)R^{70}$, —$C(S)R^{70}$, —$C(NR^{70})R^{70}$, —$CO_2R^{70}$, —C(S) $OR^{70}$, —$C(O)NR^{80}R^{80}$, —$C(NR^{70})NR^{80}R^{80}$, —$OC(O)R^{70}$, —$OC(S)R^{70}$, —$OCO_2R^{70}$, —$OC(S)OR^{70}$, —$NR^{70}C(O)R^{70}$, —$NR^{70}C(S)R^{70}$, —$NR^{70}CO_2R^{70}$, —$NR^{70}C(S)OR^{70}$, —$NR^{70}C(O)N(R^{70})_2$, —$NR^{70}C(NR^{70})R^{70}$ or —$NR^{70}C(NR^{70})N(R^{80})_2$, where $R^{60}$, $R^{70}$, $R^{80}$ and $M^+$ are as previously defined.

In one embodiment, a group that is substituted has at least one substituent up to the number of substituents possible for a particular moiety, such as 1 substituent, 2 substituents, 3 substituents, or 4 substituents.

Additionally, in embodiments where a group or moiety is substituted with a substituted substituent, the nesting of such substituted substituents is limited to three, thereby preventing the formation of polymers. Thus, in a group or moiety comprising a first group that is a substituent on a second group that is itself a substituent on a third group, which is attached to the parent structure, the first (outermost) group can only be substituted with unsubstituted substituents. For example, in a group comprising -(aryl-1)-(aryl-2)-(aryl-3), aryl-3 can only be substituted with substituents that are not themselves substituted.

Any group or moiety defined herein can be connected to any other portion of a disclosed structure, such as a parent or core structure, as would be understood by a person of ordinary skill in the art, such as by considering valence rules, comparison to exemplary species, and/or considering functionality, unless the connectivity of the group or moiety to the other portion of the structure is expressly stated, or is implied by context.

"Aliphatic" refers to a substantially hydrocarbon-based group or moiety. An aliphatic group or moiety can be acyclic, including alkyl, alkenyl, or alkynyl groups, cyclic versions thereof, such as cycloaliphatic groups or moieties including cycloalkyl, cycloalkenyl or cycloalkynyl, and further including straight- and branched-chain arrangements, and all stereo and position isomers as well. Unless expressly stated otherwise, an aliphatic group contains from one to twenty-five carbon atoms ($C_{1-25}$); for example, from one to fifteen ($C_{1-15}$), from one to ten ($C_{1-10}$), from one to six ($C_{1-6}$), or from one to four carbon atoms ($C_{1-4}$) for an acyclic alkyl group or moiety; from two to twenty-five carbon atoms ($C_{2-25}$); for example, from two to fifteen ($C_{2-15}$), from two to ten ($C_{2-10}$), from two to six ($C_{2-6}$), or from two to four carbon atoms ($C_{2-4}$) for an acyclic alkenyl or alkynyl group or moiety; or from three to fifteen ($C_{3-15}$) from three to ten ($C_{3-10}$), from three to six ($C_{3-6}$), or from three to four ($C_{3-4}$) carbon atoms for a cycloaliphatic group or moiety, such as cycloalkyl, cycloalkenyl or cycloalkynyl. An aliphatic group may be substituted or unsubstituted, unless expressly referred to as an "unsubstituted aliphatic" or a "substituted aliphatic." An aliphatic group can be substituted with one or more substituents (up to two substituents for each methylene carbon in an aliphatic chain, or up to one substituent for each carbon of a —C=C— double bond in an aliphatic chain, or up to one substituent for a carbon of a terminal methine group).

"Alkyl" refers to a saturated aliphatic hydrocarbyl group having from 1 to 25 ($C_{1-25}$) or more carbon atoms, more typically 1 to 10 ($C_{1-10}$) carbon atoms such as 1 to 6 ($C_{1-6}$) carbon atoms or 1 to 4 ($C_{1-4}$) carbon atoms. An alkyl moiety may be substituted or unsubstituted. This term includes, by way of example, linear and branched hydrocarbyl groups such as methyl (—CH$_3$), ethyl (—CH$_2$CH$_3$), n-propyl (—CH$_2$CH$_2$CH$_3$), isopropyl (—CH(CH$_3$)$_2$), n-butyl (—CH$_2$—CH$_2$CH$_2$CH$_3$), isobutyl (—CH$_2$CH$_2$(CH$_3$)$_2$), sec-butyl (—CH(CH$_3$)(CH$_2$CH$_3$), t-butyl (—C(CH$_3$)$_3$), n-pentyl (—CH$_2$CH$_2$CH$_2$CH$_2$CH$_3$), and neopentyl (—CH$_2$C(CH$_3$)$_3$).

"Araliphatic" refers to an aryl group attached to the parent via an aliphatic moiety. Araliphatic includes aralkyl or arylalkyl groups such as benzyl and phenylethyl.

"Cyano" refers to the group —CN.

"Cycloaliphatic" refers to a cyclic aliphatic group having a single ring (e.g., cyclohexyl), or multiple rings, such as in a fused, bridged or spirocyclic system, at least one of which is aliphatic. Typically, the point of attachment to the parent structure is through an aliphatic portion of the multiple ring system. Cycloaliphatic includes saturated and unsaturated systems, including cycloalkyl, cycloalkenyl and cycloalkynyl. A cycloaliphatic group may contain from three to twenty-five carbon atoms; for example, from three to fifteen, from three to ten, or from three to six carbon atoms. Unless otherwise stated, a cycloaliphatic group may be substituted or unsubstituted. Exemplary cycloaliphatic groups include, but are not limited to, cyclopropyl, cyclobutyl, cyclopentyl, cyclohexyl, cycloheptyl, cyclopentenyl, or cyclohexenyl.

"Halo," "halide" or "halogen" refers to fluoro, chloro, bromo or iodo.

"Heteroaryl" refers to an aromatic group or moiety of, unless specified otherwise, from 5 to 15 ring atoms comprising at least one carbon atom and at least one heteroatom, such as N, S, O, P, or Si. A heteroaryl group or moiety may comprise a single ring (e.g., pyridinyl, pyrimidinyl or pyrazolyl) or multiple condensed rings (e.g., indolyl, benzopyrazolyl, or pyrazolopyridinyl). Heteroaryl groups or moiety may be, for example, monocyclic, bicyclic, tricyclic or tetracyclic. Unless otherwise stated, a heteroaryl group or moiety may be substituted or unsubstituted.

"Haloalkyl" refers to an alkyl moiety substituted with one or more halogens. Exemplary haloalkyl moieties include —CH$_2$F, —CHF$_2$ and —CF$_3$.

"Heterocycloalkyl," refer to a stable three- to fifteen-membered non-aromatic ring moiety comprising at least one carbon atom, and typically plural carbon atoms, and at least one, such as from one to five, heteroatoms. The heteroatom(s) may be nitrogen, phosphorus, oxygen, silicon or sulfur atom(s). The heterocycloalkyl moiety may be a monocyclic moiety, or may comprise multiple rings, such as in a bicyclic or tricyclic ring system, provided that at least one of the rings contains a heteroatom. Such a multiple ring moiety can include fused or bridged ring systems as well as spirocyclic systems; and any nitrogen, phosphorus, carbon, silicon or sulfur atoms in the heterocycloalkyl moiety can be optionally oxidized to various oxidation states, unless expressly excluded or excluded by context. For convenience, nitrogens, particularly, but not exclusively, those defined as annular aromatic nitrogens, are meant to include their corresponding N-oxide form, although not explicitly defined as such in a particular example. In addition, annular nitrogen atoms can be optionally quaternized. Examples of heterocycloalkyl groups include, but are not limited to, tetrahydroisoquinolyl, piperidinyl, piperazinyl, 2-oxopiperazinyl, 2-oxopiperidinyl, pyrrolidinyl, 4-piperidonyl, dihydropyridinyl, tetrahydropyridinyl, morpholinyl, diazabicycloheptane, diazapane, diazepine, tetrahydrofuryl, and tetrahydropyranyl, "Heterocyclyl" refer to both aromatic and non-aromatic ring systems comprising at least one carbon atom, and typically plural carbon atoms, and at least one, such as from one to five, heteroatoms. Specifically, heterocyclyl refers to both heteroaryl and heterocycloalkyl moieties as defined herein.

"Oxo" refers to oxygen connected by a double bond (=O).

"Patient" or "Subject" refers to mammals and other animals, particularly humans. Thus disclosed methods are applicable to both human therapy and veterinary applications.

"Pharmaceutically acceptable excipient" refers to a substance, other than the active ingredient, that is included in a formulation of the active ingredient. As used herein, an excipient may be incorporated within particles of a pharmaceutical composition, or it may be physically mixed with particles of a pharmaceutical composition. An excipient can be used, for example, to dilute an active agent and/or to modify properties of a pharmaceutical composition. Excipients can include, but are not limited to, antiadherents, binders, coatings, enteric coatings, disintegrants, flavorings, sweeteners, colorants, lubricants, glidants, sorbents, preservatives, adjuvants, carriers or vehicles. Excipients may be starches and modified starches, cellulose and cellulose derivatives, saccharides and their derivatives such as disaccharides, polysaccharides and sugar alcohols, protein, synthetic polymers, crosslinked polymers, antioxidants, amino acids or preservatives. Exemplary excipients include, but are not limited to, magnesium stearate, stearic acid, vegetable stearin, sucrose, lactose, starches, hydroxypropyl cellulose, hydroxypropyl methylcellulose, xylitol, sorbitol, maltitol, gelatin, polyvinylpyrrolidone (PVP), polyethyleneglycol (PEG), tocopheryl polyethylene glycol 1000 succinate (also known as vitamin E TPGS, or TPGS), carboxy methyl cellulose, dipalmitoyl phosphatidyl choline (DPPC), vitamin A, vitamin E, vitamin C, retinyl palmitate, selenium, cysteine, methionine, citric acid, sodium citrate, methyl paraben, propyl paraben, sugar, silica, talc, magnesium carbonate, sodium starch glycolate, tartrazine, aspartame, benzalkonium chloride, sesame oil, propyl gallate, sodium metabisulphite or lanolin.

An "adjuvant" is an excipient that modifies the effect of other agents, typically the active ingredient. Adjuvants are often pharmacological and/or immunological agents. An adjuvant may modify the effect of an active ingredient by increasing an immune response. An adjuvant may also act as a stabilizing agent for a formulation. Exemplary adjuvants include, but are not limited to, aluminum hydroxide, alum, aluminum phosphate, killed bacteria, squalene, detergents, cytokines, paraffin oil, and combination adjuvants, such as Freund's complete adjuvant or Freund's incomplete adjuvant.

"Pharmaceutically acceptable carrier" refers to an excipient that is a carrier or vehicle, such as a suspension aid, solubilizing aid, or aerosolization aid. *Remington: The Science and Practice of Pharmacy*, The University of the Sciences in Philadelphia, Editor, Lippincott, Williams, & Wilkins, Philadelphia, PA, 21$^{st}$ Edition (2005), incorporated herein by reference, describes exemplary compositions and formulations suitable for pharmaceutical delivery of one or more therapeutic compositions and additional pharmaceutical agents.

In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. In some examples, the pharmaceutically acceptable carrier may be sterile to be suitable for administration to a subject (for example, by parenteral, intramuscular, or subcutaneous injection). In addition to biologically-neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate.

"Pharmaceutically acceptable salt" refers to pharmaceutically acceptable salts of a compound that are derived from a variety of organic and inorganic counter ions as will be known to a person of ordinary skill in the art and include, by way of example only, sodium, potassium, calcium, magnesium, ammonium, tetraalkylammonium, and the like; and when the molecule contains a basic functionality, salts of organic or inorganic acids, such as hydrochloride, hydrobromide, tartrate, mesylate, acetate, maleate, oxalate, and the like. "Pharmaceutically acceptable acid addition salts" are a subset of "pharmaceutically acceptable salts" that retain the biological effectiveness of the free bases while formed by acid partners. In particular, the disclosed compounds form salts with a variety of pharmaceutically acceptable acids, including, without limitation, inorganic acids such as hydrochloric acid, hydrobromic acid, sulfuric acid, nitric acid, phosphoric acid, and the like, as well as organic acids such as formic acid, acetic acid, trifluoroacetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, benzene sulfonic acid, isethionic acid, methanesulfonic acid, ethanesulfonic acid, p-toluenesulfonic acid, salicylic acid, xinafoic acid and the like. "Pharmaceutically acceptable base addition salts" are a subset of "pharmaceutically acceptable salts" that are derived from inorganic bases such as sodium, potassium, lithium, ammonium, calcium, magnesium, iron, zinc, copper, manganese, aluminum salts and the like. Exemplary salts are the ammonium, potassium, sodium, calcium, and magnesium salts. Salts derived from pharmaceutically acceptable organic bases include, but are not limited to, salts of primary, secondary, and tertiary amines, substituted amines including naturally occurring substituted amines, cyclic amines and basic ion exchange resins, such as isopropylamine, trimethylamine, diethylamine, triethylamine, tripropylamine, tris(hydroxymethyl)aminomethane (Tris), ethanolamine, 2-dimethylaminoethanol, 2-diethylaminoethanol, dicyclohexylamine, lysine, arginine, histidine, caffeine, procaine, hydrabamine, choline, betaine, ethylenediamine, glucosamine, methylglucamine, theobromine, purines, piperazine, piperidine, N-ethylpiperidine, polyamine resins, and the like. Exemplary organic bases are isopropylamine, diethylamine, tris(hydroxymethyl)aminomethane (Tris), ethanolamine, trimethylamine, dicyclohexylamine, choline, and caffeine. (See, for example, S. M. Berge, et al., "Pharmaceutical Salts," J. Pharm. Sci., 1977; 66:1-19 which is incorporated herein by reference.) In particular disclosed embodiments, the compounds may be a formate, trifluoroactate, hydrochloride or sodium salt.

"Effective amount" with respect to a compound or composition refer to an amount of the compound or composition sufficient to achieve a particular desired result, such as to inhibit a protein or enzyme, particularly an interleukin-1 receptor-associated kinase; to elicit a desired biological or medical response in a tissue, system, subject or patient; to treat or prevent a specified disorder or disease; to ameliorate or eradicate one or more of its symptoms; and/or to prevent the occurrence of the disease or disorder. The amount of a compound which constitutes an "effective amount" may vary depending on the compound, the desired result, the disease state and its severity, the age of the patient to be treated, and the like.

"Solvate" refers to a complex formed by combination of solvent molecules with molecules or ions of a solute. The solvent can be an organic solvent, an inorganic solvent, or a mixture of both. Exemplary solvents include, but are not limited to, alcohols, such as methanol, ethanol, propanol; amides such as N,N-dialiphatic amides, such as N,N-dimethylformamide; tetrahydrofuran; alkylsulfoxides, such as dimethylsulfoxide; water; and combinations thereof. The compounds described herein can exist in un-solvated as well as solvated forms when combined with solvents, pharmaceutically acceptable or not, such as water, ethanol, and the like. Solvated forms of the presently disclosed compounds are within the scope of the embodiments disclosed herein.

"Treating" or "treatment" as used herein concerns treatment of a disease or condition of interest in a patient or subject, particularly a human having the disease or condition of interest, and includes by way of example, and without limitation:
  (i) inhibiting the disease or condition, for example, arresting or slowing its development;
  (ii) relieving the disease or condition, for example, causing regression of the disease or condition or a symptom thereof; or
  (iii) stabilizing the disease or condition.

"Preventing" as used herein concerns preventing the disease or condition from occurring in a patient or subject, in particular, when such patient or subject is predisposed to the condition but has not yet been diagnosed as having it.

As used herein, the terms "disease" and "condition" can be used interchangeably or can be different in that the particular malady or condition may not have a known causative agent (so that etiology has not yet been determined) and it is therefore not yet recognized as a disease but only as an undesirable condition or syndrome, where a more or less specific set of symptoms have been identified by clinicians.

The above definitions and the following general formulas are not intended to include impermissible substitution patterns (e.g., methyl substituted with 5 fluoro groups). Such impermissible substitution patterns are easily recognized by a person having ordinary skill in the art.

Any of the groups referred to herein may be optionally substituted by at least one, possibly two or more, substituents as defined herein. That is, a substituted group has at least one, possible two or more, substitutable hydrogens replaced by a substituent or substituents as defined herein, unless the context indicates otherwise or a particular structural formula precludes substitution.

A person of ordinary skill in the art will appreciate that compounds may exhibit the phenomena of tautomerism, conformational isomerism, geometric isomerism, and/or optical isomerism. For example, certain disclosed compounds can include one or more chiral centers and/or double bonds and as a consequence can exist as stereoisomers, such as double-bond isomers (i.e., geometric isomers), enantiomers, diastereomers, and mixtures thereof, such as racemic mixtures. As another example, certain disclosed compounds can exist in several tautomeric forms, including the enol form, the keto form, and mixtures thereof. As the various compound names, formulae and compound drawings within the specification and claims can represent only one of the possible tautomeric, conformational isomeric, optical isomeric, or geometric isomeric forms, a person of ordinary skill in the art will appreciate that the disclosed compounds encompass any tautomeric, conformational isomeric, optical isomeric, and/or geometric isomeric forms of the compounds described herein, as well as mixtures of these various different isomeric forms. In cases of limited rotation, e.g., around the amide bond or between two directly attached rings such as the pyrazolyl and pyridinyl rings, atropisomers are also possible and are also specifically included in the compounds of the disclosure.

In any embodiments, any or all hydrogens present in the compound, or in a particular group or moiety within the compound, may be replaced by a deuterium or a tritium. Thus, a recitation of alkyl includes deuterated alkyl, where from one to the maximum number of hydrogens present may be replaced by deuterium. For example, ethyl may be $C_2H_5$ or $C_2H_5$ where from 1 to 5 hydrogens are replaced by deuterium, such as in $C_2D_xH_{5-x}$.

II. Tricyclic IRAK-active Compounds and Compositions Comprising Tricyclic IRAK-Active Compounds A. Compounds Disclosed herein are compounds, methods of making the compounds, and methods of using the compounds. In one embodiment, the disclosed compounds are kinase inhibitors, particularly tyrosine kinase inhibitors. In a particular embodiment the compounds are useful in blocking one or more cytokine signaling pathways, such as the IL-17 signaling pathway. For certain embodiments, the disclosed compounds are useful for treating conditions in which inhibition of an interleukin-1 receptor-associated kinase (IRAK) pathway is therapeutically useful. In some embodiments, the compounds directly inhibit an IRAK protein, such as IRAK1, IRAK2, IRAK3 and/or IRAK4.

Exemplary compounds within the scope of the present disclosure have a general formula 1

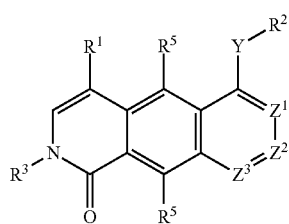

Formula I or a pharmaceutically acceptable salt or solvate thereof.

Y is selected from $O(CR^dR^d)_n$ or $N(R^4)(CR^dR^d)_n$. In some embodiments, each $R^d$ is H.

n is 1, 2, 3 or 4. In some embodiments, n is 1.

$Z^1$, $Z^2$ and $Z^3$ are independently selected from $CR^5$ or N, wherein at least one of $Z^1$, $Z^2$ and $Z^3$ is N. In some embodiments, exactly one of $Z^1$, $Z^2$ and $Z^3$ is N, and in certain embodiments, $Z^1$ is N, and $Z^2$ and $Z^3$ are both $CR^5$ and may be both CH.

$R^1$ is H; halo; cyano; —$SO_2$alkyl; heterocycloalkyl optionally substituted with 1, 2, or 3 groups selected from $R^a$ or $R^b$; heteroaryl optionally substituted with 1, 2, or 3 groups selected from $R^a$ or $R^b$; $R^a$ optionally substituted with $R^b$, $N_3$ or $Si(C_{1-6}alkyl)_3$.

$R^2$ is aryl, heteroaryl, cycloalkyl or heterocycloalkyl, each optionally substituted with one or more groups, such as 1, 2, 3, or 4 groups, selected from $R^a$ or $R^b$.

$R^3$ and $R^4$ independently are H or $R^a$ where each $R^a$ is optionally substituted with 1-3 groups selected from $R^b$ or $R^d$.

Each $R^5$ independently is H, alkyl such as $C_{1-6}$alkyl, halo, cyano, —$OR^d$, —$SR^d$, or —$NR^cR^c$.

Also with respect to formula 1, each $R^a$ is independently selected from $C_{1-6}$ alkyl, $C_{2-6}$ alkenyl, $C_{2-6}$ alkynyl, $C_{1-6}$haloalkyl, aralkyl, or $C_{3-8}$ cycloalkyl, and may be optionally substituted with 1, 2, or 3 $R^b$ unless otherwise specified.

Each $R^b$ is independently selected from OH, —$OR^a$, halo, oxo, —$NR^cR^c$, —$C(O)OR^d$, —$C(O)NR^cR^c$, —$N(R^d)C(O)OR^a$, or —$N(R^d)C(O)NR^cR^c$.

Each $R^c$ is independently selected from $R^d$ or two $R^c$, together, with the nitrogen atom to which they are attached, form a $C_{2-8}$ heterocyclyl optionally having one or two additional heteroatoms selected from O and $NR^d$ and optionally substituted with one or more, typically 1, 2, or 3, of the same or different $R^a$ or $R^b$.

Each $R^d$ is independently selected from hydrogen and $C_{1-6}$ alkyl.

In some embodiments, Y is $O(CR^dR^d)_n$. In certain embodiments, n is 1. And in some embodiments, Y is —$OCH_2$—.

In some embodiments, $R^2$ is heterocycloalkyl, each optionally substituted with one or more groups, such as 1, 2, 3, or 4 groups, selected from $R^a$ or $R^b$. In certain embodiments, $R^2$ is a 5- or 6-membered heterocycloalkyl, such as 5-membered heterocycloalkyl, optionally substituted with 1, 2, or 3 substituents selected from $R^a$ or $R^b$. $R^2$ may be a 5-membered nitrogen-containing heterocycloalkyl, optionally substituted with 1, 2, or 3 substituents selected from $R^a$ or $R^b$.

$R^2$ may be pyrrolidinyl, piperidinyl, piperazinyl or morpholinyl. In some embodiments, $R^2$ is

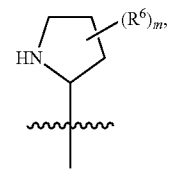

where m is 0, 1, 2 or 3, and each $R^6$ independently is $R^a$ or $R^b$, and may be oxo, halo or $C_{1-6}$alkyl. And in certain embodiments, $R^2$ is

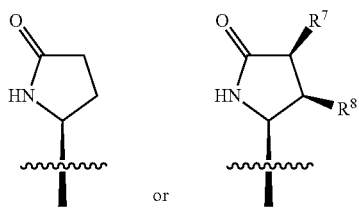

where each of $R^7$ and $R^8$ independently is halo or $C_{1-6}$alkyl.

In one embodiment, $R^2$ is

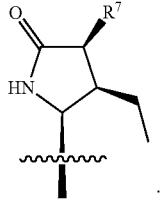

In some embodiments, $R^3$ and $R^4$ independently is H or $C_{1-6}$alkyl, and in certain embodiments, $R^3$ and $R^4$ are H.

In some embodiments, each $R^5$ is H.

In some embodiments, $Z^1$ is N, and $Z^2$ and $Z^3$ are both $CR^5$, leading to compounds according to Formula II, or a pharmaceutically acceptable salt or solvate thereof

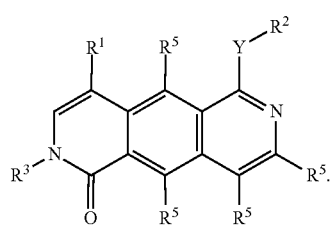

Formula II

With respect to Formula II, $R^1$, $R^2$, $R^3$, each $R^5$ independently, and Y are as defined for Formula I.

In some embodiments, Y is —OCH$_2$—. In some embodiments the compound has a structure according to Formula III, or a pharmaceutically acceptable salt or solvate thereof

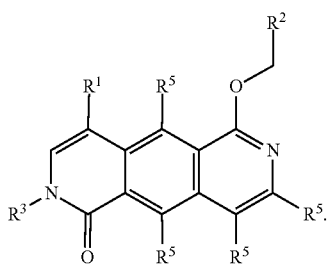

Formula III

With respect to Formula III, $R^1$, $R^2$, $R^3$, each $R^5$ independently are as defined for Formula I.

In some embodiments of Formula III, $R^2$ is a 5-membered heterocycloalkyl, such as a 5-membered nitrogen-containing heterocycloalkyl. In some embodiments the compound has a structure according to Formula IV, or a pharmaceutically acceptable salt or solvate thereof

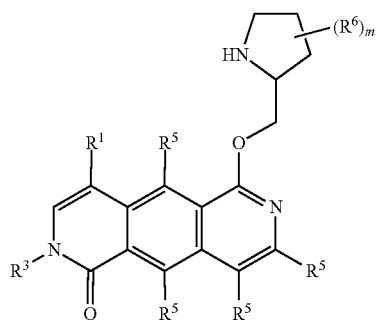

Formula IV

With respect to Formula III, $R^1$, $R^3$, each $R^5$ independently are as defined for Formula I, m is 0, 1, 2, or 3, and each $R^6$ independently is $R^a$ or $R^b$. In some embodiments, each $R^6$ independently is oxo, halo, or $C_{1-6}$alkyl. In certain embodiments, the compound has a structure according to Formula IV-A or IV-B, or a pharmaceutically acceptable salt or solvate thereof

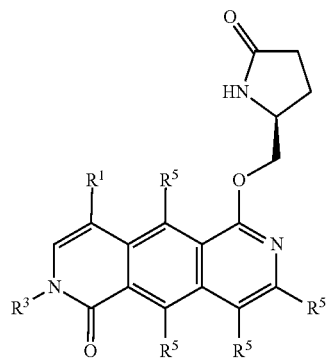

Formula IV-A

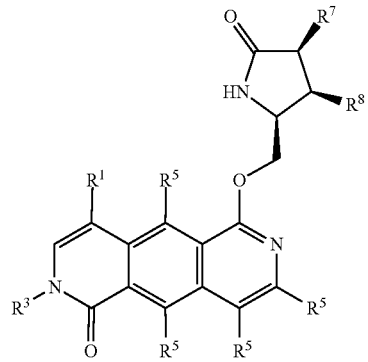

Formula IV-B

In some embodiments of Formula IV-B, $R^7$ and $R^8$ independently is halo or $C_{1-6}$alkyl, and in particular embodiments, $R^7$ is halo and $R^8$ is $C_{1-6}$alkyl. In particular embodiments, the compound has a structure according to Formula IV-C or Formula IV-D, or a pharmaceutically acceptable salt or solvate thereof Formula IV-C

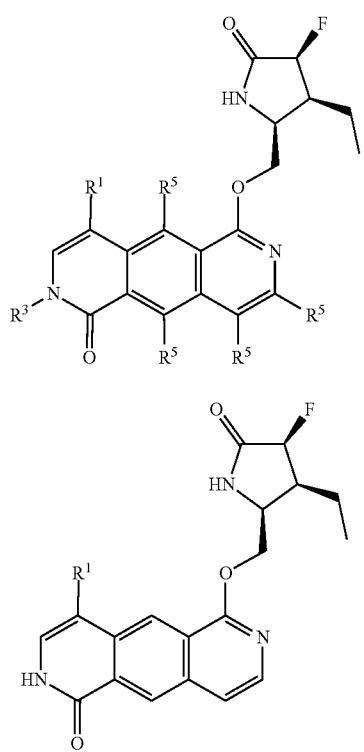

Formula IV-D

In some embodiments, of Formulas I to IV-D, the compound has a structure according to one of the following formulas, or a pharmaceutically acceptable salt or solvate thereof:

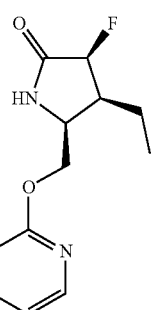

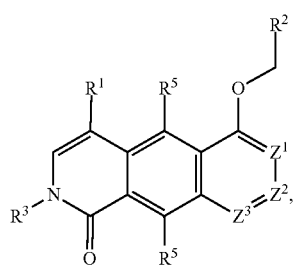

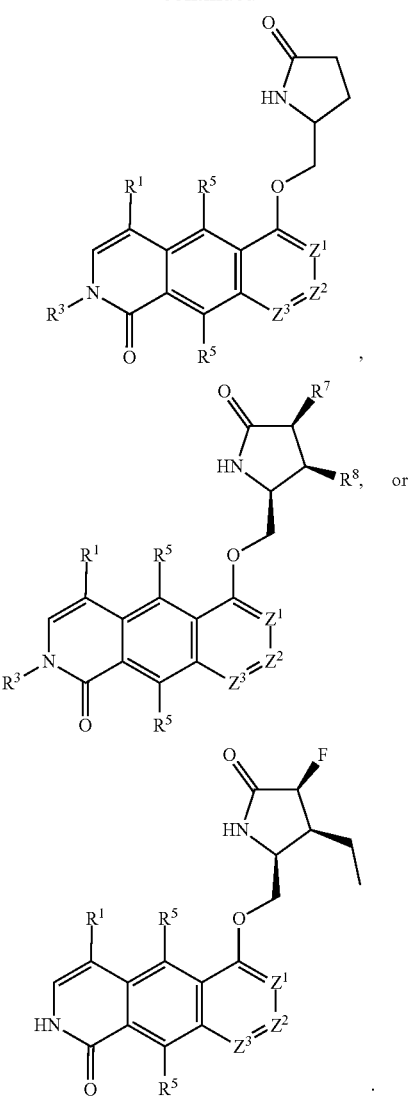

With respect to these formulas, if present, $R^1$, $R^2$, $R^3$, $R^5$, $R^6$, $R^7$, $R^8$, m, $Z^1$, $Z^2$ and $Z^3$ are as previously defined for Formulas 1 to IV-D.

Certain exemplary embodiments according to the formulas disclosed herein include:

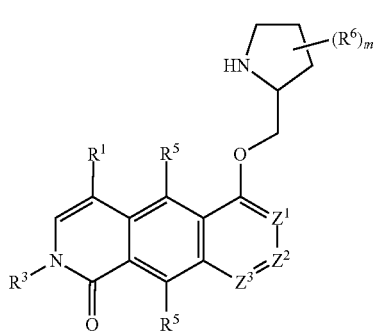

I-1

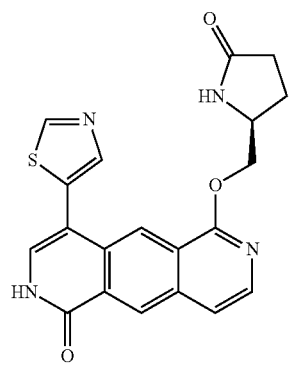

I-2
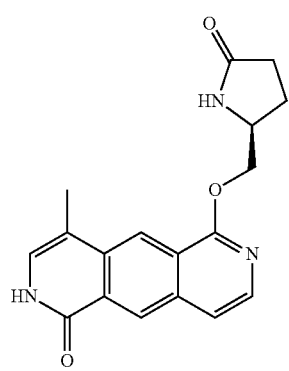 [SMILES: Cc1c[nH]c(=O)c2cc3ccnc(OC[C@@H]4CCC(=O)N4)c3cc12]
formic acid salt
I-3
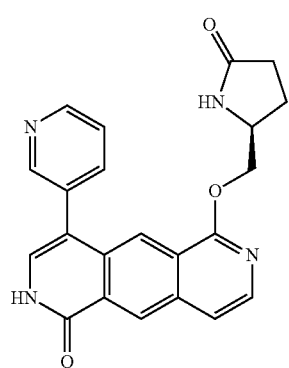
I-4
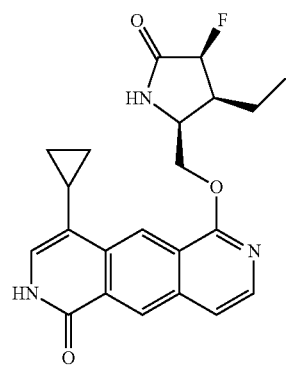
I-5
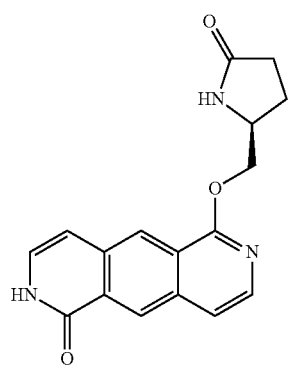
I-6
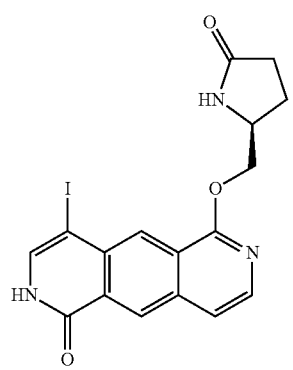
I-7
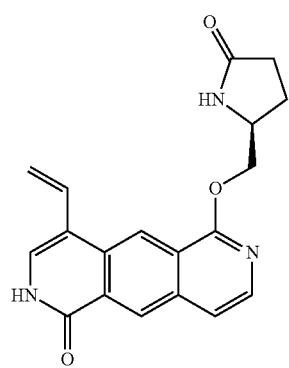
I-8
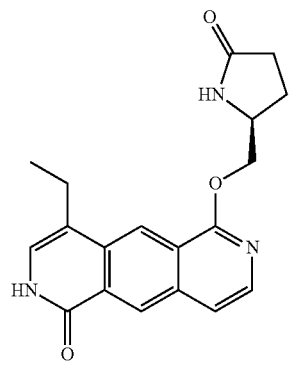
I-9
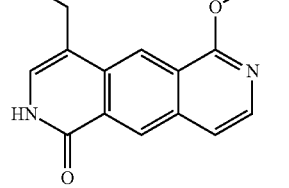

I-10
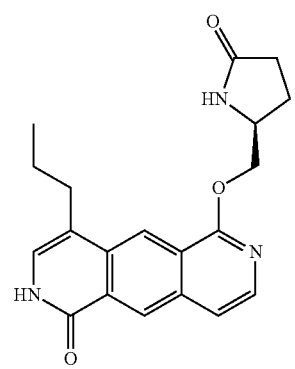
I-11
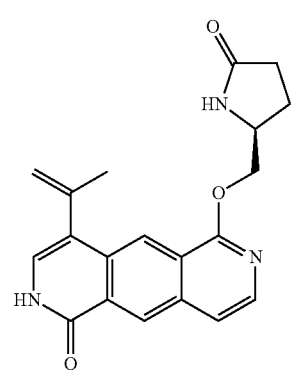
I-12
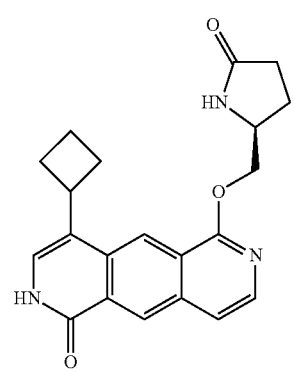
I-13
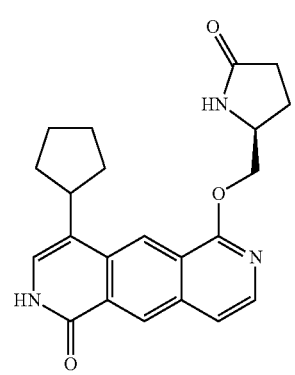
I-14
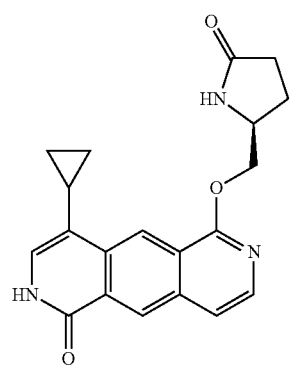
I-15
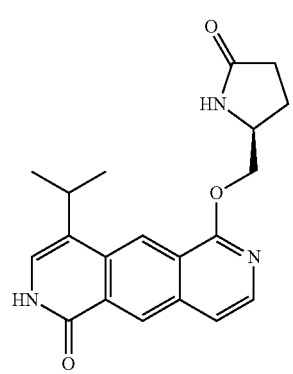
I-16
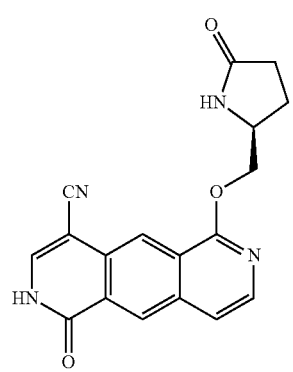
I-17
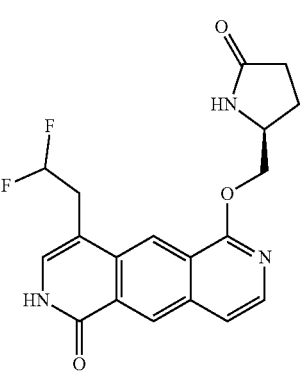

I-18
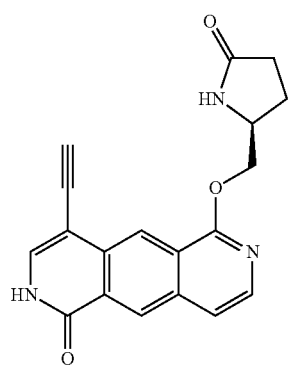
I-19
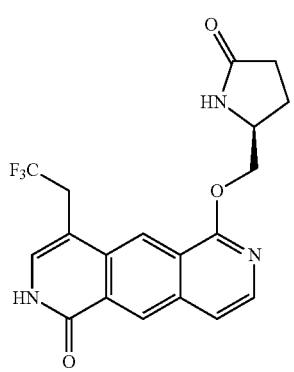
I-20
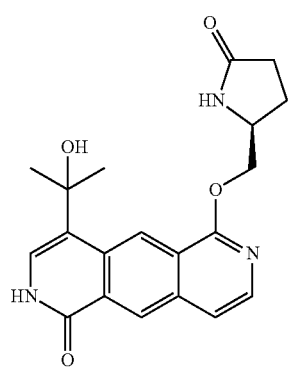
I-21
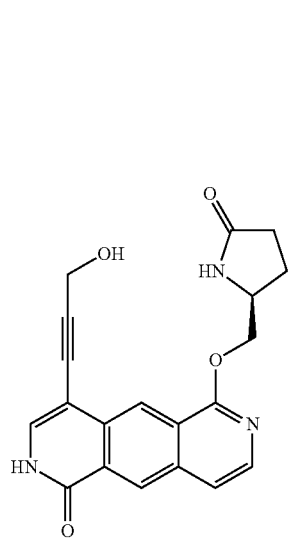
I-22
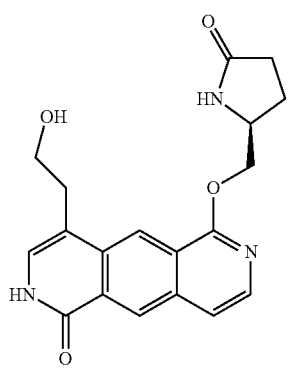
I-23
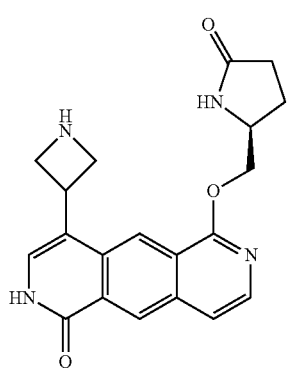
I-24
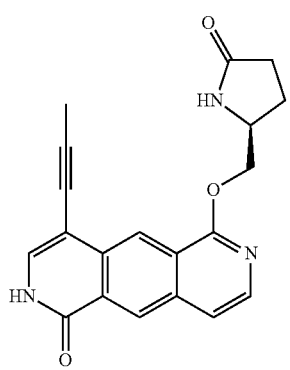
I-25
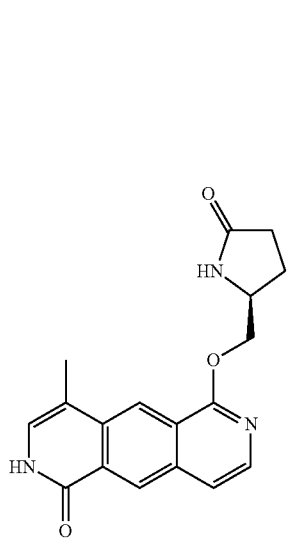

I-26
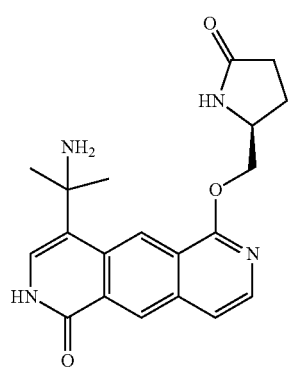
I-27
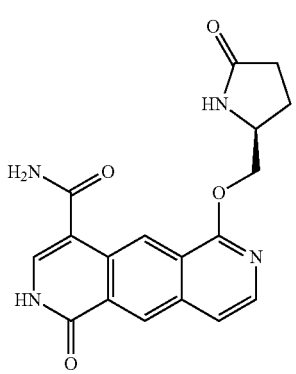
I-28
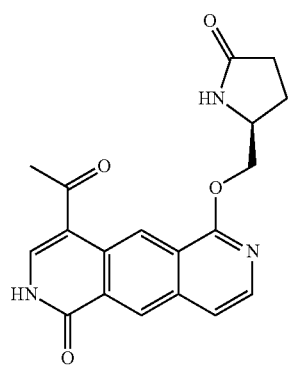
I-29
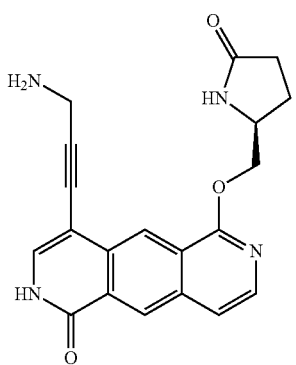
I-30
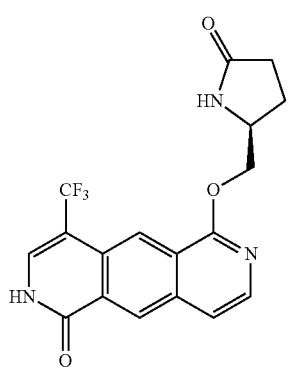
I-31
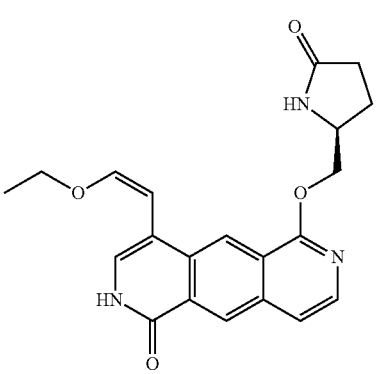
I-32
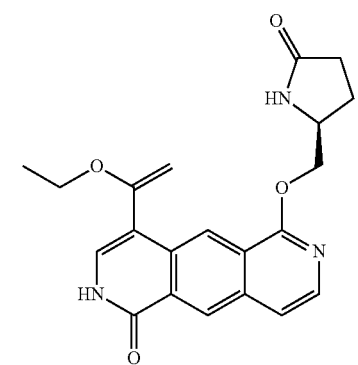
I-33
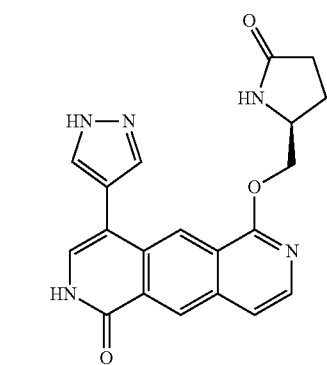

I-34
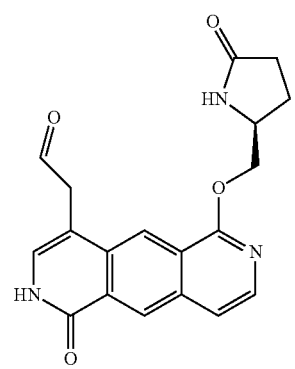
I-35
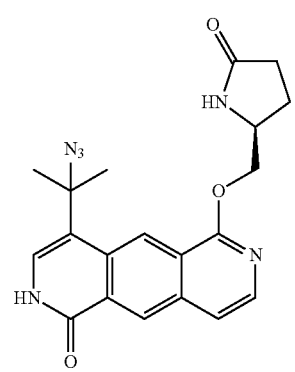
I-36
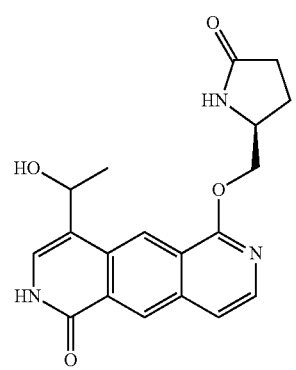
I-37
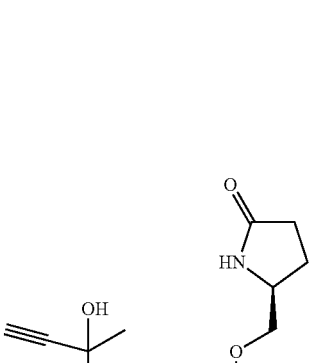
I-38
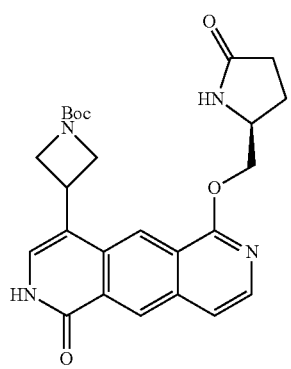
I-39
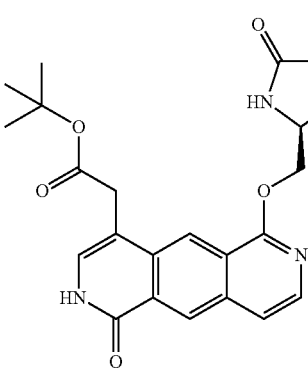
I-40
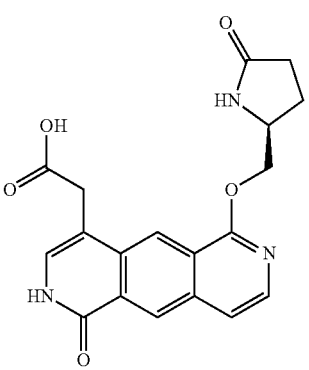
I-41
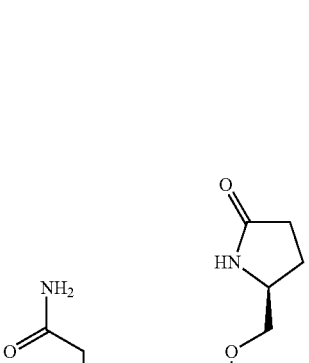

I-42
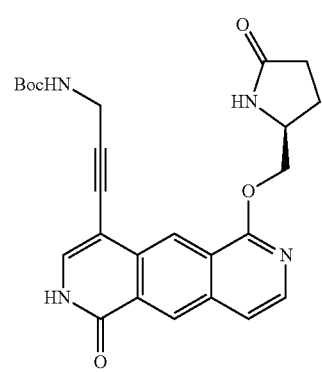
I-43
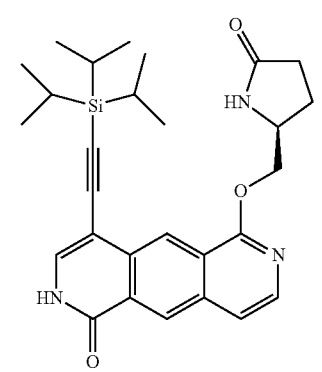
I-44
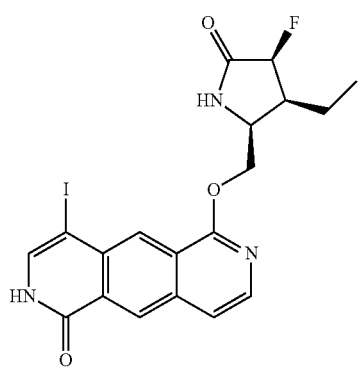
I-45
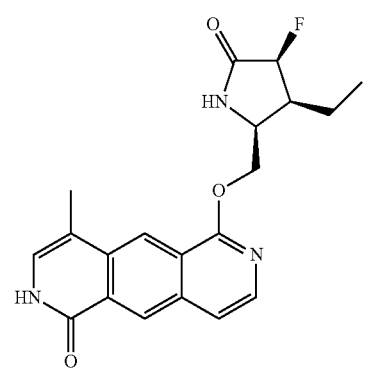
I-46
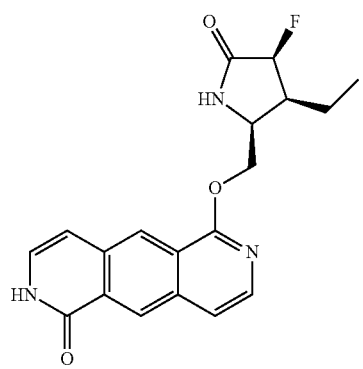
I-47
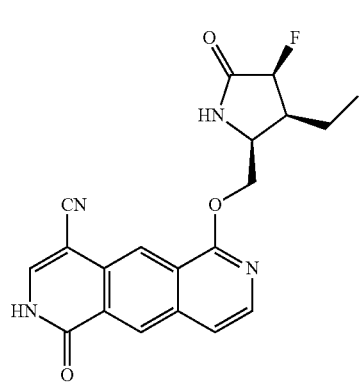
I-48
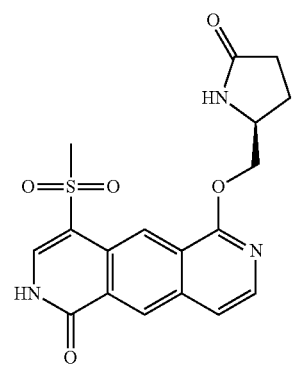
I-49
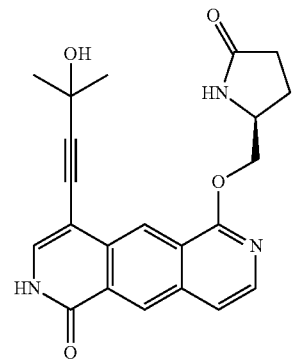

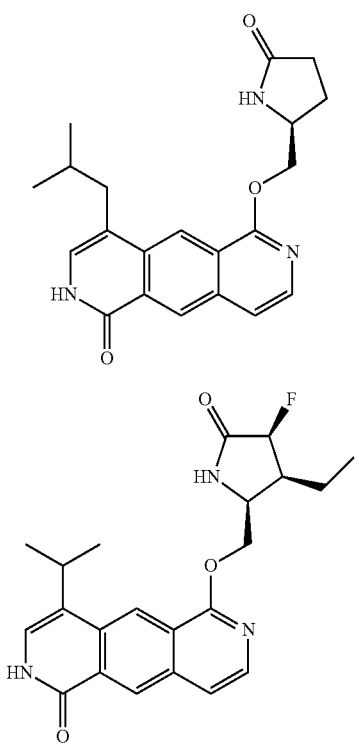

Exemplary compounds according to the formulas disclosed herein include:

I-1: (S)-6-((5-oxopyrrolidin-2-yl)methoxy)-4-(thiazol-5-yl)pyrido[3,4-g]isoquinolin-1(2H)-one;
I-2: (S)-4-methyl-6-((5-oxopyrrolidin-2-yl)methoxy)pyrido[3,4-g]isoquinolin-1(2H)-one formic acid salt;
I-3: (S)-6-((5-oxopyrrolidin-2-yl)methoxy)-4-(pyridin-3-yl)pyrido[3,4-g]isoquinolin-1(2H)-one;
I-4: 4-cyclopropyl-6-(((2S,3S,4S)-3-ethyl-4-fluoro-5-oxopyrrolidin-2-yl)methoxy)pyrido[3,4-g]isoquinolin-1(2H)-one;
I-5: (S)-6-((5-oxopyrrolidin-2-yl)methoxy)pyrido[3,4-g]isoquinolin-1(2H)-one;
I-6: (S)-4-iodo-6-((5-oxopyrrolidin-2-yl)methoxy)pyrido[3,4-g]isoquinolin-1(2H)-one;
I-7: (S)-6-((5-oxopyrrolidin-2-yl)methoxy)-4-vinylpyrido[3,4-g]isoquinolin-1(2H)-one;
I-8: (S)-4-ethyl-6-((5-oxopyrrolidin-2-yl)methoxy)pyrido[3,4-g]isoquinolin-1(2H)-one;
I-9: (S)-4-allyl-6-((5-oxopyrrolidin-2-yl)methoxy)pyrido[3,4-g]isoquinolin-1(2H)-one;
I-10: (S)-6-((5-oxopyrrolidin-2-yl)methoxy)-4-propylpyrido[3,4-g]isoquinolin-1(2H)-one;
I-11: (S)-6-((5-oxopyrrolidin-2-yl)methoxy)-4-(prop-1-en-2-yl)pyrido[3,4-g]isoquinolin-1(2H)-one;
I-12: (S)-4-cyclobutyl-6-((5-oxopyrrolidin-2-yl)methoxy)pyrido[3,4-g]isoquinolin-1(2H)-one;
I-13: (S)-4-cyclopentyl-6-((5-oxopyrrolidin-2-yl)methoxy)pyrido[3,4-g]isoquinolin-1(2H)-one;
I-14: (S)-4-cyclopropyl-6-((5-oxopyrrolidin-2-yl)methoxy)pyrido[3,4-g]isoquinolin-1(2H)-one;
I-15: (S)-4-isopropyl-6-((5-oxopyrrolidin-2-yl)methoxy)pyrido[3,4-g]isoquinolin-1(2H)-one;
I-16: (S)-1-oxo-6-((5-oxopyrrolidin-2-yl)methoxy)-1,2-dihydropyrido[3,4-g]isoquinoline-4-carbonitrile;
I-17: (S)-4-(2,2-difluoroethyl)-6-((5-oxopyrrolidin-2-yl)methoxy)pyrido[3,4-g]isoquinolin-1(2H)-one;
I-18: (S)-4-ethynyl-6-((5-oxopyrrolidin-2-yl)methoxy)pyrido[3,4-g]isoquinolin-1(2H)-one;
I-19: (S)-6-((5-oxopyrrolidin-2-yl)methoxy)-4-(2,2,2-trifluoroethyl)pyrido[3,4-g]isoquinolin-1(2H)-one;
I-20: (S)-4-(2-hydroxypropan-2-yl)-6-((5-oxopyrrolidin-2-yl)methoxy)pyrido[3,4-g]isoquinolin-1(2H)-one;
I-21: (S)-4-(3-hydroxyprop-1-yn-1-yl)-6-((5-oxopyrrolidin-2-yl)methoxy)pyrido[3,4-g]isoquinolin-1(2H)-one;
I-22: (S)-4-(2-hydroxyethyl)-6-((5-oxopyrrolidin-2-yl)methoxy)pyrido[3,4-g]isoquinolin-1(2H)-one;
I-23: (S)-4-(azetidin-3-yl)-6-((5-oxopyrrolidin-2-yl)methoxy)pyrido[3,4-g]isoquinolin-1(2H)-one;
I-24: (S)-6-((5-oxopyrrolidin-2-yl)methoxy)-4-(prop-1-yn-1-yl)pyrido[3,4-g]isoquinolin-1(2H)-one;
I-25: (S)-4-methyl-6-((5-oxopyrrolidin-2-yl)methoxy)pyrido[3,4-g]isoquinolin-1(2H)-one;
I-26: (S)-4-(2-aminopropan-2-yl)-6-((5-oxopyrrolidin-2-yl)methoxy)pyrido[3,4-g]isoquinolin-1(2H)-one;
I-27: (S)-1-oxo-6-((5-oxopyrrolidin-2-yl)methoxy)-1,2-dihydropyrido[3,4-g]isoquinoline-4-carboxamide;
I-28: (S)-4-acetyl-6-((5-oxopyrrolidin-2-yl)methoxy)pyrido[3,4-g]isoquinolin-1(2H)-one;
I-29: (S)-4-(3-aminoprop-1-yn-1-yl)-6-((5-oxopyrrolidin-2-yl)methoxy)pyrido[3,4-g]isoquinolin-1(2H)-one;
I-30: (S)-6-((5-oxopyrrolidin-2-yl)methoxy)-4-(trifluoromethyl)pyrido[3,4-g]isoquinolin-1(2H)-one;
I-31: (S,Z)-4-(2-ethoxyvinyl)-6-((5-oxopyrrolidin-2-yl)methoxy)pyrido[3,4-g]isoquinolin-1(2H)-one;
I-32: (S)-4-(1-ethoxyvinyl)-6-((5-oxopyrrolidin-2-yl)methoxy)pyrido[3,4-g]isoquinolin-1(2H)-one;
I-33: (S)-6-((5-oxopyrrolidin-2-yl)methoxy)-4-(1H-pyrazol-4-yl)pyrido[3,4-g]isoquinolin-1(2H)-one;
I-34: (S)-2-(1-oxo-6-((5-oxopyrrolidin-2-yl)methoxy)-1,2-dihydropyrido[3,4-g]isoquinolin-4-yl)acetaldehyde;
I-35: (S)-4-(2-azidopropan-2-yl)-6-((5-oxopyrrolidin-2-yl)methoxy)pyrido[3,4-g]isoquinolin-1(2H)-one;
I-36: 4-(1-hydroxyethyl)-6-((((S)-5-oxopyrrolidin-2-yl)methoxy)pyrido[3,4-g]isoquinolin-1(2H)-one;
I-37: 4-(2-hydroxybut-3-yn-2-yl)-6-((((S)-5-oxopyrrolidin-2-yl)methoxy)pyrido[3,4-g]isoquinolin-1(2H)-one;
I-38: tert-butyl (S)-3-(1-oxo-6-((5-oxopyrrolidin-2-yl)methoxy)-1,2-dihydropyrido[3,4-g]isoquinolin-4-yl)azetidine-1-carboxylate;
I-39: tert-butyl (S)-2-(1-oxo-6-((5-oxopyrrolidin-2-yl)methoxy)-1,2-dihydropyrido[3,4-g]isoquinolin-4-yl)acetate;
I-40: (S)-2-(1-oxo-6-((5-oxopyrrolidin-2-yl)methoxy)-1,2-dihydropyrido[3,4-g]isoquinolin-4-yl)acetic acid;
I-41: (S)-2-(1-oxo-6-((5-oxopyrrolidin-2-yl)methoxy)-1,2-dihydropyrido[3,4-g]isoquinolin-4-yl)acetamide;
I-42: tert-butyl (S)-(3-(1-oxo-6-((5-oxopyrrolidin-2-yl)methoxy)-1,2-dihydropyrido[3,4-g]isoquinolin-4-yl)prop-2-yn-1-yl)carbamate;
I-43: (S)-6-((5-oxopyrrolidin-2-yl)methoxy)-4-((triisopropylsilyl)ethynyl)pyrido[3,4-g]isoquinolin-1(2H)-one;
I-44: 6-(((2S,3S,4S)-3-ethyl-4-fluoro-5-oxopyrrolidin-2-yl)methoxy)-4-iodopyrido[3,4-g]isoquinolin-1(2H)-one;
I-45: 6-(((2S,3S,4S)-3-ethyl-4-fluoro-5-oxopyrrolidin-2-yl)methoxy)-4-methylpyrido[3,4-g]isoquinolin-1(2H)-one;
I-46: 6-(((2S,3S,4S)-3-ethyl-4-fluoro-5-oxopyrrolidin-2-yl)methoxy)pyrido[3,4-g]isoquinolin-1(2H)-one;
I-47: 6-(((2S,3S,4S)-3-ethyl-4-fluoro-5-oxopyrrolidin-2-yl)methoxy)-1-oxo-1,2-dihydropyrido[3,4-g]isoquinoline-4-carbonitrile;

I-48: (S)-4-(methylsulfonyl)-6-((5-oxopyrrolidin-2-yl)methoxy)pyrido[3,4-g]isoquinolin-1(2H)-one;
I-49: (S)-4-(3-hydroxy-3-methylbut-1-yn-1-yl)-6-((5-oxopyrrolidin-2-yl)methoxy)pyrido[3,4-g]isoquinolin-1(2H)-one;
I-50: (S)-4-isobutyl-6-((5-oxopyrrolidin-2-yl)methoxy)pyrido[3,4-g]isoquinolin-1(2H)-one; or
I-51: 6-(((2S,3S,4S)-3-ethyl-4-fluoro-5-oxopyrrolidin-2-yl)methoxy)-4-isopropylpyrido[3,4-g]isoquinolin-1(2H)-one.

B. Synthesis

Disclosed compounds can be prepared as exemplified below, as illustrated for specific compounds in the examples, and as will be understood by a person of ordinary skill in the art of organic synthesis. An exemplary synthesis to make an intermediate compound may include the following first reaction step according to Scheme 1.

Scheme 1

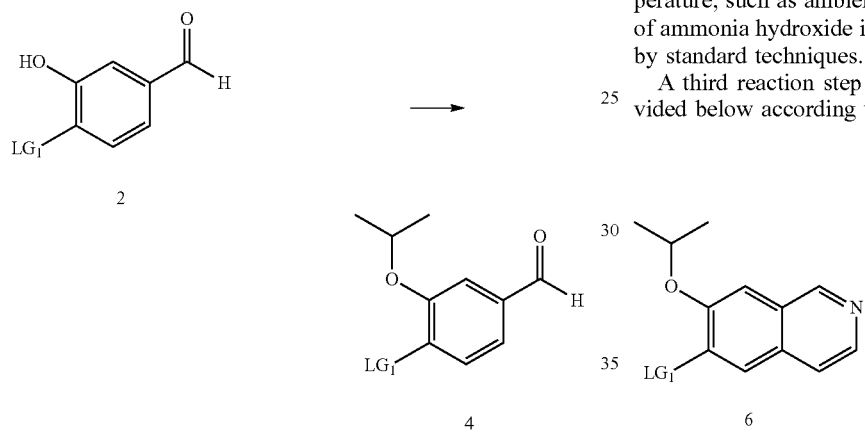

Compound 2 is treated with 2-bromopropane in a suitable solvent and in the presence of a suitable base to form compound 4. LG₁ is a leaving group that is stable to the reaction conditions of Schemes 1 and 2, for example, iodo. The solvent may be an aprotic solvent, such as dimethyl sulfoxide (DMSO), dimethyl formamide (DMF), tetrahydrofuran (THF), an ether solvent (for example, diethyl ether), acetone, or methyl isobutyl ketone (MIBK). The base is any base suitable to facilitate the reaction, such as sodium carbonate, potassium carbonate, lithium carbonate, or sodium hydride. The reaction proceeds as a temperature suitable to facilitate the reaction, such as from about 20° C. to 100° C. or more.

A second reaction step in the exemplary synthesis is provided below according to Scheme 2.

Scheme 2

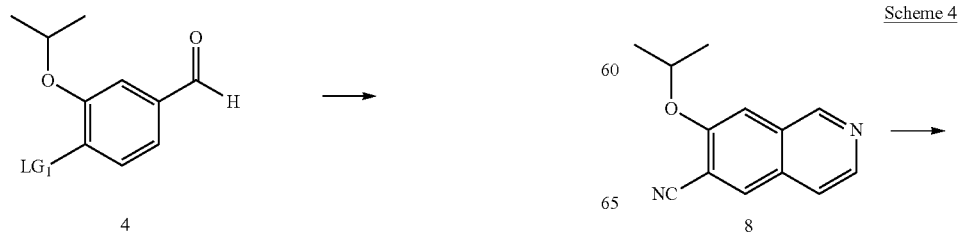

-continued

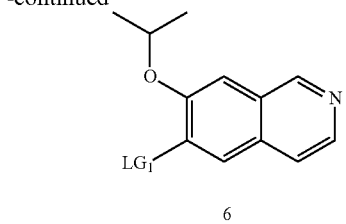

Compound 4 is treated with 2,2-dimethoxyethan-1-amine in a suitable solvent, and the mixture is heated with removal of the water that forms. The solvent may be an aprotic solvent, such as toluene or xylene. The water is removed by a suitable technique, such as azeotropic water removal, and/or using a drying agent, for example, molecular sieve.

The reaction mixture is then cooled, such as to about 0° C., and trifluoroacetic anhydride is added, followed by boron trifluoride etherate. After stirring at a suitable temperature, such as ambient temperature, an aqueous solution of ammonia hydroxide is added and compound 6 is isolated by standard techniques.

A third reaction step in the exemplary synthesis is provided below according to Scheme 3.

Scheme 3

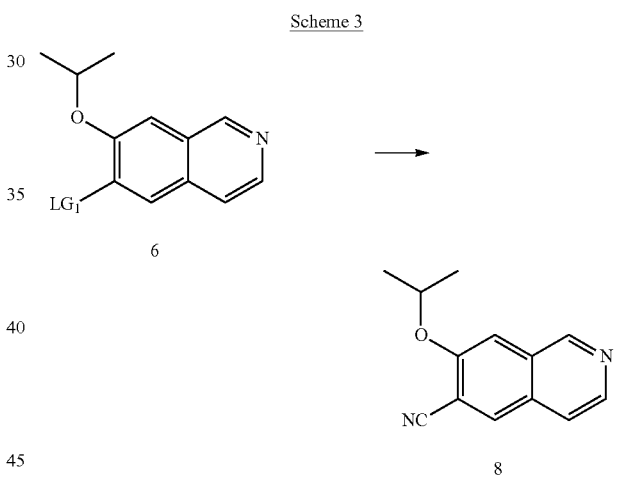

Compound 6 is treated with a suitable cyano reagent, such as copper(I) cyanide, in a suitable solvent, such as DMSO or acetonitrile. The reaction is heated at a temperature suitable to facilitate the reaction, such as from 80° C. to 150° C. After quenching with aqueous ammonium hydroxide solution, compound 8 is isolated.

A fourth reaction step in the exemplary synthesis is provided below according to Scheme 4.

Scheme 4

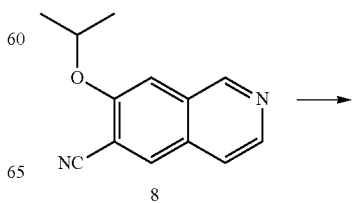

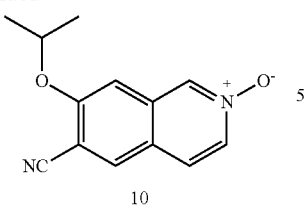

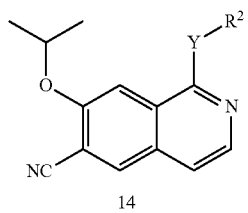

Compound 8 is treated with a suitable oxidizing agent to form compound 10. Suitable oxidizing agents include, but are not limited to, m-chloroperoxybenzoic acid or hydrogen peroxide. The reaction is performed in a suitable solvent, such as a chlorinated solvent, for example, dichloromethane, dichloroethane, or chloroform. And the reaction is carried out at a temperature suitable to facilitate the oxidation, such as from 0° C. to 10° C.

A fifth reaction step in the exemplary synthesis is provided below according to Scheme 5.

Compound 12 is treated with $R^2Y$—H in the presence of potassium bis(trimethylsilyl)amide in a suitable solvent to form compound 14. The solvent maybe an aprotic solvent, such as DMF or THF. The reaction is performed at a suitable temperature, such as from −15° C. to 10° C. After stirring for a time period suitable to facilitate the reaction, a saturated aqueous solution of sodium dihydrogen phosphate is added to quench the reaction, and compound 14 is isolated.

A seventh reaction step in the exemplary synthesis is provided below according to Scheme 7.

Scheme 5

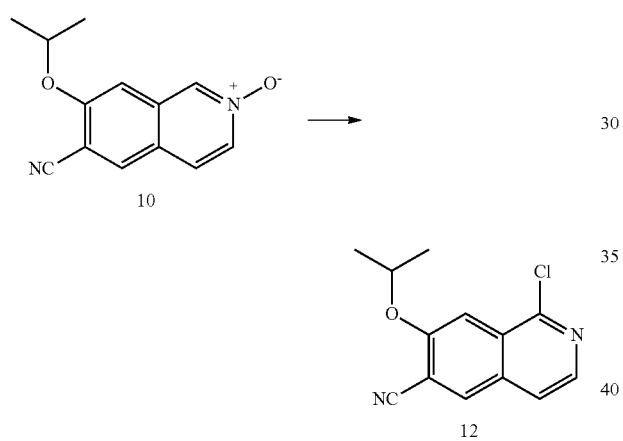

Scheme 7

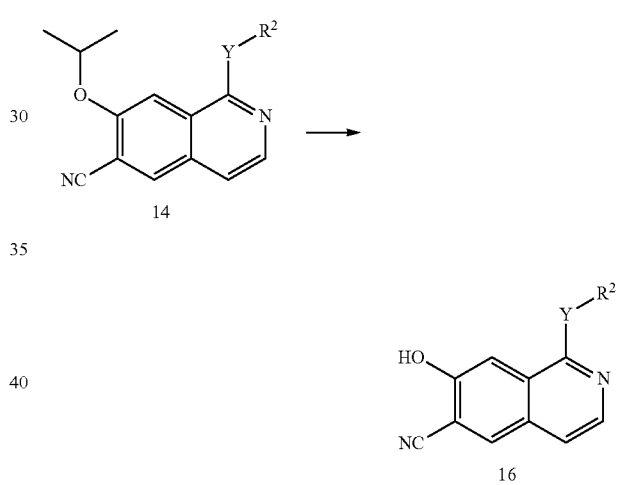

Compound 10 is treated with a suitable chlorinating agent in a suitable solvent to form compound 12. Phosphoryl chloride is one exemplary chlorinating agent suitable to form compound 12. Suitable solvents include, but are not limited to, chlorinated solvents, such as dichloromethane, dichloroethane, or chloroform, or DMF. The reaction proceeds at a temperature suitable to facilitate chlorination of compound 10, such as ambient temperature, or from 20° C. to 50° C.

A sixth reaction step in the exemplary synthesis is provided below according to Scheme 6.

Compound 14 is treated with a suitable reagent to form the hydroxyl group. The reagent may be an acid reagent, such as HBr, or a Lewis acid, such as $AlCl_3$ or $BBr_3$. The reaction is performed in a suitable solvent, such as a chlorinated solvent, for example, dichloromethane, dichloroethane, or chloroform.

An eighth reaction step in the exemplary synthesis is provided below according to Scheme 8.

Scheme 6

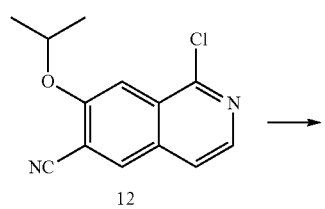

Scheme 8

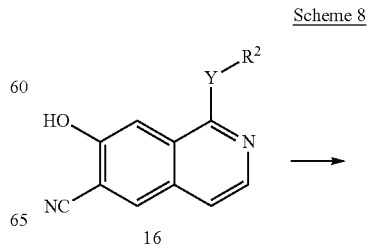

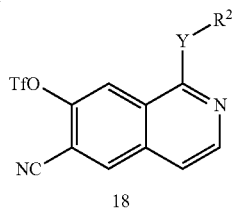

Compound 16 is treated with a reagent suitable to convert the hydroxide moiety into a suitable leaving group. Trifluoromethane sulfonate (TfO) is used in Scheme 8 as an exemplary leaving group, but a person of ordinary skill in the art understands that other leaving groups also could be used, such as, but not limited to, mesylate, tosylate, or a halide groups. To form the TfO moiety, compound 16 is treated with 1,1,1-trifluoro-N-phenyl-N-((trifluoromethyl)sulfonyl)methane sulfonamide in the presence of a suitable base, such as a trialkylamine base (for example, triethylamine, or diisopropylethylamine). Typically, an aprotic solvent is used for the reaction, such as, a chlorinated solvent, for example, dichloromethane, dichloroethane, or chloroform.

A ninth reaction step in the exemplary synthesis is provided below according to Scheme 9.

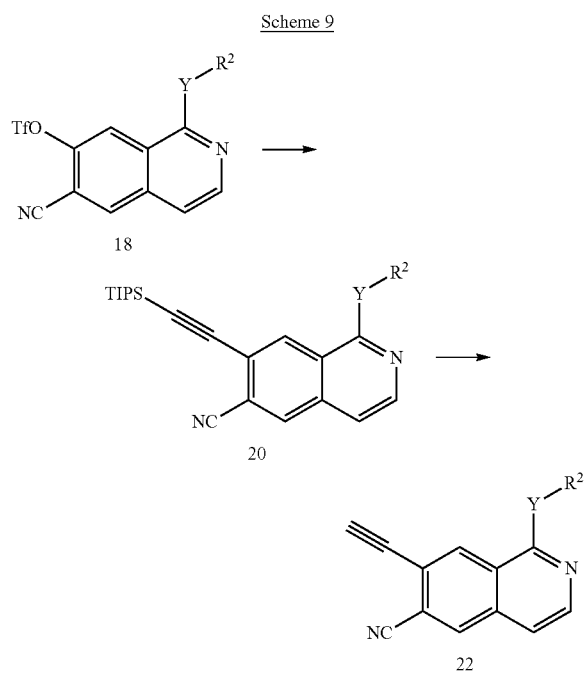

Compound 18 is treated with a suitable alkynyl reagent to form compound 20. In Scheme 9, ethynyltriisopropylsilane is used as an example alkynyl reagent, but a person of ordinary skill in the art understands that any protected alkynyl reagent could be used. Additional information concerning protecting groups for an alkynyl moiety can be found in Wuts, Peter, *Greene's Protective Groups in Organic Synthesis*, 5$^{th}$ *Edition*, published by Wiley October 2014, which is incorporated herein by reference. The reaction proceeds in the presence of a suitable base, such as a trialkylamine base (for example, triethylamine, or diisopropylethylamine), and copper (I) iodide, tetra-n-butylammonium iodide and a suitable catalyst, such as a palladium catalyst, for example, tetrakis(triphenylphosphine)palladium(0). The reaction is performed in a suitable solvent, such as acetonitrile, toluene, THF, or DMF. The reaction is agitated, such as by stirring or shaking, at a temperature suitable to facilitate the reaction, such as from 20° C. to 50° C.

The protecting group is removed from the alkynyl moiety using a suitable technique. A person of ordinary skill in the art understands that different protecting groups may require different removal conditions, and such removal conditions are known to persons of ordinary skill in the art. And additional information can be found in *Greene's Protective Groups in Organic Synthesis*.

With respect to the exemplary protecting group shown in Scheme 9, compound 20 is treated with acetic acid and tetra-n-butylammonium fluoride, in a suitable solvent, such as THF. The reaction mixture is agitated at a temperature of from 20° C. to 50° C. and compound 22 is isolated.

A tenth reaction step in the exemplary synthesis is provided below according to Scheme 10.

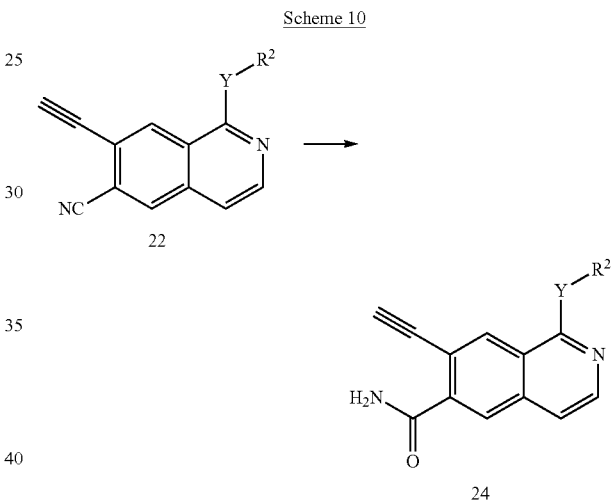

Compound 22 is treated with hydrogen peroxide in the presence of a suitable base to form compound 24. The base may be a carbonate base, such as potassium carbonate or sodium carbonate. The reaction proceeds in a suitable solvent, such as DMSO, and at a temperature of from 20° C. to 50° C. The reaction is quenched with saturated sodium bicarbonate solution and 10% sodium sulfite solution, and compound 24 is isolated.

An eleventh reaction step in the exemplary synthesis is provided below according to Scheme 11.

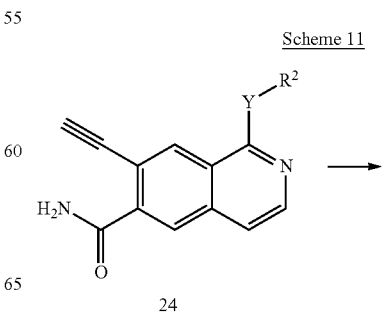

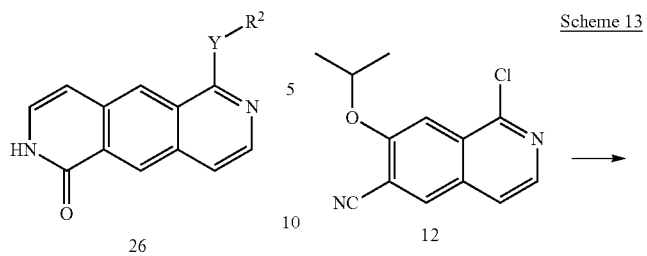

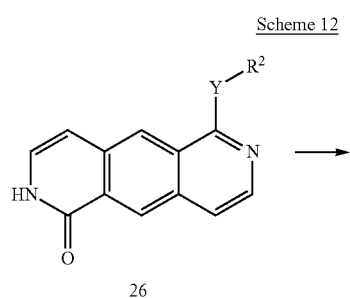

Compound 24 is dissolved in a suitable solvent and treated with chlorocyclopentadienylbis(triphenylphosphine)ruthenium(II). The solvent may be a basic solvent, such as pyridine. The reaction proceeds at a temperature suitable to facilitate the reaction, such as from 60° C. to 125° C., and typically is performed under an inert atmosphere, such as nitrogen or argon. After cooling to room temperature, compound 26 is isolated.

A twelfth reaction step in the exemplary synthesis is provided below according to Scheme 12.

Scheme 12

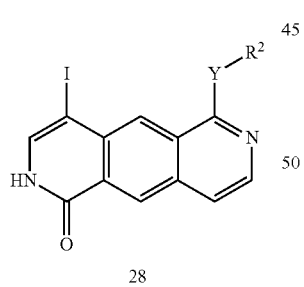

Compound 26 is treated with iodine in a suitable solvent and heated at from 30° C. to 75° C. for a time period suitable to facilitate the reaction proceeding towards completion. The solvent may be a basic solvent, such as pyridine, and the time period may be from one day or less to 7 days or more. The reaction is quenched, such as with saturated sodium bicarbonate solution and 10% of sodium sulfite solution, and compound 28 is isolated.

An alternative exemplary synthesis to prepare an intermediate compound may proceed according to Scheme 13.

Scheme 13

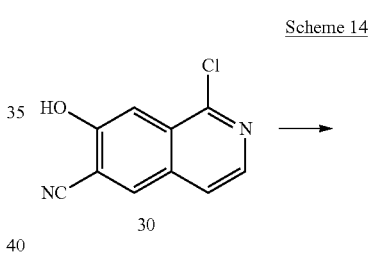

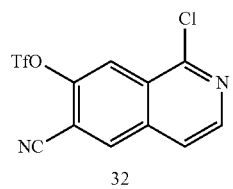

Compound 12 is treated with a suitable reagent to form the hydroxyl group. The reagent may be an acid reagent, such as HBr, or a Lewis acid, such as AlCl$_3$ or BBr$_3$. The reaction is performed in a suitable solvent, such as a chlorinated solvent, for example, dichloromethane, dichloroethane, or chloroform.

A second reaction step in the alternative exemplary synthesis proceeds according to Scheme 14.

Scheme 14

Compound 30 is treated with a reagent suitable to convert the hydroxide moiety into a suitable leaving group. Trifluoromethane sulfonate (TfO) is used in Scheme 14 as an exemplary leaving group, but a person of ordinary skill in the art understands that other leaving groups also could be used, such as, but not limited to, mesylate, tosylate, or a halide groups. To form the TfO moiety, compound 30 is treated with 1,1,1-trifluoro-N-phenyl-N-((trifluoromethyl)sulfonyl)methane sulfonamide in the presence of a suitable base, such as a trialkylamine base (for example, triethylamine, or diisopropylethylamine). Typically, an aprotic solvent is used for the reaction, such as, a chlorinated solvent, for example, dichloromethane, dichloroethane, or chloroform.

A third reaction step in the alternative exemplary synthesis proceeds according to Scheme 15.

Scheme 15

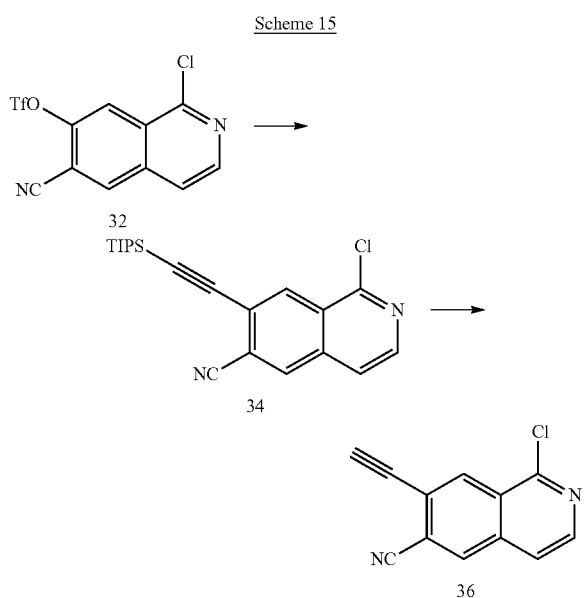

Compound 32 is treated with a suitable alkynyl reagent to form compound 34. In Scheme 15, ethynyltriisopropylsilane is used as an example alkynyl reagent, but a person of ordinary skill in the art understands that any protected alkynyl reagent could be used. Additional information concerning protecting groups for an alkynyl moiety can be found in *Greene's Protective Groups in Organic Synthesis, 5th Edition*. The reaction proceeds in the presence of a suitable base, such as a trialkylamine base (for example, triethylamine, or diisopropylethylamine), and copper (I) iodide, and a suitable catalyst, such as a palladium catalyst, for example, bis(triphenylphosphine)palladium chloride. The reaction is performed in a suitable solvent, such as acetonitrile, toluene, THF, or DMF. The reaction is agitated, such as by stirring or shaking, at a temperature suitable to facilitate the reaction, such as from 20° C. to 50° C.

The protecting group is removed from the alkynyl moiety using a suitable technique. A person of ordinary skill in the art understands that different protecting groups may require different removal conditions, and such removal conditions are known to persons of ordinary skill in the art. And additional information can be found in *Greene's Protective Groups in Organic Synthesis*.

With respect to the exemplary protecting group shown in Scheme 15, compound 34 is treated with acetic acid and tetra-n-butylammonium fluoride, in a suitable solvent, such as THF. The reaction mixture is agitated at a temperature of from 20° C. to 50° C. and compound 36 is isolated.

A fourth reaction step in the alternative exemplary synthesis proceeds according to Scheme 16.

Scheme 16

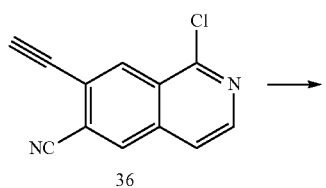

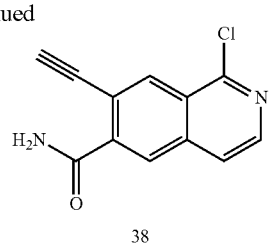

Compound 36 is treated with hydrogen peroxide in the presence of a suitable base to form compound 38. The base may be a carbonate base, such as potassium carbonate or sodium carbonate. The reaction proceeds in a suitable solvent, such as DMSO, and at a temperature of from 20° C. to 50° C. The reaction is quenched with saturated sodium bicarbonate solution and 10% sodium sulfite solution, and compound 38 is isolated.

A fifth reaction step in the alternative exemplary synthesis proceeds according to Scheme 17.

Scheme 17

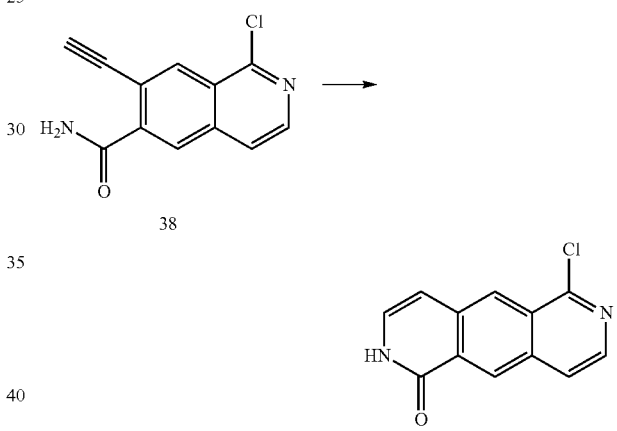

Compound 38 is dissolved in a suitable solvent and treated with chlorocyclopentadienylbis(triphenylphosphine)ruthenium(II). The solvent may be a basic solvent, such as pyridine. The reaction proceeds at a temperature suitable to facilitate the reaction, such as from 60° C. to 125° C., and typically is performed under an inert atmosphere, such as nitrogen or argon. After cooling to room temperature, compound 40 is isolated.

A sixth reaction step in the alternative exemplary synthesis proceeds according to Scheme 18.

Scheme 18

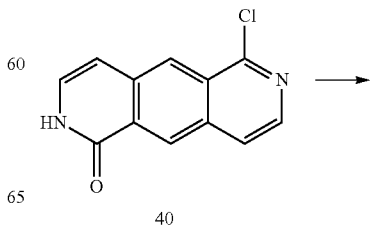

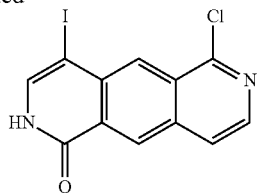

42

Compound 40 is treated with iodine in a suitable solvent and heated at from 30° C. to 75° C. for a time period suitable to facilitate the reaction proceeding towards completion. The solvent may be a basic solvent, such as pyridine, and the time period may be from one day or less to 10 days or more. After dilution, the precipitate is filtered and compound 42 is isolated.

One exemplary synthesis to prepare the disclosed compounds is shown in Scheme 19.

Scheme 19

28

→

44

Compound 28 is treated with an organic tin reagent in the presence of a suitable catalyst to form compound 44. A person of ordinary skill in the art understands that the organic tin reagent is selected to provide a desired $R^1$ moiety. Example organic tin reagents include, but are not limited to, $R^1Sn(n-Bu)_3$ or $R^1SnMe_3$. Catalysts suitable to facilitate the couple reaction include, but are not limited to, palladium catalysts, such as bis(triphenylphosphine)palladium chloride or tetrakis(triphenylphosphine)palladium(0). The reaction also may proceed in the presence of a metal salt, such as lithium chloride. The reaction is performed in an anhydrous solvent, such as DMF, THF, acetonitrile or toluene, and typically in carried out under an inert atmosphere, such as nitrogen or argon. After completion, the reaction mixture is cooled, diluted with a suitable water-immiscible solvent, such as ethyl acetate, and washed with aqueous potassium fluoride solution, and then compound 44 is isolated.

A second exemplary synthesis to prepare the disclosed compounds is shown in Scheme 20.

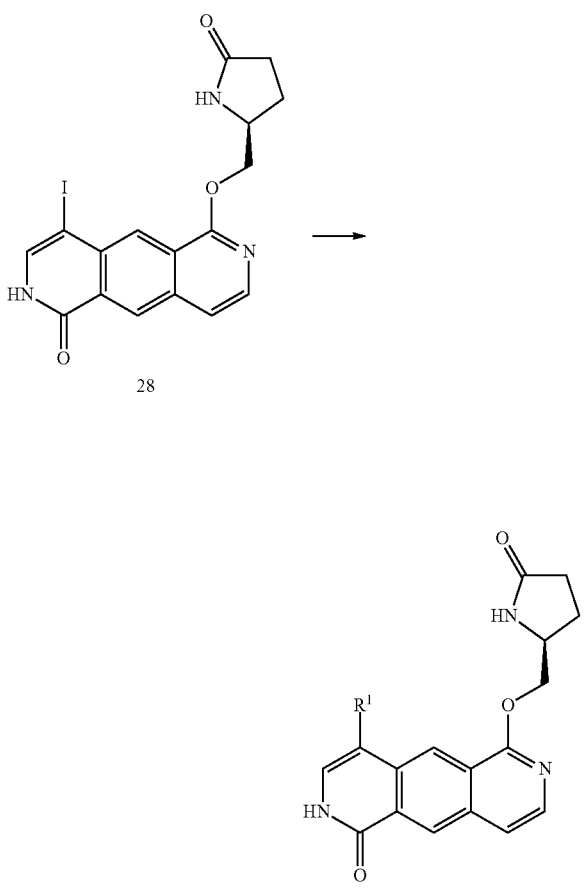

Scheme 20

28

→

46

Compound 28 is treated with an organozinc reagent in the presence of a suitable catalyst to form compound 46. The organozinc reagent is selected to provide a desired $R^1$ moiety, such as $R^1ZnBr$. The catalyst is any catalyst suitable to facilitate the coupling reagent, such as a palladium catalyst, for example, tetrakis(triphenylphosphine)palladium(0) or a combination of palladium acetate and 2'-(dicyclohexylphosphanyl)-$N^2,N^2,N^6,N^6$-tetramethyl [1,1'-biphenyl]-2,6-diamine (CPhos). The reaction is carried out in a suitable anhydrous solvent, such as DMF, THF, acetonitrile, or toluene. And typically the reaction is carried out under an inert atmosphere, such as nitrogen or argon. After agitating for a time period such as from 1 hours to 3 days or more, at a temperature of from 20° C. to 50° C., the reaction is quenched with aqueous saturated sodium bicarbonate solution and 10% sodium sulfite solution, and compound 46 is isolated.

A third exemplary synthesis to prepare the disclosed compounds is shown in Scheme 21.

Scheme 21

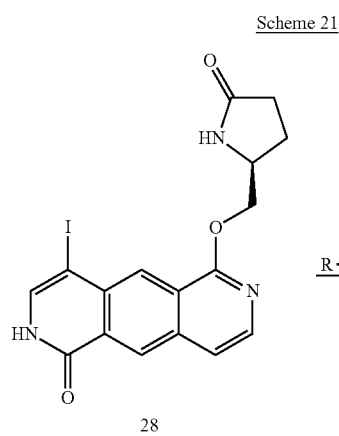

28

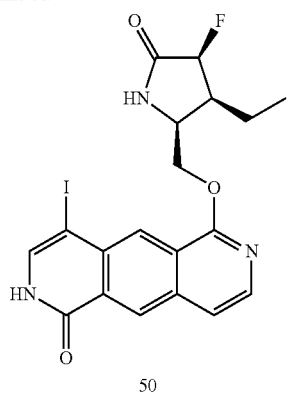

50

Compound 42 is treated with (3S,4S,5S)-4-ethyl-3-fluoro-5-(hydroxymethyl)pyrrolidin-2-one in the presence of potassium bis(trimethylsilyl)amide solution in THF to form compound 50. The reaction is carried out in an anhydrous solvent, such as DMF, THF, acetonitrile, or toluene. After completion, the reaction is quenched with an aqueous solution of sodium dihydrogen phosphate, and compound 50 is isolated.

General method 1 and general method 2 provide additional information to a person of ordinary skill in the art to make certain disclosed compounds, using the using the synthesis described above and in the working examples disclosed herein. Additional information concerning the synthesis of the disclosed compounds can be found in international publication No. WO 2015/150995, which is incorporated herein by reference in its entirety.

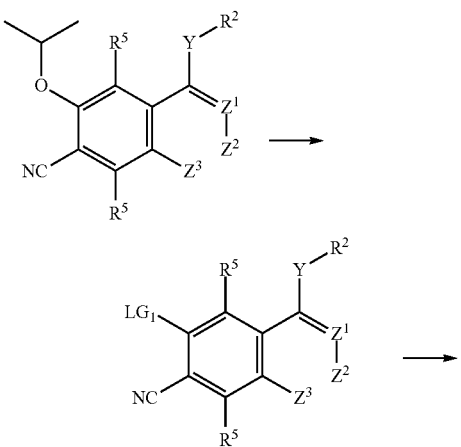

48

Compound 28 is treated with a substituted alkyne in the presence of a palladium catalyst, such as tetrakis(triphenylphosphine) palladium(0), copper (I) iodide and an organic base to form compound 48. The organic base may be a trialkylamine base (for example, triethylamine, or diisopropylethylamine). The reaction is carried out in an anhydrous solvent, such as DMF, THF, acetonitrile, or toluene, and typically in carried out under an inert atmosphere, such as nitrogen or argon. After completion, the reaction mixture is cooled, diluted with a suitable water-immiscible solvent, such as ethyl acetate, and washed with brine, and then compound 48 is isolated.

A fourth exemplary synthesis to prepare the disclosed compounds is shown in Scheme 22.

Scheme 22

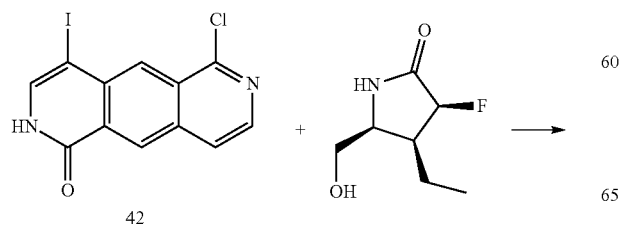

42

General method 1

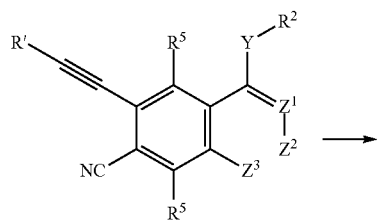

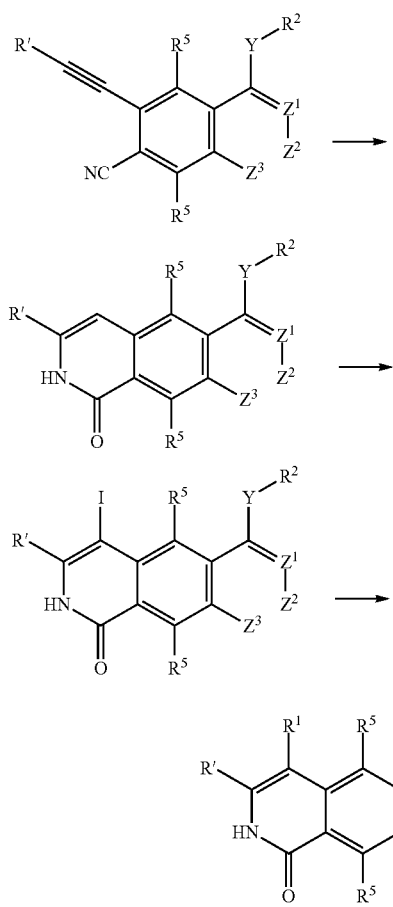

General method 2

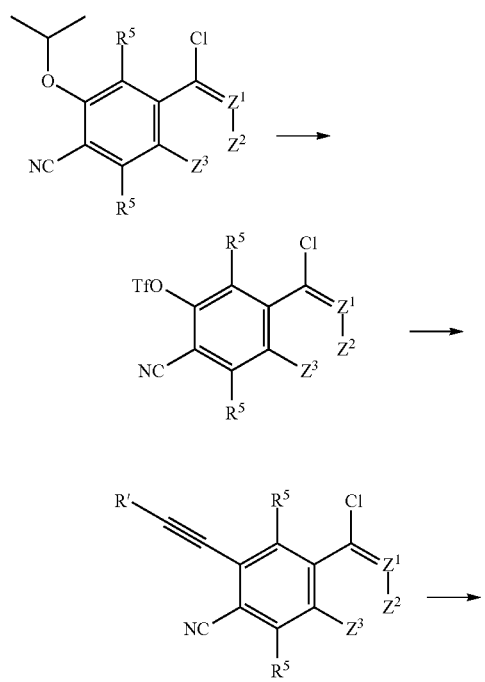

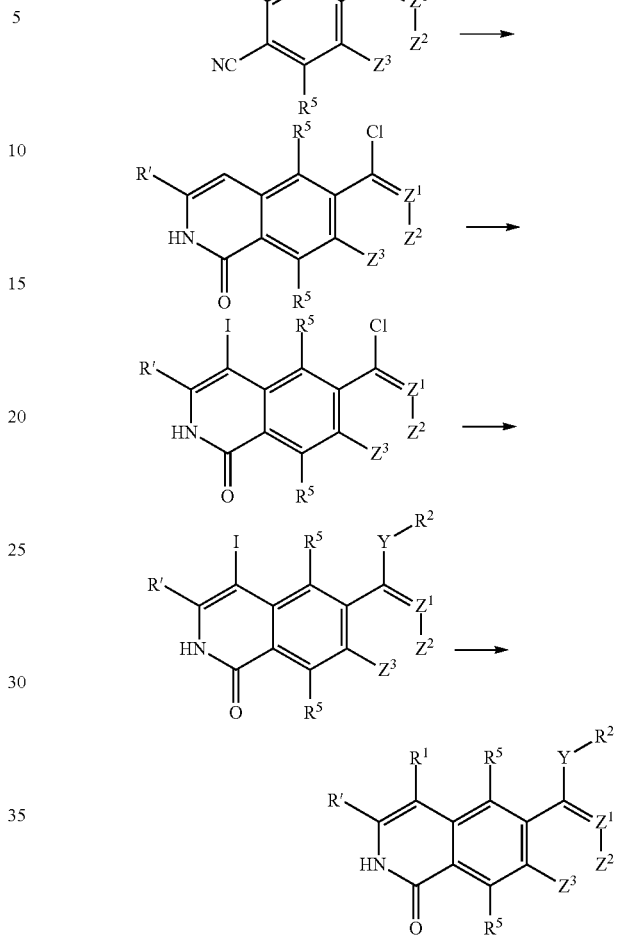

C. Combinations of Therapeutic Agents

The compounds of the present disclosure may be used alone, in combination with one another, in separate pharmaceutical compositions, together in a single composition, or as an adjunct to, or in combination with, other established therapies. The compound or compounds may be administered once, or more likely plural administrations. In another aspect, the compounds of the present disclosure may be used in combination with other therapeutic agents useful for the disorder or condition being treated. These compounds and/or agents may be administered simultaneously, sequentially in any order, by the same route of administration, or by a different route. For sequential administration, the compound(s) and/or agent(s) may be administered such that an effective time period of at least one compound and/or agent overlaps with an effective time period of at least one other compound and/or agent. In an exemplary embodiment of a combination comprising four components, the effective time period of the first component administered may overlap with the effective time periods of the second, third and fourth components, but the effective time periods of the second, third and fourth components independently may or may not overlap with one another. In another exemplary embodiment of a combination comprising four components, the effective time period of the first component administered overlaps with the effective time period of the second component, but not that of the third or fourth; the effective time period of the second component overlaps with those of the first and third components; and the effective time period of the fourth component overlaps with that of the third component only. In some embodiments, the effective time periods of all compounds and/or agents overlap with each other.

In some embodiments, disclosed compounds are administered with another therapeutic agent, such as an analgesic, an antibiotic, an anticoagulant, an antibody, an anti-inflammatory agent, an immunosuppressant, a guanylate cyclase-C agonist, an intestinal secretagogue, an antiviral, anticancer, antifungal, or a combination thereof. The anti-inflammatory agent may be a steroid or a nonsteroidal anti-inflammatory agent. In certain embodiments, the nonsteroidal anti-inflammatory agent is selected from aminosalicylates, cyclooxygenase inhibitors, diclofenac, etodolac, famotidine, fenoprofen, flurbiprofen, ketoprofen, ketorolac, ibuprofen, indomethacin, meclofenamate, mefenamic acid, meloxicam, nambumetone, naproxen, oxaprozin, piroxicam, salsalate, sulindac, tolmetin, or a combination thereof. In some embodiments, the immunosuppressant is mercaptopurine, a corticosteroid, an alkylating agent, a calcineurin inhibitor, an inosine monophosphate dehydrogenase inhibitor, antilymphocyte globulin, antithymocyte globulin, an anti-T-cell antibody, or a combination thereof. In one embodiment, the antibody is infliximab.

In some embodiments, the present compounds may be used with anti-cancer or cytotoxic agents. Various classes of anti-cancer and anti-neoplastic compounds include, but are not limited to, alkylating agents, antimetabolites, BCL-2 inhibitors, vinca alkyloids, taxanes, antibiotics, enzymes, cytokines, platinum coordination complexes, proteasome inhibitors, substituted ureas, kinase inhibitors, hormones and hormone antagonists, and hypomethylating agents, for example DNMT inhibitors, such as azacitidine and decitabine. Exemplary alkylating agents include, without limitation, mechlorothamine, cyclophosphamide, ifosfamide, melphalan, chlorambucil, ethyleneimines, methylmelamines, alkyl sulfonates (e.g., busulfan), and carmustine. Exemplary antimetabolites include, by way of example and not limitation, folic acid analog methotrexate; pyrimidine analog fluorouracil, cytosine arbinoside; purine analogs mercaptopurine, thioguanine, and azathioprine. Exemplary vinca alkyloids include, by way of example and not limitation, vinblastine, vincristine, paclitaxel, and colchicine. Exemplary antibiotics include, by way of example and not limitation, actinomycin D, daunorubicin, and bleomycin. An exemplary enzyme effective as an anti-neoplastic agent includes L-asparaginase. Exemplary coordination compounds include, by way of example and not limitation, cisplatin and carboplatin. Exemplary hormones and hormone related compounds include, by way of example and not limitation, adrenocorticosteroids prednisone and dexamethasone; aromatase inhibitors amino glutethimide, formestane, and anastrozole; progestin compounds hydroxyprogesterone caproate, medroxyprogesterone; and anti-estrogen compound tamoxifen.

These and other useful anti-cancer compounds are described in Merck Index, 13th Ed. (O'Neil M. J. et al., ed.) Merck Publishing Group (2001) and Goodman and Gilman's The Pharmacological Basis of Therapeutics, 12th Edition, Brunton L. L. ed., Chapters 60-63, McGraw Hill, (2011), both of which are incorporated by reference herein.

Among the CTLA 4 antibodies that can be used in combination with the presently disclosed inhibitors is ipilimumab, marketed as YERVOY® by Bristol-Myers Squibb.

Other chemotherapeutic agents for combination include immunooncology agents, such as checkpoint pathway inhibitors, for example, PD-1 inhibitors, such as nivolumab and lambrolizumab, and PD-L1 inhibitors, such as pembrolizumab, MEDI-4736 and MPDL3280A/RG7446. Additional checkpoint inhibitors for combination with the compounds disclosed herein include, Anti-LAG-3 agents, such as BMS-986016 (MDX-1408).

Further chemotherapeutic agents for combination with the presently disclosed inhibitors include Anti-SLAMF7 agents, such as the humanized monoclonal antibody elotuzumab (BMS-901608), anti-KIR agents, such as the anti-KIR monoclonal antibody lirilumab (BMS-986015), and anti-CD137 agents, such as the fully human monoclonal antibody urelumab (BMS-663513).

Additional anti-proliferative compounds useful in combination with the compounds of the present disclosure include, by way of example and not limitation, antibodies directed against growth factor receptors (e.g., anti-Her2); and cytokines such as interferon-α and interferon-γ, interleukin-2, and GM-CSF.

Additional chemotherapeutic agents useful in combination with the present compounds include proteasome inhibitors, such as bortezomib, carfilzomib, marizomib and the like.

Examples of kinase inhibitors that are useful in combination with the presently disclosed compounds, particularly in treating malignancies include: Btk inhibitors, such as ibrutinib; CDK inhibitors, such as palbociclib; EGFR inhibitors, such as afatinib, erlotinib, gefitinib, lapatinib, osimertinib and vandetinib; Mek inhibitors, such as trametinib; Raf inhibitors, such as dabrafenib, sorafenib and vemurafenib; VEGFR inhibitors, such as axitinib, lenvatinib, nintedanib, pazopanib; BCR-Abl inhibitors, such as bosutinib, dasatinib, imatinib and nilotinib; Syk inhibitors, such as fostamatinib; and JAK inhibitors, such as ruxolitinib.

In other embodiments, the second therapeutic agent may be selected from any of the following:

analgesics-morphine, fentanyl, hydromorphone, oxycodone, codeine, acetaminophen, hydrocodone, buprenorphine, tramadol, venlafaxine, flupirtine, meperidine, pentazocine, dextromoramide, dipipanone;

antibiotics-aminoglycosides (e.g., amikacin, gentamicin, kanamycin, neomycin, netilmicin, tobramycin, and paromycin), carbapenems (e.g., ertapenem, doripenem, imipenem, cilastatin, and meropenem), cephalosporins (e.g., cefadroxil, cefazolin, cefalotin, cephalexin, cefaclor, cefamandole, cefoxitin, cefprozil, cefuroxime, cefixime, cefdinir, cefditoren, cefoperazone, cefotaxime, cefpodoxime, ceftazidime, ceftibuten, ceftizoxime, ceftriaxone, cefepime, and cefobiprole), glycopeptides (e.g., teicoplanin, vancomycin, and telavancin), lincosamides (e.g., clindamycin and incomysin), lipopeptides (e.g., daptomycin), macrolides (azithromycin, clarithromycin, dirithromycin, erythromycin, roxithromycin, troleandomycin, telithromycin, and spectinomycin), monobactams (e.g., aztreonam), nitrofurans (e.g., furazolidone and nitrofurantoin), penicillins (e.g., amoxicillin, ampicillin, azlocillin, carbenicillin, cloxacillin, dicloxacillin, flucloxacillin, mezlocillin, methicillin, nafcillin, oxacillin, penicillin G, penicillin V, piperacillin, temocillin, and ticarcillin), penicillin combinations (e.g., amoxicillin/clavulanate, ampicillin/sulbactam, piperacillin/tazobactam, and ticarcillin/clavulanate), polypeptides (e.g., bacitracin, colistin, and polymyxin B), quinolones (e.g., ciprofloxacin, enoxacin, gatifloxacin, levofloxacin, lomefloxacin, moxifloxacin, nalidixic acid, norfloxacin, ofloxacin, trovafloxacin, grepafloxacin, sparfloxacin, and temafloxacin), sulfonamides (e.g., mafenide, sulfonamidochrysoidine, sulfacetamide, sulfadiazine, silver sulfadiazine, sulfamethizole, sulfamethoxazole, sulfanilimide, sulfasalazine, sulfisoxazole, trimethoprim, and trimethoprim-sulfamethoxaxzole), tetracyclines (e.g., demeclocycline, doxycycline, minocycline, oxytetracycline, and tetracycline), antimycobacterial compounds (e.g., clofazimine, dapsone, capreomycin, cycloserine, ethambutol, ethionamide, isoniazid, pyrazinamide, rifampicin (rifampin), rifabutin, rifapentine, and streptomycin), and others, such as arsphenamine, chloramphenicol, fosfomycin, fusidic acid, linezolid, metronidazole, mupirocin, platensimycin, quinuprisin/dalfopristin, rifaximin, thiamphenicol, tigecycline, and timidazole;

antibodies-anti-TNF-α antibodies, e.g., infliximab (Remicade™), adalimumab, golimumab, certolizumab; anti-B cell antibodies, e.g., rituximab; anti-IL-6 antibodies, e.g., tocilizumab; anti-IL-1 antibodies, e.g., anakinra; anti PD-1 and/or anti-PD-L1 antibodies, e.g. nivolumab, pembrolizumab, pidilizumab, BMS-936559, MPDL3280A, AMP-224, MEDI4736; ixekizumab, brodalumab, ofatumumab, sirukumab, clenoliximab, clazakiumab, fezakinumab, fletikumab, mavrilimumab, ocrelizumab, sarilumab, secukinumab, toralizumab, zanolimumab;

anticoagulants-warfarin (Coumadin™), acenocoumarol, phenprocoumon, atromentin, phenindione, heparin, fondaparinux, idraparinux, rivaroxaban, apixaban, hirudin, lepirudin, bivalirudin, argatrobam, dabigatran, ximelagatran, batroxobin, hementin;

anti-inflammatory agents-steroids, e.g., budesonide, nonsteroidal anti-inflammatory agents, e.g., aminosalicylates (e.g., sulfasalazine, mesalamine, olsalazine, and balsalazide), cyclooxygenase inhibitors (COX-2 inhibitors, such as rofecoxib, celecoxib), diclofenac, etodolac, famotidine, fenoprofen, flurbiprofen, ketoprofen, ketorolac, ibuprofen, indomethacin, meclofenamate, mefenamic acid, meloxicam, nambumetone, naproxen, oxaprozin, piroxicam, salsalate, sulindac, tolmetin;

immunosuppressants-mercaptopurine, corticosteroids such as dexamethasone, hydrocortisone, prednisone, methylprednisolone and prednisolone, alkylating agents such as cyclophosphamide, calcineurin inhibitors such as cyclosporine, sirolimus and tacrolimus, inhibitors of inosine monophosphate dehydrogenase (IMPDH) such as mycophenolate, mycophenolate mofetil and azathioprine, and agents designed to suppress cellular immunity while leaving the recipient's humoral immunologic response intact, including various antibodies (for example, antilymphocyte globulin (ALG), antithymocyte globulin (ATG), monoclonal anti-T-cell antibodies (OKT3)) and irradiation. Azathioprine is currently available from Salix Pharmaceuticals, Inc. under the brand name Azasan™; mercaptopurine is currently available from Gate Pharmaceuticals, Inc. under the brand name Purinethol™; prednisone and prednisolone are currently available from Roxane Laboratories, Inc.; Methyl prednisolone is currently available from Pfizer; sirolimus (Rapamycin™) is currently available from Wyeth-Ayerst under the brand name Rapamune™; tacrolimus is currently available from Fujisawa under the brand name Prograf™; cyclosporine is current available from Novartis under the brand name Sandimmune™ and Abbott under the brand name Gengraf™; IMPDH inhibitors such as mycophenolate mofetil and mycophenolic acid are currently available from Roche under the brand name Cellcept™ and Novartis under the brand name Myfortic™; azathioprine is currently available from Glaxo Smith Kline under the brand name Imuran™; and antibodies are currently available from Ortho Biotech under the brand name Orthoclone™, Novartis under the brand name Simulect™ (basiliximab) and Roche under the brand name Zenapax™ (daclizumab); and Guanylate cyclase-C receptor agonists or intestinal secretagogues, for example linaclotide, sold under the name Linzess™.

These various agents can be used in accordance with their standard or common dosages, as specified in the prescribing information accompanying commercially available forms of the drugs (see also, the prescribing information in the 2006 Edition of The Physician's Desk Reference), the disclosures of which are incorporated herein by reference.

D. Compositions Comprising the Disclosed Compounds

The disclosed compounds may be used alone, in any combination, and in combination with, or adjunctive to, at least one second therapeutic agent. In one embodiment, a pharmaceutical composition provided herein comprises a means for inhibiting an IRAK protein and a pharmaceutically acceptable excipient. Means for inhibition of an IRAK protein, including means for selectively inhibiting IRAK4, will be readily apparent to those of skill in the art upon consideration of the present disclosure. Accordingly, in one embodiment a disclosed composition comprises a means for selectively inhibiting IRAK4 and a pharmaceutically acceptable excipient.

Furthermore, the disclosed compound or compounds, with or without at least one second therapeutic, may be used in combination with any suitable excipient useful for forming compositions for administration to a subject. Excipients can be included in pharmaceutical compositions for a variety of purposes, such as to dilute a composition for delivery to a subject, to facilitate processing of the formulation, to provide advantageous material properties to the formulation, to facilitate dispersion from a delivery device, to stabilize the formulation (e.g., antioxidants or buffers), to provide a pleasant or palatable taste or consistency to the formulation, or the like. The pharmaceutically acceptable excipient(s) may include a pharmaceutically acceptable carrier(s) and/or a pharmaceutically acceptable adjuvant(s). Exemplary excipients include, but are not limited to: mono-, di-, and polysaccharides, sugar alcohols and other polyols, such as, lactose, glucose, raffinose, melezitose, lactitol, maltitol, trehalose, sucrose, mannitol, starch, or combinations thereof; surfactants, such as sorbitols, diphosphatidyl choline, and lecithin; bulking agents; buffers, such as phosphate and citrate buffers; anti-adherents, such as magnesium stearate; binders, such as saccharides (including disaccharides, such as sucrose and lactose,), polysaccharides (such as starches, cellulose, microcrystalline cellulose, cellulose ethers (such as hydroxypropyl cellulose)), gelatin, synthetic polymers (such as polyvinylpyrrolidone, polyalkylene glycols); coatings (such as cellulose ethers, including hydroxypropylmethyl cellulose, shellac, corn protein zein, and gelatin); release aids (such as enteric coatings); disintegrants (such as crospovidone, crosslinked sodium carboxymethyl cellulose, and sodium starch glycolate); fillers (such as dibasic calcium phosphate, vegetable fats and oils, lactose, sucrose, glucose, mannitol, sorbitol, calcium carbonate, and magnesium stearate); flavors and sweeteners (such as mint, cherry, anise, peach, apricot or licorice, raspberry, and vanilla); lubricants (such as minerals, exemplified by talc or silica, fats, exemplified by vegetable stearin, magnesium stearate or stearic acid); preservatives (such as antioxidants exemplified by vitamin A, vitamin E, vitamin C, retinyl palmitate, and selenium, amino acids, exemplified by cysteine and methionine, citric acid and sodium citrate, parabens, exemplified by methyl paraben and propyl paraben); colorants; compression aids; emulsifying agents; encapsulation agents; gums; granulation agents; and combinations thereof.

III. Methods of Use

A. Diseases/Disorders

The disclosed compounds, as well as combinations and/or compositions thereof, may be used to ameliorate, treat, and/or prevent a variety of diseases, conditions, and/or disorders. In particular embodiments, the disclosed compound, combinations of disclosed compounds, or compositions thereof, may be useful for treating conditions in which inhibition of an interleukin-1 receptor-associated kinase (IRAK) pathway is therapeutically useful. In some embodiments, the compounds directly inhibit an IRAK protein, such as IRAK1, IRAK2, IRAK3 and/or IRAK4. In certain embodiments, disclosed compounds are useful for treating, preventing, and/or ameliorating auto-immune diseases, inflammatory disorders, cardiovascular diseases, nerve disorders, neurodegenerative disorders, allergic disorders, asthma, pancreatitis, multi-organ failure, kidney diseases, platelet aggregation, cancer, transplantation, sperm motility, erythrocyte deficiency, graft rejection, lung injuries, respiratory diseases, ischemic conditions, and bacterial and viral infections.

In some embodiments, the disclosed compound, combinations of disclosed compounds, or compositions thereof, may be used to treat or prevent allergic diseases, amyotrophic lateral sclerosis (ALS), systemic lupus erythematosus, rheumatoid arthritis, type I diabetes mellitus, inflammatory bowel disease, biliary cirrhosis, uveitis, multiple sclerosis, Crohn's disease, ulcerative colitis, bullous pemphigoid, sarcoidosis, psoriasis, autoimmune myositis, Wegener's granulomatosis, ichthyosis, Graves ophthalmyopathy, or asthma.

The disclosed compound, combinations of disclosed compounds, or compositions thereof, may also be useful for ameliorating, treating, and/or preventing immune regulatory disorders related to bone marrow or organ transplant rejection or graft-versus-host disease. Examples of inflammatory and immune regulatory disorders that can be treated with the present compounds include, but are not limited to, transplantation of organs or tissue, graft-versus-host diseases brought about by transplantation, autoimmune syndromes including rheumatoid arthritis, lupus, such as lupus erythematosus, cutaneous lupus, systemic lupus erythematosus, discoid lupus, Hashimoto's thyroiditis, multiple sclerosis, systemic sclerosis, myasthenia gravis, type I diabetes, uveitis, posterior uveitis, allergic encephalomyelitis, glomerulonephritis, postinfectious autoimmune diseases including rheumatic fever and post-infectious glomerulonephritis, inflammatory and hyperproliferative skin diseases, psoriasis, dermatitis, such as atopic dermatitis, contact dermatitis, eczematous dermatitis and seborrhoeic dermatitis, lichen planus, pemphigus, bullous pemphigoid, epidermolysis bullosa, urticaria, angioedemas, vasculitis, erythema, cutaneous eosinophilia, acne, alopecia areata, keratoconjunctivitis, vernal conjunctivitis, uveitis associated with Behcet's disease, keratitis, herpetic keratitis, conical cornea, dystrophia epithelialis corneae, corneal leukoma, ocular pemphigus, Mooren's ulcer, scleritis, Graves' opthalmopathy, Vogt-Koyanagi-Harada syndrome, sarcoidosis, pollen allergies, reversible obstructive airway disease, bronchial asthma, allergic asthma, intrinsic asthma, extrinsic asthma, dust asthma, chronic or inveterate asthma, late asthma and airway hyper-responsiveness, bronchitis, gastric ulcers, vascular damage caused by ischemic diseases and thrombosis, ischemic bowel diseases, inflammatory bowel diseases, necrotizing enterocolitis, intestinal lesions associated with thermal burns, celiac diseases, proctitis, eosinophilic gastroenteritis, mastocytosis, Crohn's disease, ulcerative colitis, migraine, rhinitis, eczema, interstitial nephritis, Goodpasture's syndrome, hemolytic-uremic syndrome, diabetic nephropathy, multiple myositis, Guillain-Barre syndrome, Meniere's disease, polyneuritis, multiple neuritis, mononeuritis, radiculopathy, hyperthyroidism, Basedow's disease, pure red cell aplasia, aplastic anemia, hypoplastic anemia, idiopathic thrombocytopenic purpura, autoimmune hemolytic anemia, agranulocytosis, pernicious anemia, megaloblastic anemia, anerythroplasia, osteoporosis, sarcoidosis, fibroid lung, idiopathic interstitial pneumonia, dermatomyositis, leukoderma vulgaris, ichthyosis vulgaris, photoallergic sensitivity, cutaneous T cell lymphoma, chronic lymphocytic leukemia, arteriosclerosis, atherosclerosis, aortitis syndrome, polyarteritis nodosa, myocardosis, scleroderma, Wegener's granuloma, Sjögren's syndrome, adiposis, eosinophilic fascitis, lesions of gingiva, periodontium, alveolar bone, substantia ossea dentis, glomerulonephritis, male pattern alopecia or alopecia senilis by preventing epilation or providing hair germination and/or promoting hair generation and hair growth, muscular dystrophy, pyoderma and Sezary's syndrome, Addison's disease, ischemia-reperfusion injury of organs which occurs upon preservation, transplantation or ischemic disease, endotoxin-shock, pseudomembranous colitis, colitis caused by drug or radiation, ischemic acute renal insufficiency, chronic renal insufficiency, toxinosis caused by lung-oxygen or drugs, lung cancer, pulmonary emphysema, cataracta, siderosis, retinitis pigmentosa, senile macular degeneration, vitreal scarring, corneal alkali burn, dermatitis erythema multiforme, linear IgA bullous dermatitis and cement dermatitis, gingivitis, periodontitis, sepsis, pancreatitis, diseases caused by environmental pollution, aging, carcinogenesis, metastasis of carcinoma and hypobaropathy, disease caused by histamine or leukotriene-C4 release, Behcet's disease, autoimmune hepatitis, primary biliary cirrhosis, sclerosing cholangitis, partial liver resection, acute liver necrosis, necrosis caused by toxin, viral hepatitis, shock, or anoxia, B-virus hepatitis, non-A/non-B hepatitis, cirrhosis, alcoholic liver disease, including alcoholic cirrhosis, non-alcoholic steatohepatitis (NASH), hepatic failure, fulminant hepatic failure, late-onset hepatic failure, "acute-on-chronic" liver failure, augmentation of chemotherapeutic effect, cytomegalovirus infection, HCMV infection, AIDS, cancer, senile dementia, Parkinson's disease, trauma, chronic bacterial infection, palmoplantar pustulosis, hidradenitis suppurativa, cytokine release syndrome (CRS), acute respiratory distress syndrome (ARDS), acute kidney injury (AKI), kidney malfunction, or thrombosis.

In some embodiments, the disease or condition is hidradenitis suppurativa, or a lymphoid neoplasm selected from myeloproliferative neoplasms (MPN) excluding polycythemia vera, myeloid/lymphoid neoplasms with PDGFRA rearrangement, myeloid/lymphoid neoplasms with PDGFRB rearrangement, myeloid/lymphoid neoplasms with FGFR1 rearrangement, myeloid/lymphoid neoplasms with PCM1-JAK2, myelodysplastic/myeloproliferative neoplasms (MDS/MPN), myeloid sarcoma, myeloid proliferations related to Down syndrome, blastic plasmacytoid dendritic cell neoplasm, B-lymphoblastic leukemia/lymphoma; and/or T-lymphoblastic leukemia/lymphoma. In some embodiments, the lymphoid neoplasm is a myeloproliferative neoplasm selected from chronic myeloid leukemia (CML), chronic neutrophilic leukemia (CNL), primary myelofibrosis (PMF), essential thrombocythemia, chronic eosinophilic leukemia, or a combination thereof. In other embodiments, the lymphoid neoplasm is a myelodysplastic/myeloproliferative neoplasm selected from chronic myelomonocytic leukemia, atypical chronic myeloid leukemia (aCML), juvenile myelomonocytic leukemia (JMML), MDS/MPN with ring sideroblasts and thrombocytosis (MDS/MPN-RS-T), or a combination thereof.

In certain embodiments the present compounds are useful for treating nerve pain, including neuropathic pain and inflammation induced pain.

In certain embodiments, the disclosed compound, combinations of disclosed compounds, or compositions thereof, are useful for treating and/or preventing rheumatoid arthritis, psoriatic arthritis, osteoarthritis, systemic lupus erythematosus, lupus nephritis, ankylosing spondylitis, osteoporosis, systemic sclerosis, multiple sclerosis, psoriasis, in particular pustular psoriasis, type I diabetes, type II diabetes, inflammatory bowel disease (Crohn's disease and ulcerative colitis), hyperimmunoglobulinemia d and periodic fever syndrome, cryopyrin-associated periodic syndromes, Schnitzler's syndrome, systemic juvenile idiopathic arthritis, adult's onset Still's disease, gout, gout flares, pseudogout, sapho syndrome, Castleman's disease, sepsis, stroke, atherosclerosis, celiac disease, DIRA (deficiency of Il-1 receptor antagonist), Alzheimer's disease, or Parkinson's disease.

Proliferative diseases that may be treated by the disclosed compound, combinations of disclosed compounds, or compositions thereof, include benign or malignant tumors, solid tumor, carcinoma of the brain, kidney, liver, adrenal gland, bladder, breast, stomach, gastric tumors, ovaries, colon, rectum, prostate, pancreas, lung, vagina, cervix, testis, genitourinary tract, esophagus, larynx, skin, bone or thyroid, sarcoma, glioblastomas, neuroblastomas, multiple myeloma, gastrointestinal cancer, especially colon carcinoma or colorectal adenoma, a tumor of the neck and head, an epidermal hyperproliferation, psoriasis, prostate hyperplasia, a neoplasia, a neoplasia of epithelial character, adenoma, adenocarcinoma, keratoacanthoma, epidermoid carcinoma, large cell carcinoma, non-small-cell lung carcinoma, lymphomas, Hodgkins and Non-Hodgkins, a mammary carcinoma, follicular carcinoma, undifferentiated carcinoma, papillary carcinoma, seminoma, melanoma, IL-1 driven disorders, a MyD88 driven disorder (such as ABC diffuse large B-cell lymphoma (DLBCL), Waldenström's macroglobulinemia, Hodgkin's lymphoma, primary cutaneous T-cell lymphoma or chronic lymphocytic leukemia), smoldering or indolent multiple myeloma, or hematological malignancies (including leukemia, acute myeloid leukemia (AML), DLBCL, ABC DLBCL, chronic lymphocytic leukemia (CLL), chronic lymphocytic lymphoma, primary effusion lymphoma, Burkitt lymphoma/leukemia, acute lymphocytic leukemia, B-cell prolymphocytic leukemia, lymphoplasmacytic lymphoma, myelodysplastic syndromes (MDS), myelofibrosis, polycythemia vera, Kaposi's sarcoma, Waldenström's macroglobulinemia (WM), splenic marginal zone lymphoma, multiple myeloma, plasmacytoma, intravascular large B-cell lymphoma). In particular, the presently disclosed compounds are useful in treating drug resistant malignancies, such as those resistant to JAK inhibitors ibrutinib resistant malignancies, including ibrutinib resistant hematological malignancies, such as ibrutinib resistant CLL and ibrutinib resistant Waldenström's macroglobulinemia.

Examples of allergic disorders that may be treated using the disclosed compound, combinations of disclosed compounds, or compositions thereof, include, but are not limited to, asthma (e.g. atopic asthma, allergic asthma, atopic bronchial IgE-mediated asthma, non-atopic asthma, bronchial asthma, non-allergic asthma, essential asthma, true asthma, intrinsic asthma caused by pathophysiologic disturbances, essential asthma of unknown or unapparent cause, emphysematous asthma, exercise-induced asthma, emotion-induced asthma, extrinsic asthma caused by environmental factors, cold air induced asthma, occupational asthma, infective asthma caused by or associated with bacterial, fungal, protozoal, or viral infection, incipient asthma, wheezy infant syndrome, bronchiolitis, cough variant asthma or drug-induced asthma), allergic bronchopulmonary aspergillosis (ABPA), allergic rhinitis, perennial allergic rhinitis, perennial rhinitis, vasomotor rhinitis, post-nasal drip, purulent or non-purulent sinusitis, acute or chronic sinusitis, and ethmoid, frontal, maxillary, or sphenoid sinusitis.

As another example, rheumatoid arthritis (RA) typically results in swelling, pain, loss of motion and tenderness of target joints throughout the body. RA is characterized by chronically inflamed synovium that is densely crowded with lymphocytes. The synovial membrane, which is typically one cell layer thick, becomes intensely cellular and assumes a form similar to lymphoid tissue, including dendritic cells, T-, B- and NK cells, macrophages and clusters of plasma cells. This process, as well as a plethora of immunopathological mechanisms including the formation of antigen-immunoglobulin complexes, eventually result in destruction of the integrity of the joint, resulting in deformity, permanent loss of function and/or bone erosion at or near the joint. The disclosed compound, combinations of disclosed compounds, or compositions thereof, may be used to treat, ameliorate, or prevent any single, several or all of these symptoms of RA. Thus, in the context of RA, the compounds are considered to provide therapeutic benefit when a reduction or amelioration of any of the symptoms commonly associated with RA is achieved, regardless of whether the treatment results in a concomitant treatment of the underlying RA and/or a reduction in the amount of circulating rheumatoid factor ("RF").

The American College of Rheumatology (ACR) has developed criteria for defining improvement and clinical remission in RA. Once such parameter, the ACR20 (ACR criteria for 20% clinical improvement), requires a 20% improvement in the tender and swollen joint count, as well as a 20% improvement in 3 of the following 5 parameters: patient's global assessment, physician's global assessment, patient's assessment of pain, degree of disability, and level of acute phase reactant. These criteria have been expanded for 50% and 70% improvement in ACR50 and ACR70, respectively. Other criteria include Paulu's criteria and radiographic progression (e.g. Sharp score).

In some embodiments, therapeutic benefit in patients suffering from RA is achieved when the patient exhibits an ACR20. In specific embodiments, ACR improvements of ACRC50 or even ACR70 may be achieved.

Cytokine release syndrome (CRS) is a potentially life-threatening condition that may result from a variety of factors, including severe viral infections such as influenza, administration of antibodies that are used for immunotherapy, such as cancer immunotherapy, and non-protein-based cancer drugs such as oxaliplatin and lenalidomide. Immunotherapy can involve high levels of immune activation that exceed naturally occurring immune activation levels, and CRS is a non-antigen specific toxicity that can occur as a result. As immune-based therapies become more potent, CRS is becoming increasing diagnosed. CRS has also been observed in the setting of haploidentical donor stem cell transplantation, and graft-versus-host disease. Shimabukuro-Vornhagen et al., *Journal for ImmunoTherapy of Cancer* 6:56 (2018). CRS is associated with elevated circulating levels of several cytokines including interleukin (IL)-6 and interferon γ. Lee et al., *Blood* 124(2):188-195 (10 Jul. 2014; Epub 29 May 2014).

CRS typically is clinically observed when significant numbers of lymphocytes and/or myeloid cells are activated and release inflammatory cytokines. The cytokine release may be induced by chemo- or biotherapy, and/or may be associated with therapeutic antibody treatments, such as immunotherapy, for example, for cancer treatment. Exemplary immunotherapies that may result in CRS include, but are not limited to, therapies where the cells express recombinant receptors, such as chimeric antigen receptors (CARs) and/or other transgenic receptors such as T cell receptors (TCRs). CRS induced by CAR T therapy generally occurs within days of T cell infusion at the peak of CAR T cell expansion. Giavridis et al., *Nat Med.* 24(6):731-738 (June 2018; Epub 28 May 2018). Examples of CAR T therapy that can induce CRS include axicabtagene ciloleucel (marketed as YESCARTA®) and tisagenlecleucel (marketed as KYMRIAH®).

Highly elevated interleukin 6 (IL-6) levels have been observed in patients with CRS and also in murine models of the disease, indicating that IL-6 may have a role in CRS pathophysiology. Shimabukuro-Vornhagen, *J Immunother Cancer* 6(1), 56 (2018). IL-6 can signal via two different modes. Classical IL-6 signaling involves binding of IL-6 to a membrane-bound IL-6 receptor. However, the IL-6 receptor does not possess intracellular signaling domains. Instead, after soluble IL-6 binds to membrane-bound IL-6 receptors, the IL-6/IL-6 receptor complex binds to membrane-bound gp130, which initiates signaling through its intracellular domain. In trans-signaling, IL-6 binds to a soluble form of the IL-6 receptor, which is typically cleaved from the cell surface by metalloproteinases. The resulting soluble IL-6/IL-6 receptor complex binds to gp130 and therefore can also induce signaling in cell types that do not express membrane bound IL-6 receptors.

IL-6 contributes to many of the key symptoms of CRS. Via trans-signaling, IL-6 leads to characteristic symptoms of severe CRS, such as vascular leakage, and activation of the complement and coagulation cascade inducing disseminated intravascular coagulation (DIC). In addition, IL-6 likely contributes to cardiomyopathy that is often observed in patients with CRS by promoting myocardial dysfunction. In a murine model, CRS developed within 2-3 days of CAR T cell infusion and could be lethal. Giavridis et al., *Nat Med.* 24(6): 731-738 (2018). CRS symptoms may start within minutes or hours of the start of antibody treatment, and can include a fever, which may reach or exceed 40° C., nausea, fatigue, headache, tachycardia, hypotension, rash, shortness of breath, and/or myalgias. However, in certain cases, additional and potentially more serious complications may develop, including cardiac dysfunction, adult respiratory distress syndrome, neurological toxicity, renal and/or hepatic failure, and/or disseminated intravascular coagulation.

The National Cancer Institute Common Terminology Criteria for Adverse Events (CTCAE v. 5.0, pub. Nov. 27, 2017) includes a grading system for CRS.

Grade 1: Fever with or without constitutional symptoms.
Grade 2: Hypotension responding to fluids; hypoxia responding to <40% $O_2$.
Grade 3: Hypotension managed with one pressor; hypoxia requiring ≥40% $O_2$.
Grade 4: Life-threatening consequences; urgent intervention indicated.
Grade 5: Death.

The subject may not exhibit a sign or symptom of CRS and/or may be at risk of developing CRS. In such embodiments, administering the compound substantially prevents the onset of CRS, or prevents the onset of grade 2 or higher CRS.

Alternatively, the subject exhibits at least one sign or symptom of CRS and may exhibit at least one sign or symptom of grade 1 CRS. Or the subject may exhibit at least one sign or symptom of grade 2 or higher CRS, such as grade 3 or higher CRS. The disclosed compound(s) may be administered within 24 hours of the onset of the sign or symptom, and/or administering the compound(s) may ameliorate the sign or symptom of CRS, compared to the severity of the sign or symptom prior to administration of the compound(s), such as reducing the grade of CRS from 4 to 3, 2 or 1, or from 3, to 2 or 1, or from 2 to 1. Alternatively, CRS symptoms are substantially reduced to below grade 1 level, such that the subject no longer experiences symptoms associated with CRS. In some embodiments the sign or symptom is a fever and may be a fever of 40° C. or higher.

The disclosed compound(s)s may be administered to a subject that has previously be administered a first therapy for which CRS is a known, suspected, or potential side effect. Administration of the first therapy may be initiated from greater than zero to 10 days prior to administration of the compound(s). Alternatively, the compound(s) may be administered to a subject who will be, or is concurrently being, administered a first therapy for which CRS is a known, suspected, and/or potential side effect. The first therapy may comprise a cell therapy, including, but not limited to, chimeric antigen receptor (CAR)-expressing therapy and/or a transgenic receptor therapy. Cell-free antibodies are also known to elicit this syndrome, particularly those that activate T-cells, including, but not limited to, CAMPATH 1-H, blinatumomab, and/or rituximab.

A second therapeutic agent, for example, a steroid, an anti-inflammatory agent, an immunosuppressant, or a combination thereof, also may be administered to treat or prevent CRS. The steroid may be a corticosteroid, such as, for example, dexamethasone or prednisone, or a combination thereof. The disclosed compound(s) may be administered substantially simultaneously with the second therapeutic agent, or the compound(s) and second therapeutic agent may be administered sequentially in any order.

Acute respiratory distress syndrome (ARDS) is a syndrome characterized by a severe shortness of breath, labored and unusually rapid breathing, low blood pressure, confusion and extreme tiredness. This syndrome can be diagnosed based on a $PaO_2/FiO_2$ ratio of less than 300 mmHg despite a PEEP of more than 5 cm $H_2O$ (Fan et al JAMA. 319: 698-71).

ARDS occurs when fluid builds up in lung alveoli. The fluid prevents the lungs from filling with enough air, limiting the amount of oxygen that reaches the bloodstream which, in turn, deprives the organs of the oxygen they need to function. The symptoms of ARDS can vary in intensity, depending on its cause and severity. Severe shortness of breath—the hallmark of ARDS—usually develops within a few hours to a few days after the infection by some respiratory viruses, e.g., COVID-19 and influenza. Many people who develop ARDS do not survive, and the risk of death increases with age and severity of illness. Of the patients that survive ARDS, some completely recover while others have lasting damage to their lungs. ARDS may be referred to as Acute Lung Injury (ALI) in some publications.

Acute kidney injury (AKI), also known as acute renal injury (ARI) or acute renal failure (ARF), is a syndrome characterized by an abrupt reduction of renal function including, e.g., the ability to excrete waste from a patient's blood. AKI is characterized by a decline of glomerular filtration rate, urine output, or both. This loss of filtration capacity results in retention of nitrogenous (urea and creatinine) and non-nitrogenous waste products that are normally excreted by the kidney, a reduction in urine output, or both. AKI may be categorized as prerenal, intrinsic renal, or postrenal in causation. Intrinsic renal disease can be further divided into glomerular, tubular, interstitial, and vascular abnormalities. AKI is accompanied by an inflammatory response that if unchecked can lead to renal fibrosis and chronic renal failure. AKI usually occurs over a period of hours or days and is potentially reversible. AKI may be characterized as an abrupt (i.e., for example, within 14 days, within 7 days, within 72 hours, or within 48 hours) reduction in kidney function identified by an absolute increase in serum creatinine of greater than or equal to 0.3 mg/dl ($\geq 26.4$ µmol/l), a percentage increase in serum creatinine of greater than or equal to 50% (1.5-fold from baseline), or a reduction in urine output (documented oliguria of less than 0.5 ml/kg per hour for at least 6 hours). Risk factors include, for example, a subject undergoing or having undergone major vascular surgery, coronary artery bypass, or other cardiac surgery; a subject having pre-existing congestive heart failure, preeclampsia, eclampsia, diabetes mellitus, hypertension, coronary artery disease, proteinuria, renal insufficiency, glomerular filtration below the normal range, cirrhosis, serum creatinine above the normal range, or sepsis; or a subject exposed to NSAIDs, cyclosporines, tacrolimus, aminoglycosides, foscarnet, ethylene glycol, hemoglobin, myoglobin, ifosfamide, heavy metals, methotrexate, radiopaque contrast agents, or streptozotocin. This list is not meant to be limiting.

Kidney malfunction includes, but is not limited to, kidney disorders, kidney disease, kidney dysfunction, kidney cancer, absence of at least one kidney due to accidents, surgical removal or genetic disorders, or other conditions where one or both of the kidneys are not properly functioning. Kidney malfunction may include acute kidney injury.

Thrombosis is a clotting disorder to which an excess of platelets contributes. Thrombosis may refer to the formation of a thrombus (blood clot) inside a blood vessel. The term encompasses, without limitation, arterial and venous thrombosis, including deep vein thrombosis, portal vein thrombosis, jugular vein thrombosis, renal vein thrombosis, stroke, myocardial infarction, Budd-Chiari syndrome, Paget-Schroetter disease, and cerebral venous sinus thrombosis. In some embodiments, the patient is at heightened risk relative to the general population (e.g., as measured by recognized risk factors) of a thrombotic event. In some embodiments, a patient has one or more risk factors that make the patient have a high risk of developing thrombosis relative to the general population. Risk factors for thrombosis include, e.g., classical cardiovascular disease risk factors: hyperlipidemia, smoking, diabetes, hypertension, and abdominal obesity; strong classical venous thromboembolism risk factors: trauma or fractures, major orthopedic surgery, and oncological surgery; moderate classical venous thromboembolism risk factors: non-oncological surgery, oral contraceptives and hormone replacement therapy, pregnancy and puerperium, hypercoagulability, and previous venous thromboembolism; and weak classical venous thromboembolism risk factors: age, bed rest (>3 days), prolonged travel, and metabolic syndrome. Additional risk factors include inherited, acquired and mixed coagulation or metabolic risk factors for thrombosis such as, e.g., inherited: antithrombin deficiency, protein C deficiency, Protein S deficiency, Factor V Leiden, Prothrombin G20210A; acquired: antiphospholipid syndrome; mixed: hyperhomocysteinaemia, increased fibrinogen levels, increased factor VIII levels, increased factor IX levels. In some cases, the use of heparin may increase the risk of thrombosis including, e.g., heparin-induced thrombocytopenia (HIT). Diseases and conditions associated with thrombosis include, without limitation, acute venous thrombosis, pulmonary embolism, thrombosis during pregnancy, hemorrhagic skin necrosis, acute or chronic disseminated intravascular coagulation (DIC), sepsis induced coagulopathy (SIC), clot formation from surgery, long bed rest, long periods of immobilization, venous thrombosis, fulminant meningococcemia, acute thrombotic stroke, acute coronary occlusion, acute peripheral arterial occlusion, massive pulmonary embolism, axillary vein thrombosis, massive iliofemoral vein thrombosis, occluded arterial cannulae, occluded venous cannulae, cardiomyopathy, venoocclusive disease of the liver, hypotension, decreased cardiac output, decreased vascular resistance, pulmonary hypertension, diminished lung compliance, leukopenia, thrombocytopenia (e.g., immune thrombocytopenia), and immune thrombocytic purpura. In a subject at risk for thrombosis, the subject may be monitored using methods known to those of skill in the art of maintaining hemostasis in patients at risk for thrombosis. Examples of methods for monitoring patients at risk of thrombosis included, without limitation, digital subtraction angiography, in vitro assays or non-invasive methods. Examples of in vitro assays useful for identifying and monitoring subjects at risk for thrombosis and for treatment using the present methods include, without limitation, functional assays and antibody detection assays.

Thrombotic event refers to any disorder which involves a blockage or partial blockage of an artery or vein with a thrombosis. A thrombotic event includes, but is not limited to, thrombotic disorders such as myocardial infarction, unstable angina, stroke, pulmonary embolism, transient ischemic attack, deep vein thrombosis, thrombotic re-occlusion and peripheral vascular thrombosis. A thrombotic event also includes thrombotic re-occlusion which occurs subsequent to a coronary intervention procedure or thrombolytic therapy.

COVID-19 is a disease caused by infection by SARS-CoV-2 (previously known as 2019-nCoV).

COVID-19-associated ARDS refers to ARDS that is caused by infection by SARS-CoV-2. Patients having COVID-19-associated ARDS may have been diagnosed as having a COVID-19, may have been exposed to another person having a COVID19, or may be suspected of having a COVID-19 based on their symptoms.

COVID-19-associated AKI refers to AKI that is caused by infection by SARS-CoV-2. Patients having COVID-19-associated AKI may have been diagnosed as having a COVID-19, may have been exposed to another person having a COVID-19, or may be suspected of having a COVID-19 based on their symptoms. In some cases, COVID-19-associated AKI includes AKI with the symptoms described, e.g., in Batle et al. J. AM. SOC. NEPHROL. 2020, 31(7): 1380-1383 and Gabarre et al. Intensive Care Med. 2020, 46(7): 1339-1348, the disclosures of which are incorporated herein by reference in their entireties.

COVID-19-associated thrombosis refers to thrombosis that is caused by infection by SARS-CoV-2. Patients having COVID-19-associated thrombosis may have been diagnosed as having a COVID-19, may have been exposed to another person having a COVID-19, or may be suspected of having a COVID-19 based on their symptoms. In some cases, COVID-19-associated thrombosis includes any of the symptoms described in, e.g., Connors et al. Blood 2020, 135(23): 2033-2040 and Bikdeli et al. J. Am. Coll. Cardiol. 2020, 75(23): 2950-73, the disclosures of which are incorporated herein by reference in their entireties.

The term "associated with COVID-19" refers to a symptom or indication that typically develops within 28 days of hospitalization due to/signs of COVID-19.

For COVID-19-associated ARDS, successful treatment may include a decrease in shortness of breath, less labored or less rapid breathing, higher blood pressure, decreased confusion and/or a decrease tiredness. A treatment may be administered prophylactically, i.e., before the onset of ARDS. A prophylactic treatment prevents ARDS and can be administered to patients that have or are suspected of having a COVID-19 infection, but without the severe symptoms of ARDS. For example, prophylactic treatment can be administered to patients that have a cough without the other symptoms of ARDS.

For COVID-19-associated AKI, successful treatment may include increased kidney function. Kidney function may be assessed by measuring serum creatinine levels, serum creatinine clearance, or blood urea nitrogen levels. In some cases, the successful treatment includes a reduction in metabolic acidosis, hyperkalaemia, oliguria or anuria, azotemia, restoration in body fluid balance, and improved effects on other organ systems. A treatment may be administered prophylactically, i.e., before the onset of AKI. A prophylactic treatment prevents AKI and can be administered to patients that have or are suspected of having a COVID-19 infection, but without the severe symptoms of AKI. For example, prophylactic treatment can be administered to patients that have one or more of increased serum or urine creatinine, hematuria, hypoproteinemia, decreased antithrombin III levels, hypalbuminaemia, leucozyturia, or proteinuria without the other symptoms of AKI.

For COVID-19-associated thrombosis, successful treatment may include improvement in the subject's coagulation profile, or preventing, slowing, delaying, or arresting, a worsening of the coagulation profile for which the subject is at risk. A coagulation profile may be assessed by measurement of one or more coagulation parameters including, e.g., a subject's serum level of one or more of D-dimer, Factor II, Factor V (e.g., Factor V Leiden), Factor VII, Factor VIII, Factor IX, Factor XI, Factor XII, Factor XIII, F/fibrin degradation products, thrombin-antithrombin 111 complex, fibrinogen, plasminogen, prothrombin, and von Willebrand factor. Additional coagulation parameters that may be measured for the coagulation profile include, e.g., prothrombin time, thromboplastin time, activated partial thromboplast time (aPTT), antithrombin activity, platelet count, protein C levels, and protein S levels. In addition, the levels of C reactive protein may also be assessed in the patient prior to treatment and if elevated this may be used as a further indicator as to an increased risk of thrombosis in the patient.

Sepsis is a clinical syndrome of life-threatening organ dysfunction caused by a dysregulated immune response to infection. The more severe form of sepsis "septic shock" is characterized by a critical reduction in tissue perfusion; acute failure of multiple organs, including the lungs, kidneys, and liver. Common causes in immunocompetent patients include many different species of gram-positive and gram-negative bacteria. Immunocompromised patients may have uncommon bacterial or fungal species as a cause. Signs include fever, hypotension, oliguria, and confusion. Diagnosis is primarily clinical combined with culture results showing infection; early recognition and treatment is critical. Treatment is aggressive fluid resuscitation, antibiotics, surgical excision of infected or necrotic tissue and drainage of pus, and supportive care.

Influenza is a disease generally known as the "flu." Influenza is caused by a group of viruses that can be broken down into 4 separate groups: Influenza A, Influenza B, Influenza C and Influenza D which are separated based on their nuceloproteins and matrix proteins. Influenza causes viral respiratory infection resulting in fever, coryza, cough, headache, and malaise. Influenza A, B, and C all infect humans while there have been no documented cases of human Influenza D infection. Influenza C on the other hand does not cause typical influenza illness seen in individuals infected with Influenza A or B.

Influenza A strains are further classified based on two surface proteins, hemagglutinin (H) and neuraminidase (N). There are 18 different hemagglutinin subtypes and 11 different neuraminidase subtypes (H1 through H18 and N1 through N11, respectively). While there are potentially 198 different influenza A subtype combinations, only 131 subtypes have been detected in nature. Current subtypes of influenza A viruses that routinely circulate in people include: A(H1N1) and A(H3N2).

Cytokine release-related condition associated with influenza refers to any condition associated with influenza that leads to high levels of cytokine releases in the lungs and/or kidneys. Cytokine releases-related conditions, include without limitation, influenza-associated ARDS, influenza-associated AKI, influenza-associated thrombosis, influenza-associated sepsis, influenza-associated septic shock, etc.

Influenza-associated ARDS is ARDS that is caused by influenza infection. Patients having influenza-associated ARDS may have been diagnosed as having an influenza infection, may have been exposed to another person having an influenza infection, or may be suspected of having an influenza infection based on their symptoms.

Influenza-associated AKI is AKI that is caused by influenza infection. Patients having influenza-associated AKI may have been diagnosed as having an influenza infection, may have been exposed to another person having an influenza infection, or may be suspected of having an influenza infection based on their symptoms. In some cases, influenza-associated AKI includes AKI with the symptoms described, e.g., in Batle et al. J. AM. SOC. NEPHROL. 2020, 31(7): 1380-1383 and Gabarre et al. Intensive Care Med. 2020, 46(7): 1339-1348, the disclosures of which are incorporated herein by reference in their entireties.

Influenza-associated thrombosis is thrombosis that is caused by influenza infection. Patients having influenza-associated thrombosis may have been diagnosed as having an influenza infection, may have been exposed to another person having an influenza infection, or may be suspected of having an influenza infection based on their symptoms. In some cases, influenza-associated thrombosis includes any of the symptoms described in, e.g., Connors et al. Blood 2020, 135(23): 2033-2040 and Bikdeli et al. J. Am. Coll. Cardiol. 2020, 75(23): 2950-73, the disclosures of which are incorporated herein by reference in their entireties.

Influenza-associated sepsis is sepsis that is caused by influenza infection. Patients having influenza-associated sepsis may have been diagnosed as having an influenza infection, may have been exposed to another person having an influenza infection, or may be suspected of having an influenza infection based on their symptoms. In some cases, influenza-associated thrombosis includes any of the symptoms described in, e.g., Florescu et al. Virulence. 2014 Jan. 1; 5(1): 137-142. and Gu et al. Eur Respir Rev. 2020 Jul. 21; 29(157):200038, the disclosures of which are incorporated herein by reference in their entireties.

The term "associated with influenza" refers to a symptom or indication that develops within 28 days of hospitalization/signs of influenza infection.

For influenza-associated ARDS, successful treatment may include a decrease in shortness of breath, less labored or less rapid breathing, higher blood pressure, decreased confusion and/or a decrease tiredness. A treatment may be administered prophylactically, i.e., before the onset of ARDS. A prophylactic treatment prevents ARDS and can be administered to patients that have or are suspected of having an influenza infection, but without the severe symptoms of ARDS. For example, prophylactic treatment can be administered to patients that have a cough without the other symptoms of ARDS.

For influenza-associated AKI, successful treatment may include increased kidney function. Kidney function may be assessed by measuring serum creatinine levels, serum creatinine clearance, or blood urea nitrogen levels. In some cases, the successful treatment includes a reduction in metabolic acidosis, hyperkalaemia, oliguria or anuria, azotemia, restoration in body fluid balance, and improved effects on other organ systems. A treatment may be administered prophylactically, i.e., before the onset of AKI. A prophylactic treatment prevents AKI and can be administered to patients that have or are suspected of having an influenza infection, but without the severe symptoms of AKI. For example, prophylactic treatment can be administered to patients that have one or more of increased serum or urine creatinine, hematuria, hypoproteinemia, decreased antithrombin III levels, hypalbuminaemia, leucozyturia, or proteinuria without the other symptoms of AKI.

For influenza-associated thrombosis, successful treatment may include improvement in the subject's coagulation profile, or preventing, slowing, delaying, or arresting, a worsening of the coagulation profile for which the subject is at risk. A coagulation profile may be assessed by measurement of one or more coagulation parameters including, e.g., a subject's serum level of one or more of D-dimer, Factor II, Factor V (e.g., Factor V Leiden), Factor VII, Factor VIII, Factor IX, Factor XI, Factor XII, Factor XIII, F/fibrin degradation products, thrombin-antithrombin 111 complex, fibrinogen, plasminogen, prothrombin, and von Willebrand factor. Additional coagulation parameters that may be measured for the coagulation profile include, e.g., prothrombin time, thromboplastin time, activated partial thromboplast time (aPTT), antithrombin activity, platelet count, protein C levels, and protein S levels. In addition, the levels of C reactive protein may also be assessed in the patient prior to treatment and if elevated this may be used as a further indicator as to an increased risk of thrombosis in the patient.

For influenza-associated sepsis or septic shock, successful treatment may include a reduction in fever, a reduction in high or moderately-high heartbeat (e.g., tachycardia), a reduction in sweating (i.e. diaphoresis), decreased confusion and/or a decrease tiredness, and/or a decrease in shortness of breath, less labored or less rapid breathing. A treatment may be administered prophylactically, i.e., before the onset of sepsis or septic shock. A prophylactic treatment prevents sepsis or septic shock and can be administered to patients that have or are suspected of having an influenza infection, but without the severe symptoms of sepsis or septic shock. For example, prophylactic treatment can be administered to patients that have a cough without the other symptoms of sepsis or septic shock.

Additionally, the disclosed compounds, combinations of disclosed compounds, or compositions thereof, may be used to treat sickle cell disease, particularly to reduce immunological responses that manifest in the disease. In some embodiments, the subject may exhibit one or more of the following symptoms: anemia, sickle cell crisis, vaso-occlusive crisis, splenic sequestration crisis, splenic sequestration crises, acute chest syndrome, acute chest syndrome, aplastic crisis, hemolytic crisis, dactylitis, pneumonia, respiratory infection, bone-marrow embolization, or atelectasis.

Sickle cell disease (SCD) is a group of blood disorders typically inherited. The most common type is known as sickle cell anemia, which results in an abnormality in the oxygen carrying protein hemoglobin found in red blood cells. This leads to a rigid, sickle-like shape under certain circumstances. Problems in sickle cell disease typically begin around 5 to 6 months of age and a number of health problems may develop, such as attacks of pain (known as a sickle cell crisis), anemia, swelling in the hands and feet, bacterial infections and stroke. Long-term pain may develop as subjects age.

Sickle cell disease occurs when a person inherits two abnormal copies of the β-globin gene (HBB) that makes hemoglobin, one from each parent. That gene occurs in chromosome 11. Several subtypes exist, depending on the exact mutation in each hemoglobin gene. An attack can be set off by temperature changes, stress, dehydration, and high altitude.

The care of people with sickle cell disease may include infection prevention with vaccination and antibiotics, high fluid intake, folic acid supplementation, and pain medication. Other measures may include blood transfusion and the medication hydroxycarbamide (hydroxyurea). A small percentage of people can be cured by a transplant of bone marrow cells. Patients with sickle cell disease may exhibit the following symptoms:

Sickle cell crisis: The terms "sickle cell crisis" or "sickling crisis" may be used to describe several independent acute conditions occurring in subjects with SCD, which results in anemia and crises that could be of many types, including the vaso-occlusive crisis, aplastic crisis, splenic sequestration crisis, hemolytic crisis, and others. Most episodes of sickle cell crises last between five and seven days. Although infection, dehydration, and acidosis (all of which favor sickling) can act as triggers, in most instances, no predisposing cause is identified.

Vaso-occlusive crisis: The vaso-occlusive crisis is caused by sickle-shaped red blood cells that obstruct capillaries and restrict blood flow to an organ, resulting in ischemia, pain, necrosis, and often organ damage. The frequency, severity, and duration of these crises vary considerably. Painful crises are treated with hydration, analgesics, and blood transfusion; pain management requires opioid drug administration at regular intervals until the crisis has settled. For milder crises, a subgroup of subjects manages on nonsteroidal anti-inflammatory drugs such as diclofenac or naproxen. For more severe crises, most subjects require in-subject management for intravenous opioids; subject-controlled analgesia devices are commonly used in this setting. Vaso-occlusive crisis involving organs such as the penis or lungs are considered an emergency and treated with red blood cell transfusions. Incentive spirometry, a technique to encourage deep breathing to minimize the development of atelectasis, is recommended.

Splenic sequestration crisis: The spleen is frequently affected in sickle cell disease, as the sickle-shaped red blood cells cause narrowing of blood vessels and reduced function in clearing the defective cells. It is usually infarcted before the end of childhood in individuals with sickle cell anemia. This spleen damage increases the risk of infection from encapsulated organisms; preventive antibiotics and vaccinations are recommended for those lacking proper spleen function.

Splenic sequestration crises are acute, painful enlargements of the spleen, caused by intrasplenic trapping of red cells and resulting in a precipitous fall in hemoglobin levels with the potential for hypovolemic shock. Sequestration crises are considered an emergency. If not treated, subjects may die within 1-2 hours due to circulatory failure. Management is supportive, sometimes with blood transfusion. These crises are transient; they continue for 3-4 hours and may last for one day.

Acute chest syndrome: Acute chest syndrome is defined by at least two of these signs or symptoms: chest pain, fever, pulmonary infiltrate or focal abnormality, respiratory symptoms, or hypoxemia. It is the second-most common complication and it accounts for about 25% of deaths in subjects with SCD. Most cases present with vaso-occlusive crises, and then develop acute chest syndrome. Nevertheless, about 80% of people have vaso-occlusive crises during acute chest syndrome.

Aplastic crisis: Aplastic crises are instances of an acute worsening of the subject's baseline anemia, producing pale appearance, fast heart rate, and fatigue. This crisis is normally triggered by parvovirus B19, which directly affects production of red blood cells by invading the red cell precursors and multiplying in and destroying them. Parvovirus infection almost completely prevents red blood cell production for two to three days. In normal individuals, this is of little consequence, but the shortened red cell life of SCD subjects results in an abrupt, life-threatening situation. Reticulocyte counts drop dramatically during the disease (causing reticulocytopenia), and the rapid turnover of red cells leads to the drop in hemoglobin. This crisis takes 4 to 7 days to disappear. Most subjects can be managed supportively; some need a blood transfusion.

Hemolytic crisis: Hemolytic crises are acute accelerated drops in hemoglobin level. The red blood cells break down at a faster rate. This is particularly common in people with coexistent G6PD deficiency. Another influence of hemolytic crises in Sickle Cell Disease is oxidative stress on the erythrocytes, leukocytes, and platelets. When there is not enough red blood cell production in the bone marrow, the oxygen that the body receives, processes, and transports is unbalanced with the body's antioxidants. There is an imbalance in the oxygen reactive species in the cells, which leads to more production of red blood cells that are not properly oxygenated or formed. Oxidative stress may lead to anemia because of the imbalance of oxygen in the tissue. Management is supportive, sometimes with blood transfusions.

In addition, one of the earliest clinical manifestations is dactylitis, presenting as early as six months of age, and may occur in children with sickle cell trait. The crisis can last up to a month. Given that pneumonia and sickling in the lung can both produce symptoms of acute chest syndrome, the subject is treated for both conditions. It can be triggered by painful crisis, respiratory infection, bone-marrow embolization, or possibly by atelectasis, opiate administration, or surgery. Hematopoietic ulcers may also occur.

Additionally, the disclosed compounds, combinations of disclosed compounds, or compositions thereof, may be used to treat a lung injury. The lung injury may be a chemical- or radiation-induced lung injury.

In some embodiments, the subject may have inhaled or may be expected to be exposed to a pulmonary irritant. In some embodiments, the subject may have inhaled or may be expected to inhale a choking agent. A pulmonary agent, or choking agent, is a chemical agent designed to impede a subject's ability to breathe. These compounds generally operate by causing a build-up of fluids in the lungs, which then leads to suffocation. Inhalation of these agents cause burning of the throat, coughing, vomiting, headache, pain in chest, tightness in chest, and respiratory and circulatory failure. Examples of such agents include: chlorine gas, chloropicrin (PS), diphosgene (DP), phosgene (CG), disulfur decafluoride, perfluoroisobutene, acrolein, and piphenylcyanoarsine. Phosgene-induced acute lung injury (P-ALI) is commonly associated with short-term phosgene inhalation. Prolonged exposure can cause chronic hypoventilation, refractory pulmonary edema, and other associated lung injuries, ultimately resulting in ARDS. Chemical pneumonitis is inflammation of the lungs or breathing difficulty due to inhaling chemical fumes or breathing in and choking on certain chemicals.

Additionally, the disclosed compounds, combinations of disclosed compounds, or compositions thereof, may be used to treat or prevent acute inhalation injury (AII) and e-cigarette, or vaping, product use-associated lung injury (EVALI).

In other embodiments, the subject has been exposed to or is expected to be exposed to ionizing radiation. In these embodiments, the subject may have or may be expected to develop radiation induced lung injury (RILI). In some embodiments, the subject may have radiation pneumonitis or radiation pulmonary fibrosis. In these embodiments, the subject may have received or is undergoing thoracic radiotherapy, may have inhaled a radioactive agent or may have had direct exposure to ionizing radiation. For example, the subject may have inhaled a radioactive agent or have had direct exposure to ionizing radiation as a result of a nuclear weapon or leak at a nuclear power plant, for example.

The disclosed compounds, combinations of disclosed compounds, or compositions thereof, also may be used to treat or prevent hemorrhagic fever, or symptoms thereof, including Ebola virus disease, Alkhurma hemorrhagic fever, Chapare hemorrhagic fever, Crimean-Congo hemorrhagic fever, Hantavirus Pulmonary Syndrome (HPS), Hemorrhagic fever with renal syndrome (HFRS), Kyasanur Forest Disease (KFD), Lassa fever, Lujo hemorrhagic fever, Marburg hemorrhagic fever, Omsk hemorrhagic fever, Rift Valley fever, Yellow Fever, or Dengue fever, such as severe dengue fever (dengue hemorrhagic fever).

B. Formulations and Administration

Pharmaceutical compositions comprising one or more active compounds of the disclosure may be manufactured by any suitable method, such as mixing, dissolving, granulating, dragee-making, levigating, emulsifying, encapsulating, entrapping or lyophilization processes. The compositions may be formulated using one or more physiologically acceptable excipients, diluents, carriers, adjuvants or auxiliaries to provide preparations which can be used pharmaceutically.

The active compound(s) may be formulated in the pharmaceutical compositions per se, or in the form of a hydrate, solvate, N-oxide or pharmaceutically acceptable salt. Typically, such salts are more soluble in aqueous solutions than the corresponding free acids and bases, but salts having lower solubility than the corresponding free acids and bases may also be formed.

Pharmaceutical compositions comprising the disclosed compound(s) may take a form suitable for virtually any mode of administration, including, for example, topical, ocular, oral, buccal, systemic, nasal, injection, such as i.v. or i.p., transdermal, rectal, vaginal, etc., or a form suitable for administration by inhalation or insufflation.

For topical administration, the active compound(s) (or a hydrate, solvate, N-oxide or pharmaceutically acceptable salt thereof) may be formulated as solutions, gels, ointments, creams, suspensions, etc. As are well-known in the art.

Systemic formulations include those designed for administration by injection, e.g., subcutaneous, intravenous, intramuscular, intrathecal or intraperitoneal injection, as well as those designed for transdermal, transmucosal oral or pulmonary administration.

Useful injectable preparations include sterile suspensions, solutions, or emulsions of the active compound(s) in aqueous or oily vehicles. The compositions may also contain formulating agents, such as suspending, stabilizing and/or dispersing agent. The formulations for injection may be presented in unit dosage form, e.g., in ampules or in multidose containers, and may contain added preservatives.

Alternatively, the injectable formulation may be provided in powder form for reconstitution with a suitable vehicle, including but not limited to sterile, pyrogen-free water, buffer, dextrose solution, etc., before use. To this end, the active compound(s) maybe dried by any art-known technique, such as lyophilization, and reconstituted prior to use.

For transmucosal administration, penetrants appropriate to the barrier to be permeated are used in the formulation. Such penetrants are known in the art.

For oral administration, the pharmaceutical compositions may take the form of, for example, lozenges, tablets or capsules prepared by conventional means with pharmaceutically acceptable excipients, such as: binding agents (e.g., pregelatinised maize starch, polyvinylpyrrolidone or hydroxypropyl methylcellulose); fillers (e.g., lactose, microcrystalline cellulose or calcium hydrogen phosphate); lubricants (e.g., magnesium stearate, talc or silica); disintegrants (e.g., potato starch or sodium starch glycolate); and/or wetting agents (e.g., sodium lauryl sulfate). The tablets may be coated by methods well known in the art with, for example, sugars, films or enteric coatings.

Liquid preparations for oral administration may take the form of, for example, elixirs, solutions, syrups or suspensions, or they may be presented as a dry product for constitution with water or other suitable vehicle before use. Such liquid preparations may be prepared by conventional means with pharmaceutically acceptable excipients such as: suspending agents (e.g., sorbitol syrup, cellulose derivatives or hydrogenated edible fats); emulsifying agents (e.g., lecithin or acacia); non-aqueous vehicles (e.g., almond oil, oily esters, ethyl alcohol, Cremophore™ or fractionated vegetable oils); and preservatives (e.g., methyl or propyl-p-hydroxybenzoates or sorbic acid). The preparations may also contain buffer salts, preservatives, flavoring, coloring and sweetening agents as appropriate.

Preparations for oral administration may be suitably formulated to give controlled release of the active compound, as is well known.

For buccal administration, the compositions may take the form of tablets or lozenges formulated in conventional manner.

For rectal and vaginal routes of administration, the active compound(s) may be formulated as solutions (for retention enemas) suppositories or ointments containing conventional suppository bases, such as cocoa butter or other glycerides.

For nasal administration or administration by inhalation or insufflation, the active compound(s), hydrate, solvate, N-oxide, or pharmaceutically acceptable salt can be conveniently delivered in the form of an aerosol spray from pressurized packs or a nebulizer with the use of a suitable propellant, e.g.,) dichlorodifluoromethane, trichlorofluoromethane, dichlorotetrafluoroethane, fluorocarbons, carbon dioxide or other suitable gas. In the case of a pressurized aerosol, the dosage unit may be determined by providing a valve to deliver a metered amount. Capsules and cartridges for use in an inhaler or insufflator (for example capsules and cartridges comprised of gelatin) may be formulated containing a powder mix of the compound and a suitable powder base such as lactose or starch.

A specific example of an aqueous suspension formulation suitable for nasal administration using commercially-available nasal spray devices includes the following ingredients: active compound (0.5 20 mg/ml); benzalkonium chloride (0.1 0.2 mg/mL); polysorbate 80 (TWEEN® 80; 0.5 5 mg/ml); carboxymethylcellulose sodium or microcrystalline cellulose (1 15 mg/ml); phenylethanol (1 4 mg/ml); and dextrose (20 50 mg/ml). The pH of the final suspension can be adjusted to range from about pH 5 to pH 7, with a pH of about pH 5.5 being typical.

Another specific example of an aqueous suspension suitable for administration of the compounds via inhalation contains 20 mg/mL of the disclosed compound(s), 1% (v/v) polysorbate 80 (TWEEN® 80), 50 mM citrate and/or 0.9% sodium chloride.

For ocular administration, the active compound(s) may be formulated as a solution, emulsion, suspension, etc. suitable for administration to the eye. A variety of vehicles suitable for administering compounds to the eye are known in the art. Specific non-limiting examples are described in U.S. Pat. Nos. 6,261,547; 6,197,934; 6,056,950; 5,800,807; 5,776,445; 5,698,219; 5,521,222; 5,403,841; 5,077,033; 4,882,150; and 4,738,851, which are incorporated herein by reference.

For prolonged delivery, the active compound(s) can be formulated as a depot preparation for administration by implantation or intramuscular injection. The active ingredient maybe formulated with suitable polymeric or hydrophobic materials (e.g., as an emulsion in an acceptable oil) or ion exchange resins, or as sparingly soluble derivatives, e.g., as a sparingly soluble salt. Alternatively, transdermal delivery systems manufactured as an adhesive disc or patch which slowly releases the active compound(s) for percutaneous absorption may be used. To this end, permeation enhancers may be used to facilitate transdermal penetration of the active compound(s). Suitable transdermal patches are described in for example, U.S. Pat. Nos. 5,407,713; 5,352,456; 5,332,213; 5,336,168; 5,290,561; 5,254,346; 5,164,189; 5,163,899; 5,088,977; 5,087,240; 5,008,110; and 4,921,475, which are incorporated herein by reference.

Alternatively, other pharmaceutical delivery systems may be employed. Liposomes and emulsions are well-known examples of delivery vehicles that may be used to deliver active compound(s). Certain organic solvents, such as dimethylsulfoxide (DMSO), may also be employed, although usually at the cost of greater toxicity.

The pharmaceutical compositions may, if desired, be presented in a pack or dispenser device which may contain one or more unit dosage forms containing the active compound(s). The pack may, for example, comprise metal or plastic foil, such as a blister pack. The pack or dispenser device may be accompanied by instructions for administration.

C. Dosages

The disclosed compound or combinations of disclosed compounds will generally be used in an amount effective to achieve the intended result, for example, in an amount effective to treat, prevent or ameliorate a particular condition. The disclosed compound(s), or compositions thereof, can be administered therapeutically to achieve therapeutic benefit or prophylactically to achieve a prophylactic benefit. Therapeutic benefit means eradication or amelioration of the underlying disorder being treated and/or eradication or amelioration of one or more of the symptoms associated with the underlying disorder such that the patient reports an improvement in feeling or condition, notwithstanding that the patient may still be afflicted with the underlying disorder. For example, administration of a compound to a patient suffering from an allergy provides therapeutic benefit not only when the underlying allergic response is eradicated or ameliorated, but also when the patient reports a decrease in the severity or duration of the symptoms associated with the allergy following exposure to the allergen. As another example, therapeutic benefit in the context of asthma includes an improvement in respiration following the onset of an asthmatic attack or a reduction in the frequency or severity of asthmatic episodes. Therapeutic benefit also includes halting or slowing the progression of the disease, regardless of whether improvement is realized.

As known by those of ordinary skill in the art, the preferred dosage of disclosed compounds may depend on various factors, including the age, weight, general health, and severity of the condition of the patient or subject being treated. Dosage also may need to be tailored to the sex of the individual and/or the lung capacity of the individual, when administered by inhalation. Dosage may also be tailored to individuals suffering from more than one condition or those individuals who have additional conditions that affect lung capacity and the ability to breathe normally, for example, emphysema, bronchitis, pneumonia, and respiratory infections. Dosage, and frequency of administration of the disclosed compound(s) or compositions thereof, will also depend on whether the disclosed compound(s) are formulated for treatment of acute episodes of a condition or for the prophylactic treatment of a disorder. A person or ordinary skill in the art will be able to determine the optimal dose for a particular individual.

For prophylactic administration, the disclosed compound, combinations of disclosed compounds, or compositions thereof, can be administered to a patient or subject at risk of developing one of the previously described conditions. For example, if it is unknown whether a patient or subject is allergic to a particular drug, the disclosed compound, combinations of disclosed compounds, or compositions thereof, can be administered prior to administration of the drug to avoid or ameliorate an allergic response to the drug. Alternatively, prophylactic administration can be used to avoid or ameliorate the onset of symptoms in a patient diagnosed with the underlying disorder. For example, a disclosed compound(s), or composition thereof, can be administered to an allergy sufferer prior to expected exposure to the allergen. A disclosed compound, combinations of disclosed compounds, or compositions thereof, can also be administered prophylactically to healthy individuals who are repeatedly exposed to agents known to one of the above-described maladies to prevent the onset of the disorder. For example, a disclosed compound, combinations of disclosed compounds, or compositions thereof, can be administered to a healthy individual who is repeatedly exposed to an allergen known to induce allergies, such as latex, in an effort to prevent the individual from developing an allergy. Alternatively, a disclosed compound, combinations of disclosed compounds, or compositions thereof, can be administered to a patient suffering from asthma prior to partaking in activities which trigger asthma attacks to lessen the severity of, or avoid altogether, an asthmatic episode.

Effective dosages can be estimated initially from in vitro assays. For example, an initial dosage for use in subjects can be formulated to achieve a circulating blood or serum concentration of active compound that is at or above an $IC_{50}$ or $EC_{50}$ of the particular compound as measured in an in vitro assay. Dosages can be calculated to achieve such circulating blood or serum concentrations taking into account the bioavailability of the particular compound. Fingl & Woodbury, "General Principles," In: Goodman and Gilman's The Pharmaceutical Basis of Therapeutics, Chapter 1, pages 1-46, Pergamon Press, and the references cited therein, provide additional guidance concerning effective dosages.

In some embodiments, the disclosed compounds have an $EC_{50}$ with respect to a kinase protein, such as an IRAK protein, of from greater than 0 to 20 µM, such as from greater than 0 to 10 µM, from greater than 0 to 5 µM, from greater than 0 to 1 µM, from greater than 0 to 0.5 µM, from greater than 0 to 0.1 µM, or from greater than 0 to 0.05 µM.

Initial dosages can also be estimated from in vivo data, such as animal models. Animal models useful for testing the efficacy of compounds to treat or prevent the various diseases described above are well-known in the art. Suitable animal models of hypersensitivity or allergic reactions are described in Foster, (1995) Allergy 50(21Suppl):6-9, discussion 34-38 and Tumas et al., (2001), J. Allergy Clin. Immunol. 107(6):1025-1033. Suitable animal models of allergic rhinitis are described in Szelenyi et al., (2000), Arzneimittelforschung 50(11):1037-42; Kawaguchi et al., (1994), Clin. Exp. Allergy 24(3):238-244 and Sugimoto et al., (2000), Immunopharmacology 48(1):1-7. Persons of ordinary skill in the art can adapt such information to determine dosages suitable for human administration.

Dosage amounts of disclosed compounds will typically be in the range of from about greater than 0 mg/kg/day, such as 0.0001 mg/kg/day or 0.001 mg/kg/day or 0.01 mg/kg/day, up to at least about 100 mg/kg/day. More typically, the dosage (or effective amount) may range from about 0.0025 mg/kg to about 1 mg/kg administered at least once per day, such as from 0.01 mg/kg to about 0.5 mg/kg or from about 0.05 mg/kg to about 0.15 mg/kg. The total daily dosage typically ranges from about 0.1 mg/kg to about 5 mg/kg or to about 20 mg/kg per day, such as from 0.5 mg/kg to about 10 mg/kg per day or from about 0.7 mg/kg per day to about 2.5 mg/kg/day. Dosage amounts can be higher or lower depending upon, among other factors, the activity of the disclosed compound, its bioavailability, the mode of administration, and various factors discussed above.

Dosage amount and dosage interval can be adjusted for individuals to provide plasma levels of the disclosed compound that are sufficient to maintain therapeutic or prophylactic effect. For example, the compounds can be administered once per day, multiple times per day, once per week, multiple times per week (e.g., every other day), one per month, multiple times per month, or once per year, depending upon, amongst other things, the mode of administration, the specific indication being treated, and the judgment of the prescribing physician. Persons of ordinary skill in the art will be able to optimize effective local dosages without undue experimentation.

Compositions comprising one or more of the disclosed compounds typically comprise from greater than 0 up to 99% of the disclosed compound, or compounds, and/or other therapeutic agent by total weight percent. More typically, compositions comprising one or more of the disclosed compounds comprise from about 1 to about 20 total weight percent of the disclosed compound and other therapeutic agent, and from about 80 to about 99 weight percent of a pharmaceutically acceptable excipient.

Preferably, the disclosed compound, combinations of disclosed compounds, or compositions thereof, will provide therapeutic or prophylactic benefit without causing substantial toxicity. Toxicity of the disclosed compound can be determined using standard pharmaceutical procedures. The dose ratio between toxic and therapeutic (or prophylactic) effect is the therapeutic index. Disclosed compounds that exhibit high therapeutic indices are preferred.

IV. Examples

Example 1

Preparation of Intermediate I

Intermediate I was prepared as follows. Additional information concerning the synthesis can be found in WO 2015/150995 A1.

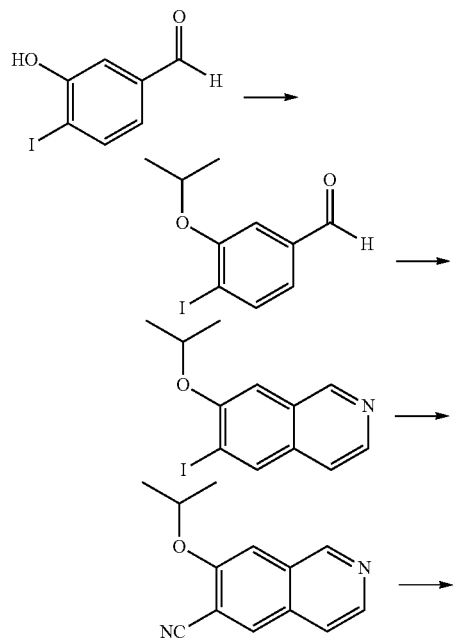

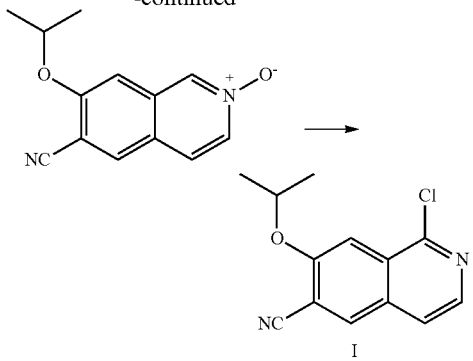

Step 1: 4-Iodo-3-isopropoxybenzaldehyde

To a solution of 3-hydroxy-4-iodobenzaldehyde (24.9 g, 0.1 mol) and 2-bromopropane (18.5 g, 0.15 mol) in anhydrous DMSO (200 mL) was added potassium carbonate (22.1 g, 0.16 mol). The resulting solution was stirred at 50° C. for 17 hours before cooling to room temperature. Water (400 mL) was added and the organics were extracted with diethyl ether (5×200 mL). The combined ether layer was washed with brine (2×200 mL), dried over anhydrous magnesium sulfate, filtered, and concentrated under reduced pressure to afford crude 4-iodo-3-isopropoxybenzaldehyde (29.0 g, 100%) as a brown liquid, which was pure and directly used in next step.

$^1$H NMR (400 MHz, DMSO-$d_6$) δ (ppm) 9.95 (s, 1H), 8.04 (d, J=7.9 Hz, 1H), 7.44 (d, J=1.6 Hz, 1H), 7.25 (dd, J=7.9, 1.6 Hz, 1H), 4.78 (hept, J=6.0 Hz, 1H), 1.33 (d, J=6.0 Hz, 6H).

Step 2: 6-Iodo-7-isopropoxyisoquinoline 2,2-Dimethoxyethan-1-amine (15.8 g, 0.15 mol) was added to the solution of 4-iodo-3-isopropoxybenzaldehyde (29.0 g, 0.1 mol) in anhydrous toluene (180 mL). The resulting solution was refluxed with Dean-Stark for 4 hours, then cooled to room temperature. The solution was cooled to 0° C. and trifluoroacetic anhydride (63.0 g, 0.3 mol) was added slowly followed by boron trifluoride etherate (42.6 g, 0.3 mol). The reaction solution was stirred at room temperature for 24 hours. Reaction solution was poured into the mixture of ice (300 mL) and 30% ammonium hydroxide aqueous solution (about 60 mL) (solution pH was about 8). The solution was extracted with ethyl acetate (3×500 mL). Combined organic layers were dried over anhydrous magnesium sulfate, filtered, and concentrated under reduced pressure to afford crude product. Dichloromethane was added, sonicated, and filtered. Solid was obtained as a pure 6-iodo-7-isopropoxyisoquinoline. Filtrate was further purified by silica gel chromatography (0 to 100% ethyl acetate in hexane gradient followed by 10% methanol in dichloromethane) to afford additional pure 6-iodo-7-isopropoxyisoquinoline. Combined solid was 20.6 g (64%) as a pale brown solid. $^1$H NMR (400 MHz, DMSO-$d_6$) δ (ppm) 9.31 (s, 1H), 8.66 (s, 1H), 8.42 (d, J=5.9 Hz, 1H), 7.85 (d, J=5.9 Hz, 1H), 7.65 (s, 1H), 4.85 (hept, J=6.0 Hz, 1H), 1.41 (d, J=6.0 Hz, 6H); MS (ESI, m/z) 314.3 [M+H]$^+$.

Step 3: 7-Isopropoxyisoquinoline-6-carbonitrile

To 6-iodo-7-isopropoxyisoquinoline (20.6 g, 65.8 mmol) in anhydrous DMSO (165 mL) was added copper (I) cyanide (13.0 g, 0.145 mol) and purged with nitrogen for 1 minute, then heated at 120° C. under nitrogen for 4 hours. Reaction solution was cooled to room temperature and poured into ice water/30% ammonium hydroxide aqueous solution (400 mL/120 mL), filtered and washed with ethyl acetate (200 mL). Organic layer was separated, and aqueous layer was extracted with ethyl acetate (3×200 mL). Combined organic layer was washed with saturated ammonium chloride solution (100 mL), brine (100 mL), dried over anhydrous magnesium sulfate, filtered, and concentrated under the reduced pressure to afford crude product, which was purified by silica gel chromatography (0 to 100% ethyl acetate in hexane gradient) to afford 7-isopropoxyisoquinoline-6-carbonitrile (10 g, 72%) as a brown solid.

$^1$H NMR (400 MHz, DMSO-$d_6$) δ (ppm) 9.32 (s, 1H), 8.58 (s, 1H), 8.48 (d, J=5.5 Hz, 1H), 7.84-7.78 (m, 2H), 4.92 (hept, J=6.0 Hz, 1H), 1.41 (d, J=6.0 Hz, 6H); MS (ESI, m/z) 213.2 [M+H]$^+$.

Step 4: 6-Cyano-7-isopropoxyisoquinoline 2-oxide

To a solution of 7-isopropoxyisoquinoline-6-carbonitrile (9.5 g, 44.8 mmol) in anhydrous dichloromethane (400 mL) at 0° C. was added m-chloroperoxybenzoic acid (23.2 g, 0.134 mol). The reaction solution was stirred at room temperature for 4 hours. Reaction solution was diluted with dichloromethane (600 mL), washed with the mixture of saturated sodium carbonate and sodium sulfite aqueous solution (100 mL), and saturated sodium bicarbonate aqueous solution (100 mL). Aqueous layer was further extracted with dichloromethane (2×100 mL). Combined organic layer was washed with brine, dried over anhydrous magnesium sulfate, filtered, and concentrated under reduced pressure to afford crude product, which was purified by silica gel chromatography (0-10% methanol in dichloromethane gradient) to afford 6-cyano-7-isopropoxyisoquinoline 2-oxide (9.6 g, 94%) as a white solid.

$^1$H NMR (400 MHz, DMSO-$d_6$) δ (ppm) 8.88-8.80 (m, 1H), 8.50 (s, 1H), 8.10 (dd, J=7.1, 1.8 Hz, 1H), 7.90 (d, J=7.1 Hz, 1H), 7.56 (s, 1H), 4.83 (p, J=6.0 Hz, 1H), 1.40 (d, J=6.0 Hz, 6H); MS (ESI, m/z) 229.2 [M+H]$^+$.

Step 5: 1-Chloro-7-isopropoxyisoquinoline-6-carbonitrile intermediate I

To a solution of 6-cyano-7-isopropoxyisoquinoline 2-oxide (9.6 g, 42.1 mmol) in anhydrous dichloromethane (420 mL) at 0° C. was added phosphoryl chloride (6.8 g, 44.2 mmol). The resulting solution was stirred at room temperature for 16 hours. Reaction solution was diluted with dichloromethane (600 mL), washed with saturated sodium bicarbonate solution, brine, dried over anhydrous magnesium sulfate, filtered, and concentrated under reduced pressure to afford crude product, which was purified by silica gel chromatography (0 to 30% ethyl acetate in hexane gradient) to afford 1-chloro-7-isopropoxyisoquinoline-6-carbonitrile intermediate I (7.2 g, 69%) as a white solid.

$^1$H NMR (400 MHz, DMSO-$d_6$) δ (ppm) 8.72 (s, 1H), 8.30 (d, J=5.5 Hz, 1H), 7.89 (d, J=5.5 Hz, 1H), 7.67 (s, 1H), 5.04 (hept, J=6.0 Hz, 1H), 1.42 (d, J=6.0 Hz, 6H); MS (ESI, m/z) 247.2 [M+H]$^+$.

Example 2

Preparation of Intermediate II

Intermediate II was prepared as follows.

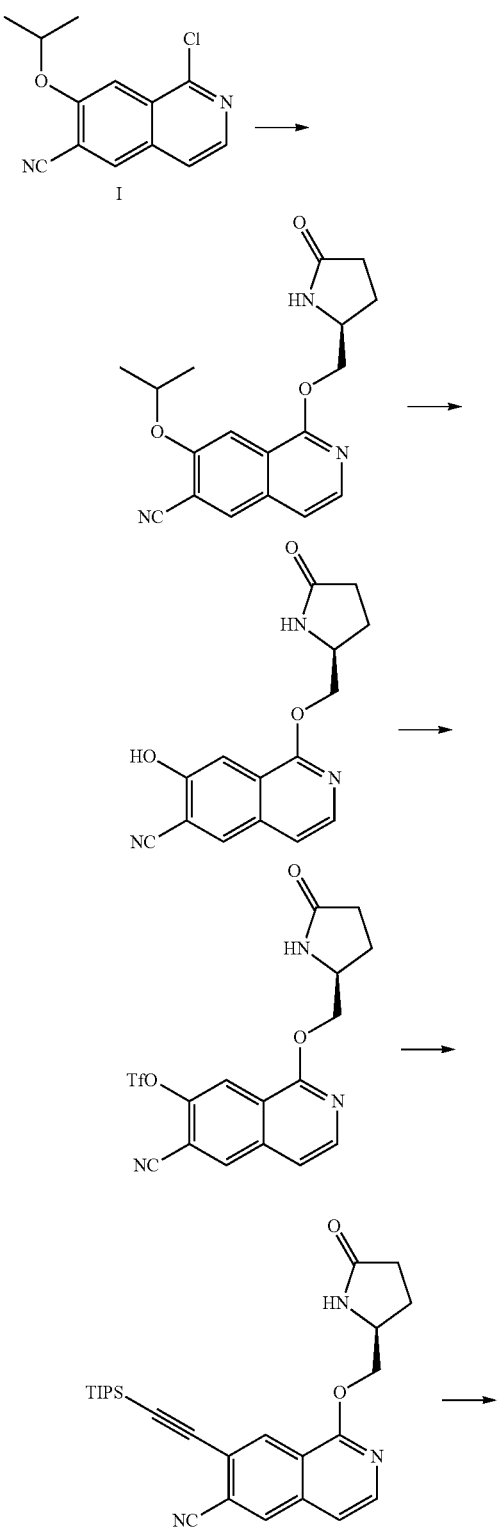

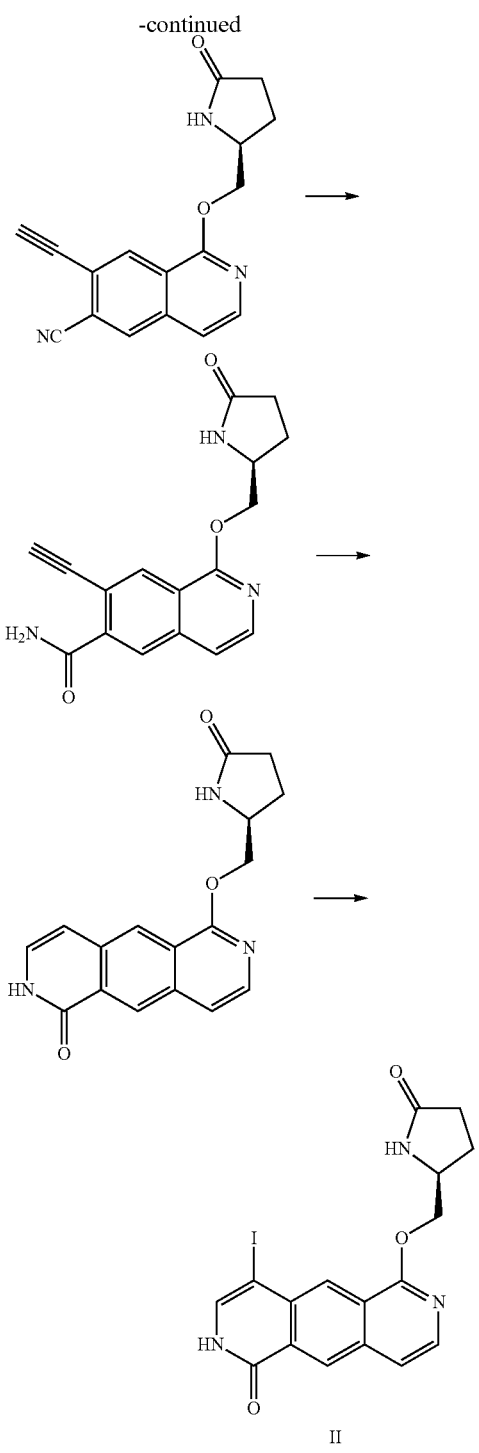

II

Step 1: (S)-7-Isopropoxy-1-((5-oxopyrrolidin-2-yl)methoxy)isoquinoline-6-carbonitrile To a solution of 1-chloro-7-isopropoxyisoquinoline-6-carbonitrile intermediate I (7.20 g, 29.3 mmol) and (S)-5-(hydroxymethyl)pyrrolidin-2-one (4.04 g, 35.1 mmol) in anhydrous N,N-dimethylformamide (100 mL) at a temperature between −10 to 0° C. was added potassium bis(trimethylsilyl)amide (1.0M in THF, 70.2 mL, 70.2 mmol). The resulting solution was stirred at this temperature for 2 hours and quenched with saturated sodium dihydrogen phosphate aqueous solution (pH was about 6). The solution was extracted with ethyl acetate (4×200 mL). Combined organic layers were dried over anhydrous magnesium sulfate, filtered, and concentrated under the reduced pressure to afford crude product, which was purified by silica gel chromatography (0 to 7% methanol in dichloromethane gradient) to afford (S)-7-isopropoxy-1-((5-oxopyrrolidin-2-yl)methoxy)isoquinoline-6-carbonitrile (8.5 g, 89%) as a white solid.

$^1$HNMR (400 MHz, DMSO-$d_6$) δ (ppm) 8.51 (s, 1H), 8.15 (s, 1H), 7.97 (d, J=5.8 Hz, 1H), 7.73 (s, 1H), 7.40 (d, J=5.8 Hz, 1H), 4.99 (p, J=6.0 Hz, 1H), 4.50 (dd, J=10.9, 3.8 Hz, 1H), 4.28 (dd, J=10.9, 6.9 Hz, 1H), 4.05-2.98 (m, 1H), 2.34-2.13 (m, 3H), 1.95-1.85 (m, 1H), 1.41 (d, J=6.0 Hz, 3H), 1.39 (d, J=6.0 Hz, 3H); MS (ESI, m/z) 326.3 [M+H]$^+$.

Step 2: (S)-7-Hydroxy-1-((5-oxopyrrolidin-2-yl)methoxy)isoquinoline-6-carbonitrile To a solution of (S)-7-isopropoxy-1-((5-oxopyrrolidin-2-yl)methoxy)isoquinoline-6-carbonitrile (7.0 g, 21.5 mmol) in anhydrous dichloromethane (200 mL) was added aluminum trichloride (8.6 g, 64.6 mmol). The resulting solution was stirred at 45° C. under nitrogen for 3 hours. The cloudy solution was filtered. The solid was added portionwise to ice water (about 400 mL), and the cloudy mixture was filtered, washed with water, hexane and dried under high vacuum to afford crude product of (S)-7-hydroxy-1-((5-oxopyrrolidin-2-yl)methoxy) isoquinoline-6-carbonitrile (6.5 g, about 94% purity) as a white solid, which was used directly in next step. MS (ESI, m/z) 284.2 [M+H]$^+$.

Step 3: (S)-6-Cyano-1-((5-oxopyrrolidin-2-yl)methoxy)isoquinolin-7-yl trifluoromethanesulfonate To a suspension of (S)-7-hydroxy-1-((5-oxopyrrolidin-2-yl)methoxy)isoquinoline-6-carbonitrile (6.5 g, about 94% purity, 20.64 mmol) in anhydrous dichloromethane (200 mL) was added 1,1,1-trifluoro-N-phenyl-N-((trifluoromethyl)sulfonyl)methane sulfonamide (7.37 g, 20.64 mmol) followed by triethylamine (8.36 g, 82.6 mmol). The resulting solution was stirred at room temperature for 4 hours. The reaction solution was diluted with dichloromethane (600 mL), washed with brine, dried over anhydrous magnesium sulfate, filtered, and concentrated under the reduced pressure to afford crude product, which was purified by silica gel chromatography (0 to 50% acetone in hexane gradient) to afford (S)-6-cyano-1-((5-oxopyrrolidin-2-yl)methoxy)isoquinolin-7-yltrifluoromethane-sulfonate (5.26 g, 59% over 2 steps) as a white solid.

$^1$HNMR (400 MHz, DMSO-$d_6$) δ (ppm) 8.90 (s, 1H), 8.57 (s, 1H), 8.28 (d, J=5.9 Hz, 1H), 8.19 (s, 1H), 7.60 (dd, J=5.9, 0.5 Hz, 1H), 4.58 (dd, J=10.8, 4.0 Hz, 1H), 4.28 (dd, J=10.8, 7.7 Hz, 1H), 4.08-4.00 (m, 1H), 2.34-2.13 (m, 3H), 1.94-1.80 (m, 1H); MS (ESI, m/z) 416.3 [M+H]$^+$.

Step 4: (S)-1-((5-Oxopyrrolidin-2-yl)methoxy)-7-((triisopropylsilyl)ethynyl) isoquinoline-6-carbonitrile (S)-6-Cyano-1-((5-oxopyrrolidin-2-yl)methoxy)isoquinolin-7-yltrifluoromethane-sulfonate (5.25 g, 12.65 mmol), ethynyltriisopropylsilane (4.61 g, 25.30 mmol), copper (I) iodide (0.73 g, 3.80 mmol), tetrakis(triphenylphosphine) palladium(0) (1.46 g, 1.27 mmol) and tetra-n-butylammonium iodide (7.0 g, 19.0 mmol) in the 250 mL round-bottom flask was added anhydrous acetonitrile (110 mL) followed by triethylamine (22 mL). The resulting solution was purged with nitrogen for 3 minutes, then stirred at room temperature under nitrogen for 1 day. Ethyl acetate (800 mL) was added, stirred at room temperature for 30 minutes, then filtered through Celite®, eluting with ethyl acetate (100 mL). Combined organic layers were washed with saturated ammonium chloride aqueous solution, water, brine, dried over anhydrous magnesium sulfate, filtered, and concentrated under the reduced pressure to afford crude product, which was purified by silica gel chromatography (0 to 40% acetone in hexane gradient) to afford (S)-1-((5-oxopyrrolidin-2-yl)methoxy)-7-((triisopropylsilyl)ethynyl)isoquinoline-6-carbonitrile (5.21 g, 94%) as a white solid.

$^{1}$HNMR (400 MHz, DMSO-d$_{6}$) δ (ppm) 8.63 (s, 1H), 8.55 (d, J=0.7 Hz, 1H), 8.28 (s, 1H), 8.18 (d, J=5.8 Hz, 1H), 7.53-7.49 (m, 1H), 4.54 (dd, J=10.8, 3.9 Hz, 1H), 4.26 (dd, J=10.8, 8.0 Hz, 1H), 4.08-4.00 (m, 1H), 2.31-2.14 (m, 3H), 1.91-1.78 (m, 1H), 1.18-1.13 (q, J=3.9 Hz, 21H); MS (ESI, m/z) 448.4 [M+H]$^{+}$.

Step 5: (S)-7-Ethynyl-1-((5-oxopyrrolidin-2-yl)methoxy)isoquinoline-6-carbonitrile To a solution of (S)-1-((5-oxopyrrolidin-2-yl)methoxy)-7-((triisopropylsilyl)ethynyl) isoquinoline-6-carbonitrile (5.20 g, 11.6 mmol) in tetrahydrofuran (100 mL) was added acetic acid (0.70 g, 11.6 mmol) followed by tetra-n-butylammonium fluoride solution (1.0M in tetrahydrofuran, 11.6 mL). The resulting solution was stirred at room temperature for 1 hour. Precipitate was filtered and washed with THF. Solid was collected as desired product. Filtrate was concentrated and residue was dissolved in 2-methyl tetrahydrofuran (200 mL), washed with water (3×50 mL), saturated ammonium chloride aqueous solution (50 mL), brine (50 mL) and dried over anhydrous magnesium sulfate, filtered, and concentrated under the reduced pressure to afford another portion of product. Combined solid contained a little tetra-n-butylammonium fluoride. It was suspended in water (100 mL), stirred at room temperature for 30 minutes, filtered, washed with water, hexane and dried to afford (S)-7-ethynyl-1-((5-oxopyrrolidin-2-yl)methoxy)isoquinoline-6-carbonitrile (3.26 g, 96%) as a white solid.

$^{1}$HNMR (400 MHz, DMSO-d$_{6}$) δ (ppm) 8.68 (s, 1H), 8.64 (s, 1H), 8.26 (s, 1H), 8.18 (d, J=5.8 Hz, 1H), 7.53-7.49 (m, 1H), 4.87 (s, 1H), 4.55 (dd, J=10.8, 3.9 Hz, 1H), 4.21 (dd, J=10.8, 8.2 Hz, 1H), 4.09-4.00 (m, 1H), 2.34-2.09 (m, 3H), 1.93-1.80 (m, 1H); MS (ESI, m/z) 292.2 [M+H]$^{+}$.

Step 6: (S)-7-Ethynyl-1-((5-oxopyrrolidin-2-yl)methoxy)isoquinoline-6-carboxamide To a solution of (S)-7-ethynyl-1-((5-oxopyrrolidin-2-yl)methoxy)isoquinoline-6-carbonitrile (1.90 g, 6.53 mmol) in anhydrous dimethyl sulfoxide (65 mL) was added potassium carbonate (2.70 g, 19.6 mmol) followed by hydrogen peroxide solution (30%, 1.33 g, 11.8 mmol). The resulting solution was stirred at room temperature for 30 minutes. Then the mixture of saturated sodium bicarbonate aqueous solution and 10% of sodium sulfite aqueous solution (1/1, 200 mL) was added, and stirred at room temperature for 30 minutes. Precipitate was filtered, washed with water, and dried. Solid obtained was suspended in 5% methanol in dichloromethane, sonicated, filtered, washed with dichloromethane, hexane, and dried to afford (S)-7-ethynyl-1-((5-oxopyrrolidin-2-yl)methoxy)isoquinoline-6-carboxamide (1.70 g, 84%) as a white solid.

$^{1}$HNMR (400 MHz, DMSO-d6) δ (ppm) 8.49 (s, 1H), 8.22 (s, 1H), 8.06 (d, J=5.9 Hz, 1H), 7.98 (s, 2H), 7.66 (s, 1H), 7.47 (d, J=5.9 Hz, 1H), 4.51 (dd, J=10.8, 4.1 Hz, 1H), 4.42 (s, 1H), 4.25 (dd, J=10.9, 7.5 Hz, 1H), 4.06-3.99 (m, 1H), 2.35-2.11 (m, 3H), 1.93-1.78 (m, 1H); MS (ESI, m/z) 310.2 [M+H]$^{+}$.

Step 7: (S)-6-((5-Oxopyrrolidin-2-yl)methoxy)pyrido[3,4-g]isoquinolin-1(2H)-one (I-5)

To a solution of (S)-7-ethynyl-1-((5-oxopyrrolidin-2-yl)methoxy)isoquinoline-6-carboxamide (1.70 g, 5.50 mmol) in anhydrous pyridine (110 mL) was added chlorocyclopentadienylbis(triphenylphosphine)ruthenium(II) (400 mg, 0.55 mmol). The resulting solution was purged with nitrogen for 5 minutes, then heated at 90° C. under nitrogen for 15 hours. The reaction was cooled to room temperature. Solvent was removed under the reduced pressure. Solid obtained was suspended in dichloromethane (100 mL), and stirred at room temperature for 1 hour, then filtered, washed with dichloromethane (10 mL), hexane (20 mL), and dried to afford (S)-6-((5-oxopyrrolidin-2-yl)methoxy)pyrido[3,4-g]isoquinolin-1(2H)-one (1.65 g, 97%) as a pale yellow solid.

$^{1}$HNMR (400 MHz, DMSO-d$_{6}$) δ (ppm) 11.24 (d, J=5.6 Hz, 1H), 8.77 (s, 1H), 8.59 (d, J=0.9 Hz, 1H), 8.10 (s, 1H), 7.95 (d, J=6.1 Hz, 1H), 7.59 (dd, J=6.1, 0.9 Hz, 1H), 7.18 (dd, J=7.4, 5.6 Hz, 1H), 6.70 (d, J=7.4 Hz, 1H), 4.53 (dd, J=10.8, 4.4 Hz, 1H), 4.29 (dd, J=10.8, 7.3 Hz, 1H), 4.14-3.86 (m, 1H), 2.37-2.11 (m, 3H), 1.96-1.85 (m, 1H); MS (ESI, m/z) 310.2 [M+H]$^{+}$.

Step 8: (S)-4-Iodo-6-((5-oxopyrrolidin-2-yl)methoxy)pyrido[3,4-g]isoquinolin-1(2H)-one Intermediate II (I-6)

To a solution of (S)-6-((5-oxopyrrolidin-2-yl)methoxy)pyrido[3,4-g]isoquinolin-1(2H)-one (1.65 g, 5.34 mmol) in anhydrous pyridine (54 mL) was added iodine (5.43 g, 21.36 mmol). The resulting solution was stirred at 50° C. for 6 days, then cooled to room temperature. Reaction solution was poured into the mixture of saturated sodium bicarbonate aqueous solution and 10% of sodium sulfite aqueous solution (1/1, 100 mL), stirred at room temperature for 30 minutes. Precipitate was filtered, washed with water, 5% dichloromethane in hexane, hexane, and dried to afford (S)-4-Iodo-6-((5-oxopyrrolidin-2-yl)methoxy)pyrido[3,4-g]isoquinolin-1(2H)-one intermediate II (1.83 g, 79%) as a pale yellow solid.

$^{1}$HNMR (400 MHz, DMSO-d$_{6}$) δ (ppm) 11.50 (d, J=6.0 Hz, 1H), 8.81 (s, 1H), 8.49 (s, 1H), 8.06 (d, J=5.8 Hz, 1H), 7.93 (s, 1H), 7.68 (d, J=5.8 Hz, 1H), 7.64 (d, J=6.0 Hz, 1H), 4.58-4.46 (m, 2H), 4.13-4.06 (m, 1H), 2.40-2.47 (s, 1H), 2.35-2.17 (m, 2H), 2.06 (s, 1H); MS (ESI, m/z) 436.2 [M+H]$^{+}$.

Example 3

Preparation of Intermediate III

Intermediate III was prepared as follows.

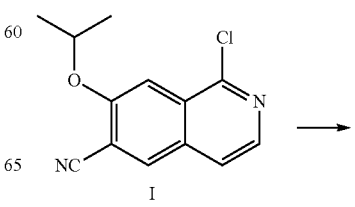

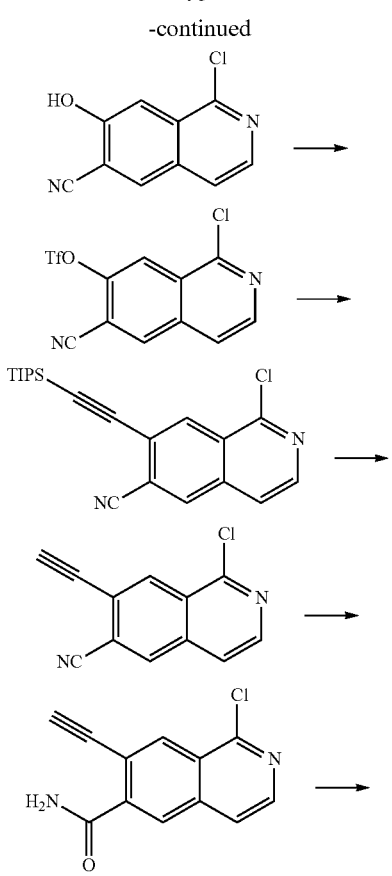

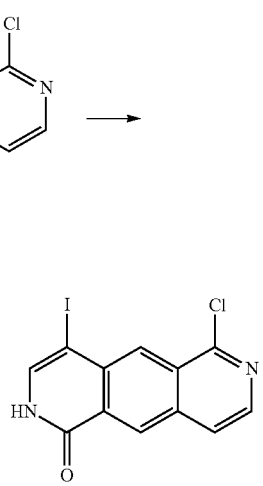

Step 1:
1-Chloro-7-hydroxyisoquinoline-6-carbonitrile

To a solution of 1-chloro-7-isopropoxyisoquinoline-6-carbonitrile intermediate I (7.19 g, 29.2 mmol) in anhydrous dichloromethane (300 mL) was added aluminum trichloride (11.7 g, 87.7 mmol). The resulting solution was heated at 50° C. under nitrogen for 5 hours. The reaction solution was cooled to room temperature. The solvents were removed under the reduced pressure. Solid obtained was added portionwise into ice-water (about 600 mL), and warmed up to 10° C. The precipitate was filtered, washed with water, hexane and dried to afford crude product of 1-chloro-7-hydroxyisoquinoline-6-carbonitrile (about 6 g, quantitative yield) as a pale yellow solid, which was pure and used directly in next step.

$^1$HNMR (400 MHz, DMSO-$d_6$) δ (ppm) 11.94 (s, 1H), 8.63 (s, 1H), 8.21 (d, J=5.6 Hz, 1H), 7.84 (d, J=5.6 Hz, 1H), 7.67 (s, 1H); MS (ESI, m/z) 205.1 [M+H]$^+$.

Step 2: 1-Chloro-6-cyanoisoquinolin-7-yl trifluoromethanesulfonate

To a solution of crude 1-chloro-7-hydroxyisoquinoline-6-carbonitrile (6.0 g, 29.2 mmol) was added 1,1,1-trifluoro-N-phenyl-N-((trifluoromethyl)sulfonyl)methanesulfonamide (10.4 g, 29.2 mmol) followed by triethylamine (11.8 g, 0.117 mol). The resulting solution was stirred at room temperature for 2 hours and 30 minutes, then diluted with dichloromethane (500 mL). Solution was washed with brine, dried over anhydrous magnesium sulfate, filtered, and concentrated under the reduced pressure to afford crude product, which was purified by silica gel chromatography (0 to 30% ethyl acetate in hexane gradient) to afford 1-chloro-6-cyanoisoquinolin-7-yl trifluoromethanesulfonate (6.25 g, 64% over 2 steps) as a white solid.

$^1$HNMR (400 MHz, DMSO-$d_6$) δ (ppm) 9.11 (s, 1H), 8.61 (d, J=5.6 Hz, 1H), 8.57 (s, 1H), 8.12-8.09 (m, 1H); MS (ESI, m/z) 337.1 [M+H]$^+$.

Step 3: 1-Chloro-7-((triisopropylsilyl)ethynyl)isoquinoline-6-carbonitrile

To a solution of 1-chloro-6-cyanoisoquinolin-7-yl trifluoromethanesulfonate (6.25 g, 18.6 mmol) and ethynyltriisopropylsilane (3.73 g, 20.5 mmol) in anhydrous tetrahydrofuran (50 mL) were added bis(triphenylphosphine) palladium chloride (653 mg, 0.93 mmol), copper(I) iodide (356 mg, 1.86 mmol) and triethylamine (10 mL). The resulting solution was purged with nitrogen for 5 minutes, then stirred at room temperature for 1 day. The reaction solution was diluted with ethyl acetate (400 mL), washed with brine, dried over anhydrous magnesium sulfate, filtered, and concentrated under the reduced pressure to afford crude product, which was purified by silica gel chromatography (0 to 20% ethyl acetate in hexane) to afford 1-chloro-7-((triisopropylsilyl)ethynyl)isoquinoline-6-carbonitrile (1 g, 15%) as a white solid.

$^1$HNMR (400 MHz, DMSO-$d_6$) δ (ppm) 8.84 (s, 1H), 8.51 (d, J=5.6 Hz, 1H), 8.44 (s, 1H), 8.01 (d, J=5.6 Hz, 1H), 1.19-1.13 (m, 21H); MS (ESI, m/z) 369.3 [M+H]$^+$.

Step 4:
1-Chloro-7-ethynylisoquinoline-6-carbonitrile

To a solution of 1-chloro-7-((triisopropylsilyl)ethynyl)isoquinoline-6-carbonitrile (997 mg, 2.71 mmol) in THF (28 mL) was added acetic acid (171 mg, 163 uL, 2.84 mmol) followed by tetra-n-butylammonium fluoride solution (1.0M in THF, 2.84 mL). The resulting solution was stirred at room temperature for 1 hour. Reaction solution was diluted with ethyl acetate (200 mL), washed with brine, dried over anhydrous magnesium sulfate, filtered, and concentrated under reduced pressure to afford crude product, which was purified by silica gel chromatography (0 to 20% ethyl acetate in hexane gradient) to afford 1-chloro-7-ethynylisoquinoline-6-carbonitrile (500 mg, 87%) as a white solid.

¹HNMR (400 MHz, DMSO-d₆) δ (ppm) 8.86 (s, 1H), 8.54-8.48 (m, 2H), 8.02 (d, J=5.6 Hz, 1H), 5.00 (s, 1H); MS (ESI, m/z) 213.1 [M+H]⁺.

Step 5:
1-Chloro-7-ethynylisoquinoline-6-carboxamide

To a solution of 1-chloro-7-ethynylisoquinoline-6-carbonitrile (498 mg, 2.35 mmol) in anhydrous DMSO (24 mL) was added potassium carbonate (973 mg, 7.05 mmol) followed by hydrogen peroxide solution (30%, 479 mg, 432 µL, 4.23 mmol). The resulting solution was stirred at room temperature for 4 hours. Then the mixture of saturated sodium bicarbonate aqueous solution and 10% of sodium sulfite aqueous solution (1/1, 72 mL) was added, and extracted with 2-methyl tetrahydrofuran (3×80 mL). The combined organic layers were dried over anhydrous magnesium sulfate, filtered, and concentrated under the reduced pressure to afford crude product. Solid obtained was suspended in dichloromethane, sonicated, filtered, washed with dichloromethane, and dried to afford product (222 mg) as a white solid. Filtrate was concentrated and purified by silica gel chromatography (0 to 50% acetone in hexane gradient) to afford additional product (46 mg). Combined product of 1-chloro-7-ethynylisoquinoline-6-carboxamide was 268 mg (50%).

¹HNMR (400 MHz, DMSO-d₆) δ (ppm) 8.40 (d, J=5.6 Hz, 1H), 8.36 (s, 1H), 8.19 (s, 1H), 8.06 (s, 1H), 8.01-7.96 (m, 1H), 7.76 (s, 1H), 4.57 (s, 1H); MS (ESI, m/z) 231.1 [M+H]⁺.

Step 6: 6-Chloropyrido[3,4-g]isoquinolin-1(2H)-one

To a solution of 1-chloro-7-ethynylisoquinoline-6-carboxamide (263 mg, 1.14 mmol) in anhydrous pyridine (23 mL) was added chlorocyclopentadienylbis(triphenylphosphine) ruthenium(II) (83 mg, 0.114 mmol). The resulting solution was purged with nitrogen for 5 minutes, then heated at 90° C. under nitrogen for 4 hours. Reaction solution was cooled to room temperature. The solvents were removed under the reduced pressure. Solid obtained was suspended in dichloromethane (50 mL) and sonicated for 30 minutes. Solution was filtered, washed with dichloromethane (10 mL), hexane (20 mL), and dried to afford 6-chloropyrido[3,4-g] isoquinolin-1(2H)-one (223 mg, 85%) as a dark yellow solid.

¹HNMR (400 MHz, DMSO-d₆) δ (ppm) 11.37 ((d, J=5.8 Hz, 1H), 8.99 (s, 1H), 8.59 (s, 1H), 8.30 (d, J=5.7 Hz, 1H), 8.14 (d, J=5.7 Hz, 1H), 7.26 (dd, J=7.2, 5.8 Hz, 1H), 6.87 (d, J=7.2 Hz, 1H); MS (ESI, m/z) 231.1 [M+H]⁺.

Step 7: 6-Chloro-4-iodopyrido[3,4-g]isoquinolin-1 (2H)-one intermediate III

To a solution of 6-chloropyrido[3,4-g]isoquinolin-1(2H)-one (223 mg, 0.97 mmol) in anhydrous pyridine (9.7 mL) was added iodine (985 mg, 3.88 mmol). The resulting solution was stirred at 50° C. for 8 days, then dichloromethane (10 mL) was added, and stirred for 30 minutes. Precipitate was filtered, washed with water, dichloromethane, hexane, and dried to afford 6-chloro-4-iodopyrido[3,4-g] isoquinolin-1(2H)-one intermediate III (251 mg, 73%) as a pale yellow solid.

¹HNMR (400 MHz, DMSO-d₆) δ (ppm) 11.64 (d, J=5.6 Hz, 1H), 9.01 (s, 1H), 8.51 (s, 1H), 8.38 (d, J=5.8 Hz, 1H), 8.20 (d, J=5.6 Hz, 1H), 7.73 (d, J=5.8 Hz, 1H); MS (ESI, m/z) 357.1 [M+H]⁺.

Example 4

Typical Procedure for Stille Coupling Reaction with Intermediate II

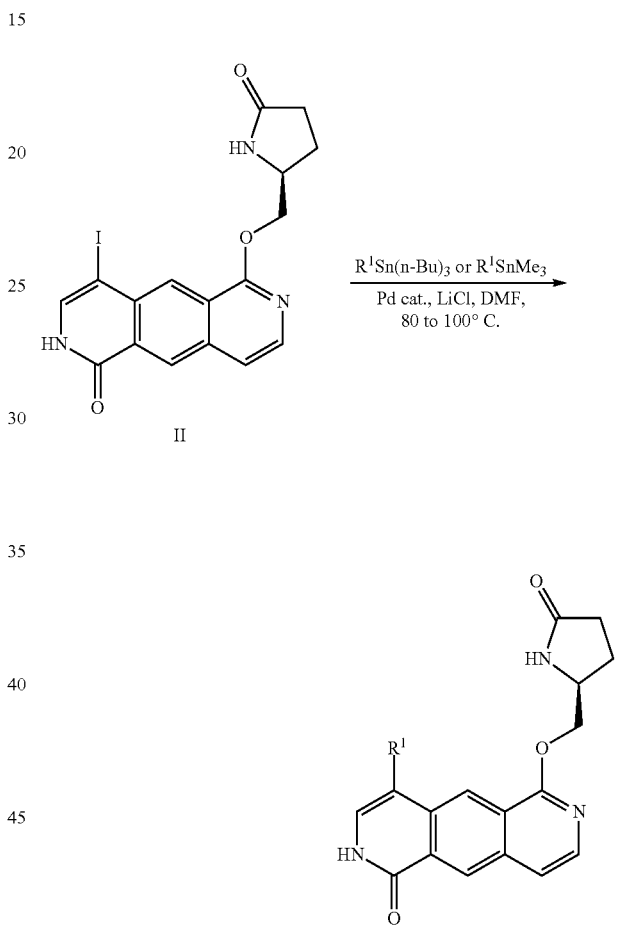

To a solution of (S)-4-iodo-6-((5-oxopyrrolidin-2-yl) methoxy)pyrido[3,4-g]isoquinolin-1(2H)-one intermediate II (0.1 mmol) and corresponding organic tin reagent (0.2 to 0.5 mmol) in anhydrous DMF (1 mL) were added bis (triphenylphosphine)palladium chloride (0.01 to 0.02 mmol) or tetrakis(triphenylphosphine)palladium(0) (0.01 to 0.02 mmol), lithium chloride (1 to 2 mmol). The reaction mixture was purged with nitrogen for 1 minute, then heated between 80 to 100° C. for from 4 hours to 19 hours. Reaction solution was cooled to room temperature, diluted with ethyl acetate (100 mL), washed with 10% of potassium fluoride aqueous (10 mL), brine, dried over anhydrous magnesium sulfate, filtered, and concentrated under the reduced pressure to afford crude product, which was purified by silica gel chromatography (eluent: 0 to 10% methanol in dichloromethane gradient) or reverse HPLC (acetonitrile in water with 0.1% formic acid gradient as the mobile phase).

(S)-4-Methyl-6-((5-oxopyrrolidin-2-yl)methoxy)pyrido[3,4-g]isoquinolin-1(2H)-one (I-25)

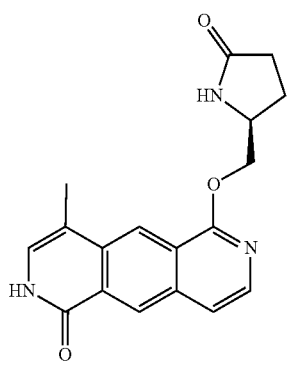

1HNMR (400 MHz, DMSO-d$_6$) δ (ppm) 11.13 (d, J=5.0 Hz, 1H), 8.82 (s, 1H), 8.43 (s, 1H), 8.12 (s, 1H), 8.00 (d, J=5.9 Hz, 1H), 7.62 (d, J=5.8 Hz, 1H), 7.05 (d, J=5.0 Hz, 1H), 4.56-4.47 (m, 1H), 4.45-4.36 (m, 1H), 4.14-4.02 (m, 1H), 2.42-2.14 (m, 6H), 2.01-1.89 (m, 1H); MS (ESI, m/z) 324.3 [M+H]+.

(S)-4-Methyl-6-((5-oxopyrrolidin-2-yl)methoxy)pyrido[3,4-g]isoquinolin-1(2H)-one formic acid salt (I-2)

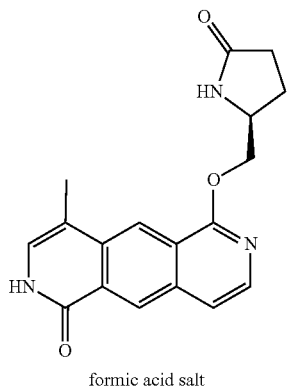 [SMILES: Cc1c[nH]c(=O)c2cc3ccnc(OC[C@@H]4CCC(=O)N4)c3cc12]

formic acid salt (S)-6-((5-Oxopyrrolidin-2-yl)methoxy)-4-vinylpyrido[3,4-g]isoquinolin-1(2H)-one (I-7)

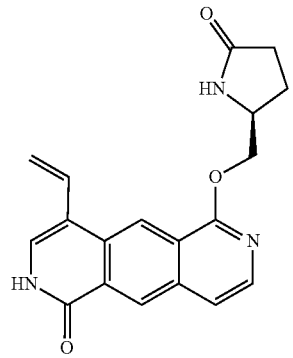 [SMILES: C=Cc1c[nH]c(=O)c2cc3ccnc(OC[C@@H]4CCC(=O)N4)c3cc12]

$^1$HNMR (400 MHz, DMSO-d$_6$) δ (ppm) 11.47 (s, 1H), 8.85 (s, 1H), 8.65 (s, 1H), 8.19 (s, 1H), 8.01 (d, J=6.0 Hz, 1H), 7.63 (d, J=6.0 Hz, 1H), 7.36 (d, J=0.9 Hz, 1H), 7.25-7.13 (m, 1H), 5.71 (dd, J=17.6, 1.5 Hz, 1H), 5.36 (dd, J=10.9, 1.5 Hz, 1H), 4.53 (dd, J=10.9, 4.0 Hz, 1H), 4.37 (dd, J=10.9, 6.8 Hz, 1H), 4.09 (tt, J=8.2, 4.4 Hz, 1H), 2.37-2.16 (m, 3H), 1.97-1.88 (m, 1H); MS (ESI, m/z) 336.2 [M+H]$^+$.

(S)-4-Allyl-6-((5-oxopyrrolidin-2-yl)methoxy)pyrido[3,4-g]isoquinolin-1(2H)-one (I-9)

$^1$HNMR (400 MHz, DMSO-d$_6$) δ (ppm) 11.21 (d, J=5.7 Hz, 1H), 8.83 (s, 1H), 8.51 (s, 1H), 8.05 (s, 1H), 8.00 (d, J=6.0 Hz, 1H), 7.62 (d, J=6.0 Hz, 1H), 7.03 (d, J=5.7 Hz, 1H), 6.04 (ddt, J=16.5, 10.1, 6.2 Hz, 1H), 5.25-5.16 (m, 1H), 5.12 (dd, J=10.1, 1.8 Hz, 1H), 4.49 (dd, J=10.9, 4.2 Hz, 1H), 4.42 (dd, J=10.9, 5.5 Hz, 1H), 4.10-4.01 (m, 1H), 3.62-3.47 (m, 2H), 2.38-2.19 (m, 3H), 2.01-1.92 (m, 1H); MS (ESI, m/z) 350.3 [M+H]$^+$.

85

(S)-6-((5-Oxopyrrolidin-2-yl)methoxy)-4-(prop-1-en-2-yl)pyrido[3,4-g]isoquinolin-1(2H)-one (I-11)

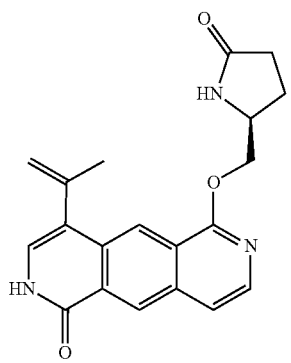 [SMILES: C=C(C)c1c[nH]c(=O)c2cc3ccnc(OC[C@@H]4CCC(=O)N4)c3cc12]

¹HNMR (400 MHz, DMSO-d₆) δ (ppm) 11.29 (d, J=5.8 Hz, 1H), 8.82 (s, 1H), 8.47 (s, 1H), 7.97 (d, J=6.0 Hz, 1H), 7.89 (s, 1H), 7.60 (d, J=6.0 Hz, 1H), 7.01 (d, J=5.8 Hz, 1H), 5.38 (s, 1H), 5.12 (s, 1H), 4.49-4.36 (m, 2H), 4.04 (dp, J=12.4, 4.8 Hz, 1H), 2.37-2.16 (m, 3H), 2.12 (s, 3H), 2.02-1.91 (m, 1H); MS (ESI, m/z) 350.3 [M+H]⁺.

(S,Z)-4-(2-Ethoxyvinyl)-6-((5-oxopyrrolidin-2-yl)methoxy)pyrido[3,4-g]isoquinolin-1(2H)-one (I-31)

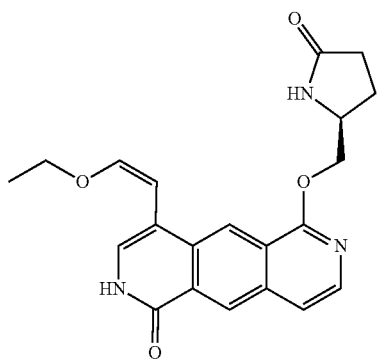 [SMILES: CCO/C=C\c1c[nH]c(=O)c2cc3ccnc(OC[C@@H]4CCC(=O)N4)c3cc12]

MS (ESI, m/z) 380.4 [M+H]⁺.

(S)-4-(1-Ethoxyvinyl)-6-((5-oxopyrrolidin-2-yl)methoxy)pyrido[3,4-g]isoquinolin-1(2H)-one (I-32)

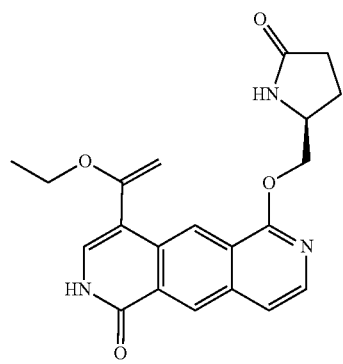 [SMILES: C=C(OCC)c1c[nH]c(=O)c2cc3ccnc(OC[C@@H]4CCC(=O)N4)c3cc12]

86

MS (ESI, m/z) 380.4 [M+H]⁺.

(S)-6-((5-Oxopyrrolidin-2-yl)methoxy)-4-(prop-1-yn-1-yl)pyrido[3,4-g]isoquinolin-1(2H)-one (I-24)

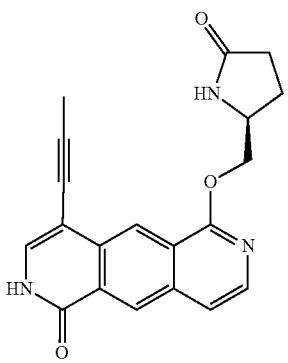

¹HNMR (400 MHz, DMSO-d₆) δ (ppm) 11.52 (d, J=5.6 Hz, 1H), 8.83 (s, 1H), 8.66 (s, 1H), 8.03 (d, J=5.8 Hz, 1H), 7.92 (s, 1H), 7.65 (d, J=5.8 Hz, 1H), 7.44 (d, J=5.6 Hz, 1H), 4.56-4.41 (m, 2H), 4.14-4.01 (m, 1H), 2.38-2.22 (m, 3H), 2.22 (s, 3H), 2.13-2.04 (m, 1H); MS (ESI, m/z) 348.3 [M+H]⁺.

(S)-6-((5-Oxopyrrolidin-2-yl)methoxy)-4-(1H-pyrazol-4-yl)pyrido[3,4-g]isoquinolin-1(2H)-one (I-33)

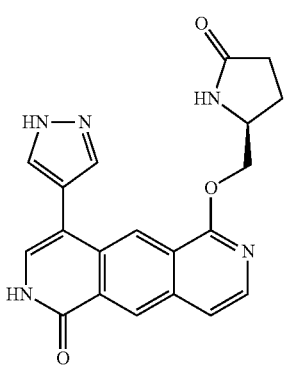 [SMILES: O=C1CC[C@@H](COc2nccc3cc4c(=O)[nH]cc(-c5cn[nH]c5)c4cc23)N1]

¹HNMR (400 MHz, DMSO-d₆) δ (ppm) 13.10 (s, 1H), 11.44 (d, J=5.8 Hz, 1H), 8.89 (s, 1H), 8.61 (s, 1H), 8.10 (s, 1H), 8.01 (d, J=6.0 Hz, 1H), 7.92 (s, 1H), 7.79 (s, 1H), 7.65 (d, J=6.0 Hz, 1H), 7.15 (d, J=5.8 Hz, 1H), 4.49 (dd, J=10.9, 4.3 Hz, 1H), 4.41 (dd, J=11.1, 5.3 Hz, 1H), 4.07-4.00 (s, 1H), 2.29-2.09 (m, 3H), 2.03-1.88 (m, 1H); MS (ESI, m/z) 376.4 [M+H]⁺.

Example 5

(S)-4-Ethyl-6-((5-oxopyrrolidin-2-yl)methoxy)pyrido[3,4-g]isoquinolin-1(2H)-one (I-8)

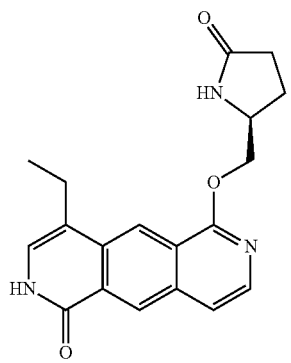 [SMILES: CCc1c[nH]c(=O)c2cc3ccnc(OC[C@@H]4CCC(=O)N4)c3cc12]

To a solution of (S)-6-((5-oxopyrrolidin-2-yl)methoxy)-4-vinylpyrido[3,4-g]isoquinolin-1(2H)-one (4.8 mg, 0.0143 mmol) in the mixture of methanol and tetrahydrofuran (2/1, 3 mL) was added 10% Pd/C (2 mg) and hydrogenated under 1 atm of hydrogen balloon for 1 hour. Reaction solution was filtered through Celite® and washed with the mixture of methanol and dichloromethane. All solvents were removed under the reduced pressure. Residue obtained was purified by reverse HPLC (5 to 33% acetonitrile in water with 0.1% formic acid gradient). Desired fractions were combined, diluted with ethyl acetate (100 mL), and washed with a little diluted sodium bicarbonate aqueous solution. Organic layers were dried over anhydrous magnesium sulfate, filtered, and concentrated under the reduced pressure to afford (S)-4-ethyl-6-((5-oxopyrrolidin-2-yl)methoxy)pyrido[3,4-g]isoquinolin-1(2H)-one (2.6 mg, 54%) as a pale yellow solid. $^1$HNMR (400 MHz, DMSO-$d_6$) δ (ppm) 11.16 (d, J=5.7 Hz, 1H), 8.84 (s, 1H), 8.50 (s, 1H), 8.07 (s, 1H), 8.00 (d, J=5.8 Hz, 1H), 7.62 (d, J=5.8 Hz, 1H), 6.98 (d, J=5.7 Hz, 1H), 4.51 (dd, J=11.0, 3.9 Hz, 1H), 4.42 (dd, J=11.0, 5.6 Hz, 1H), 4.11-4.03 (m, 1H), 2.84-2.76 (m, 2H), 2.40-2.19 (m, 3H), 2.02-1.92 (m, 1H), 1.28 (t, J=7.4 Hz, 3H); MS (ESI, m/z) 338.3 [M+H]$^+$.

Example 6

(S)-6-((5-Oxopyrrolidin-2-yl)methoxy)-4-propylpyrido[3,4-g]isoquinolin-1(2H)-one (I-10)

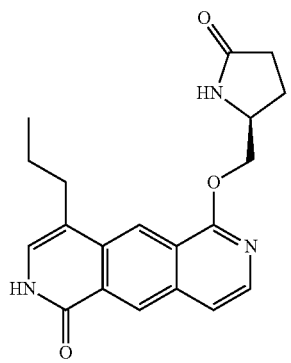 [SMILES: CCCc1c[nH]c(=O)c2cc3ccnc(OC[C@@H]4CCC(=O)N4)c3cc12]

To a solution of (S)-4-allyl-6-((5-oxopyrrolidin-2-yl)methoxy)pyrido[3,4-g]isoquinolin-1(2H)-one (6.5 mg, 0.0186 mmol) in the mixture of methanol and tetrahydrofuran (2/1, 3 mL) was added 10% Pd/C (4 mg) and hydrogenated under 1 atm of hydrogen balloon for 50 minutes. Reaction solution was filtered through Celite® and washed with the mixture of methanol and dichloromethane. All solvents were removed under the reduced pressure. Residue obtained was purified by reverse HPLC (5 to 40% acetonitrile in water with 0.1% formic acid gradient). Desired fractions were combined, diluted with ethyl acetate (100 mL), and washed with a little diluted sodium bicarbonate aqueous solution. Organic layers were dried over anhydrous magnesium sulfate, filtered, and concentrated under the reduced pressure to afford (S)-6-((5-oxopyrrolidin-2-yl)methoxy)-4-propylpyrido[3,4-g]isoquinolin-1(2H)-one (2.6 mg, 38%) as a pale yellow solid. $^1$HNMR (400 MHz, DMSO-$d_6$) δ (ppm) 11.16 (d, J=5.7 Hz, 1H), 8.84 (s, 1H), 8.47 (s, 1H), 8.02 (s, 1H), 7.99 (d, J=5.9 Hz, 1H), 7.62 (d, J=5.9 Hz, 1H), 7.00 (d, J=5.7 Hz, 1H), 4.47 (qd, J=11.0, 4.5 Hz, 2H), 4.07 (dq, J=8.7, 4.5 Hz, 1H), 2.73 (hept, J=7.3 Hz, 2H), 2.42-2.16 (m, 3H), 2.05-1.95 (m, 1H), 1.67 (h, J=7.4 Hz, 2H), 1.00 (t, J=7.3 Hz, 3H); MS (ESI, m/z) 352.4 [M+H]$^+$.

Example 7

(S)-2-(1-Oxo-6-((5-oxopyrrolidin-2-yl)methoxy)-1,2-dihydropyrido[3,4-g]isoquinolin-4-yl)acetaldehyde (I-34)

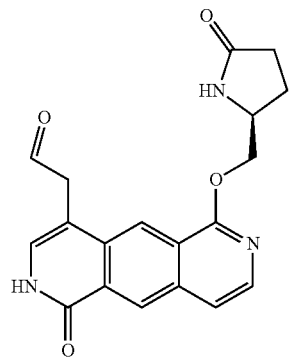 [SMILES: O=CCc1c[nH]c(=O)c2cc3ccnc(OC[C@@H]4CCC(=O)N4)c3cc12]

To a suspension solution of (S,Z)-4-(2-ethoxyvinyl)-6-((5-oxopyrrolidin-2-yl)methoxy) pyrido[3,4-g]isoquinolin-1(2H)-one (9.3 mg, 0.0245 mmol) in anhydrous dichloromethane (1 mL) was added trifluoroacetic acid (56 mg, 0.49 mmol). The resulting solution was stirred at room temperature for 1 hour. Then the reaction solution was diluted with ethyl acetate (60 mL), washed with a little diluted sodium bicarbonate aqueous solution until pH was around 6 to 7).

Organic layer was separated, dried over anhydrous sodium sulfate, filtered, and concentrated under the reduced pressure to afford crude (S)-2-(1-oxo-6-((5-oxopyrrolidin-2-yl)methoxy)-1,2-dihydropyrido[3,4-g]isoquinolin-4-yl)acetaldehyde, which was used directly in next step without purification. MS (ESI, m/z) 352.3 [M+H]$^+$.

Example 8

(S)-4-(2,2-Difluoroethyl)-6-((5-oxopyrrolidin-2-yl)methoxy)pyrido[3,4-g]isoquinolin-1(2H)-one (I-17)

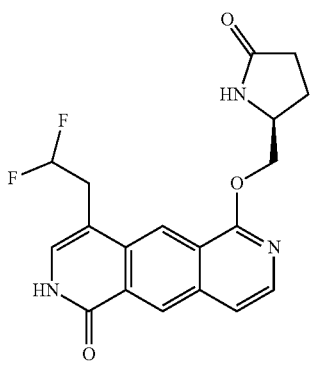

To a suspension solution of crude ((S)-2-(1-oxo-6-((5-oxopyrrolidin-2-yl)methoxy)-1,2-dihydropyrido[3,4-g]isoquinolin-4-yl)acetaldehyde (0.0245 mmol) from previous step in anhydrous dichloromethane (1 mL) at −78° C. was added diethylaminosulfur trifluoride (39.6 mg, 33 μL, 0.245 mmol), then reaction solution warmed up to room temperature and stirred for 1 hour. Reaction solution was quenched with a little diluted sodium bicarbonate aqueous solution and diluted with ethyl acetate (60 mL). Organic layer was separated, dried over anhydrous magnesium sulfate, filtered, and concentrated under the reduced pressure to afford crude product, which was purified by reverse HPLC (5 to 36% acetonitrile in water with 0.1% formic acid gradient). Desired fractions were combined, diluted with ethyl acetate (100 mL), and washed with a small amount of diluted sodium bicarbonate aqueous solution. Organic layers were dried over anhydrous magnesium sulfate, filtered, and concentrated under the reduced pressure to afford (S)-4-(2,2-difluoroethyl)-6-((5-oxopyrrolidin-2-yl)methoxy)pyrido[3,4-g]isoquinolin-1(2H)-one (3.0 mg, 33%) as a pale yellow solid. $^1$HNMR (400 MHz, DMSO-d$_6$) δ (ppm) 11.38 (d, J=5.8 Hz, 1H), 8.85 (s, 1H), 8.53 (s, 1H), 8.09 (s, 1H), 8.01 (d, J=5.9 Hz, 1H), 7.63 (d, J=5.9 Hz, 1H), 7.21 (d, J=5.8 Hz, 1H), 6.50-6.17 (m, 1H), 4.53 (dd, J=10.9, 3.9 Hz, 1H), 4.38 (dd, J=10.9, 6.3 Hz, 1H), 4.13-4.02 (m, 1H), 3.48-3.34 (m, 2H), 2.43-2.12 (m, 3H), 2.02-1.89 (m, 1H); MS (ESI, m/z) 374.4 [M+H]$^+$.

Example 9

(S)-4-(2-Hydroxyethyl)-6-((5-oxopyrrolidin-2-yl)methoxy)pyrido[3,4-g]isoquinolin-1(2H)-one (I-22)

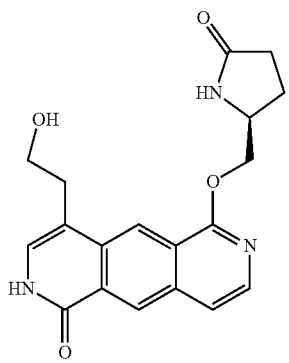 [SMILES: O=C1CC[C@@H](COc2nccc3cc4c(=O)[nH]cc(CCO)c4cc23)N1]

To a suspension solution of crude ((S)-2-(1-oxo-6-((5-oxopyrrolidin-2-yl)methoxy)-1,2-dihydropyrido[3,4-g]isoquinolin-4-yl)acetaldehyde (0.0245 mmol) from previous step in methanol at −78° C. was added sodium borohydride (9.2 mg, 0.245 mmol), and stirred at this temperature until reaction was complete. Reaction solution was quenched with a little sodium bicarbonate aqueous solution and diluted with ethyl acetate. Organic layer was separated, dried over anhydrous magnesium sulfate, filtered, and concentrated under the reduced pressure to afford crude product. Crude product was purified by silica gel chromatography (0 to 10% methanol in dichloromethane gradient) to afford (S)-4-(2-hydroxyethyl)-6-((5-oxopyrrolidin-2-yl)methoxy)pyrido[3,4-g]isoquinolin-1(2H)-one (1.3 mg, 15%) as a pale yellow solid. $^1$HNMR (400 MHz, DMSO-d$_6$) δ (ppm) 11.19 (d, J=5.6 Hz, 1H), 8.84 (s, 1H), 8.49 (s, 1H), 8.11 (s, 1H), 7.99 (d, J=6.0 Hz, 1H), 7.62 (d, J=6.0 Hz, 1H), 7.04 (d, J=5.6 Hz, 1H), 4.77 (t, J=5.5 Hz, 1H), 4.55-4.41 (m, 2H), 4.09 (s, 1H), 3.75-3.63 (m, 2H), 2.97-2.84 (m, 2H), 2.42-2.19 (m, 3H), 2.04-1.89 (m, 1H); MS (ESI, m/z) 354.3 [M+H]$^+$.

Example 10

(S)-4-Acetyl-6-((5-oxopyrrolidin-2-yl)methoxy)pyrido[3,4-g]isoquinolin-1(2H)-one (I-28)

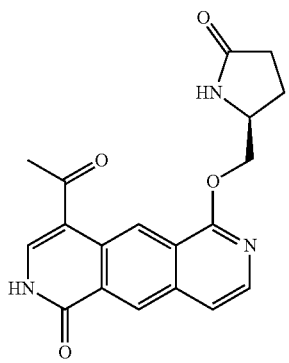 [SMILES: CC(=O)c1c[nH]c(=O)c2cc3ccnc(OC[C@@H]4CCC(=O)N4)c3cc12]

Crude product of (S)-4-(1-ethoxyvinyl)-6-((5-oxopyrrolidin-2-yl)methoxy)pyrido[3,4-g]isoquinolin-1(2H)-one (0.0952 mmol) from previous step was dissolved in anhydrous dichloromethane (6 mL), and trifluoroacetic acid (0.2 mL) was added. The resulting solution was stirred at room temperature for 1 hour. 1,2-Dichloroethane (5 mL) was added, and all solvents were removed under reduced pressure. Residue obtained was dissolved in methanol with 10% dichloromethane (5 mL), filtered through PL-HCO$_3^-$ resin, and washed with methanol. Filtrate was concentrated under the reduced pressure. Crude product obtained was purified by silica gel chromatography (0 to 6% methanol in dichloromethane gradient) to afford (S)-4-acetyl-6-((5-oxopyrrolidin-2-yl)methoxy) pyrido[3,4-g]isoquinolin-1(2H)-one (25 mg, 75% over 2 steps) as a pale yellow solid. $^1$HNMR (400 MHz, DMSO-d$_6$) δ (ppm) 11.98 (s, 1H), 9.87 (s, 1H), 8.84 (s, 1H), 8.23 (s, 1H), 8.03 (d, J=5.8 Hz, 1H), 7.83 (s, 1H), 7.62 (d, J=5.8 Hz, 1H), 4.54 (dd, J=11.0, 4.8 Hz, 1H), 4.46 (dd, J=11.0, 4.5 Hz, 1H), 4.06-4.00 (m, 1H), 2.58 (s, 3H), 2.57-2.55 (m, 1H), 2.34-2.17 (m, 2H), 2.15-2.05 (m, 1H); MS (ESI, m/z) 352.3 [M+H]$^+$.

Example 11

(S)-4-(2-Hydroxypropan-2-yl)-6-((5-oxopyrrolidin-2-yl)methoxy)pyrido[3,4-g]isoquinolin-1(2H)-one
(I-20)

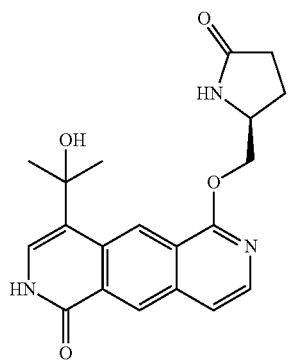 [SMILES: CC(C)(O)c1c[nH]c(=O)c2cc3ccnc(OC[C@@H]4CCC(=O)N4)c3cc12]

To a solution of (S)-4-acetyl-6-((5-oxopyrrolidin-2-yl)methoxy)pyrido[3,4-g]isoquinolin-1(2H)-one (25 mg, 0.072 mmol) in anhydrous tetrahydrofuran (1 mL) at 0° C. was added methylmagnesium chloride solution (3.0M in THF, 0.5 mL, 1.44 mmol). Reaction solution was stirred at room temperature for 1 hour and was then carefully quenched with saturated ammonium chloride aqueous solution with drops of hydrogen chloride aqueous solution (2N) until pH was around 7. The solution was extracted with ethyl acetate (3×20 mL). The combined organic layers were dried over anhydrous magnesium sulfate, filtered, and concentrated under the reduced pressure. Crude product obtained was purified by silica gel chromatography (0 to 15% methanol in dichloromethane gradient) to afford (S)-4-(2-hydroxypropan-2-yl)-6-((5-oxopyrrolidin-2-yl)methoxy)pyrido[3,4-g]isoquinolin-1(2H)-one (18 mg, 68%) as a pale yellow solid. $^1$HNMR (400 MHz, DMSO-d$_6$) δ (ppm) 11.16 (d, J=5.9 Hz, 1H), 9.33 (s, 1H), 8.84 (s, 1H), 7.99 (d, J=5.8 Hz, 1H), 7.81 (s, 1H), 7.59 (d, J=5.8 Hz, 1H), 7.06 (d, J=5.9 Hz, 1H), 5.16 (s, 1H), 4.54-4.46 (m, 2H), 4.08-4.04 (m, 1H), 2.59-2.51 (m, 1H), 2.35-2.14 (m, 2H), 2.14-2.02 (m, 1H), 1.64 (s, 6H); MS (ESI, m/z) 350.3 [M–H$_2$O+H]$^+$.

Example 12

(S)-4-(2-Azidopropan-2-yl)-6-((5-oxopyrrolidin-2-yl)methoxy)pyrido[3,4-g]isoquinolin-1(2H)-one
(I-35)

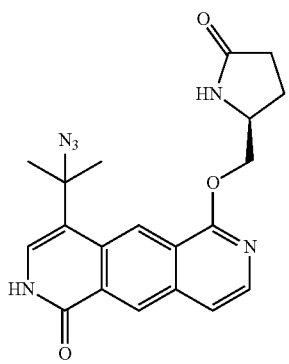 [SMILES: CC(C)(N=[N+]=[N-])c1c[nH]c(=O)c2cc3ccnc(OC[C@@H]4CCC(=O)N4)c3cc12]

To a solution of (S)-4-(2-hydroxypropan-2-yl)-6-((5-oxopyrrolidin-2-yl)methoxy)pyrido [3,4-g]isoquinolin-1 (2H)-one (4 mg, 0.011 mmol) in trifluoroacetic acid (0.5 mL) was added sodium azide (10 mg, 0.154 mmol). Reaction solution was stirred at room temperature for 4 hours. 1,2-Dichloroethane (2 mL) was added, and all solvents was removed under the reduced pressure. Crude product was dissolved in methanol, and filtered through PL-HCO$_3^-$ resin, and washed with methanol. Filtrate was concentrated under the reduced pressure. Crude product obtained was purified by reverse HPLC (5 to 36% acetonitrile in water with 0.1% formic acid gradient). Desired fractions were combined, diluted with ethyl acetate (100 mL), and washed with a little diluted sodium bicarbonate aqueous solution. Organic layers were dried over anhydrous magnesium sulfate, filtered, and concentrated under the reduced pressure to afford (S)-4-(2-azidopropan-2-yl)-6-((5-oxopyrrolidin-2-yl)methoxy) pyrido[3,4-g]isoquinolin-1(2H)-one (3 mg, 70%) as a white solid. MS (ESI, m/z) 350.3 [M-N$_3$]$^+$.

Example 13

(S)-4-(2-Aminopropan-2-yl)-6-((5-oxopyrrolidin-2-yl)methoxy)pyrido[3,4-g] isoquinolin-1(2H)-one
(I-26)

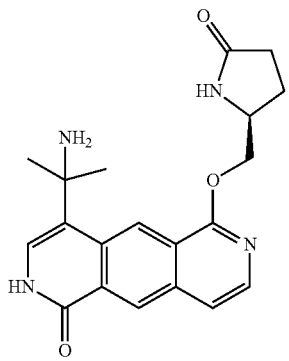 [SMILES: CC(C)(N)c1c[nH]c(=O)c2cc3ccnc(OC[C@@H]4CCC(=O)N4)c3cc12]

To a solution of S)-4-(2-azidopropan-2-yl)-6-((5-oxopyrrolidin-2-yl)methoxy)pyrido[3,4-g]isoquinolin-1(2H)-one (3 mg, 7.7 μmol) in methanol (2 mL) was added 10% Pd/C (1 mg) and hydrogenated under 1 atm of hydrogen balloon for 40 minutes. Reaction solution was filtered through Celite® and washed with the mixture of methanol and dichloromethane. All solvents were removed under the reduced pressure. Residue obtained was purified by reverse HPLC (5 to 26% acetonitrile in water with 0.1% formic acid gradient). Desired fractions were combined, and HCl aqueous solution (1M, 20 μL) was added. The resulting solution was lyophilized to afford hydrogen chloride salt (2 equivalent) of (S)-4-(2-aminopropan-2-yl)-6-((5-oxopyrrolidin-2-yl)methoxy)pyrido[3,4-g]isoquinolin-1(2H)-one (0.4 mg, 12%) as a pale yellow solid. ¹HNMR (400 MHz, DMSO-d6) δ (ppm) 11.61 (s, 1H), 8.96 (s, 1H), 8.76-8.55 (m, 1H), 8.07 (d, J=5.9 Hz, 1H), 7.97 (s, 1H), 7.67 (d, J=5.9 Hz, 1H), 7.22 (s, 1H), 7.10 (s, 1H), 7.01 (d, J=6.2 Hz, 1H), 6.97 (s, 1H), 6.52 (s, 1H), 4.58-4.50 (m, 1H), 4.49-4.42 (m, 1H), 4.18-4.01 (m, 1H), 2.37-2.20 (m, 4H), 1.88 (s, 3H), 1.85 (s, 3H); MS (ESI, m/z) Calculated 366.1692; Found 367.4 [M+H]⁺.

Example 14

4-(1-Hydroxyethyl)-6-(((S)-5-oxopyrrolidin-2-yl)methoxy)pyrido[3,4-g]isoquinolin-1(2H)-one (I-36)

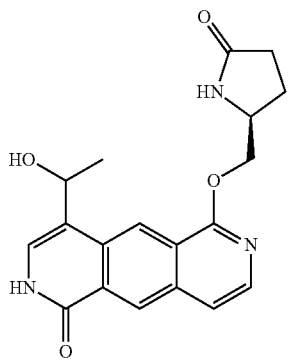 [SMILES: CC(O)c1c[nH]c(=O)c2cc3ccnc(OC[C@@H]4CCC(=O)N4)c3cc12]

To a solution of (S)-4-acetyl-6-((5-oxopyrrolidin-2-yl)methoxy)pyrido[3,4-g]isoquinolin-1(2H)-one (9.2 mg, 0.0262 mmol) in the mixture of methanol (2 mL) and tetrahydrofuran (2 mL) at 0° C. was added sodium borohydride (2 mg, 0.0524 mmol). The resulting solution was stirred at this temperature for 2 hours. Then a drop of hydrogen chloride solution (2N) was added to quench the reaction. Most of solvents were removed. Clear solution obtained was purified by reverse HPLC (5 to 31% acetonitrile in water with 0.1% formic acid gradient). Desired fractions were combined and diluted with ethyl acetate (100 mL). Solution was washed with a little diluted sodium bicarbonate aqueous solution. Organic layer was separated, dried over anhydrous magnesium sulfate, filtered, and concentrated under the reduced pressure to afford 4-(1-hydroxyethyl)-6-(((S)-5-oxopyrrolidin-2-yl)methoxy)pyrido[3,4-g]isoquinolin-1(2H)-one (3.4 mg, 37%) as a pale yellow solid. ¹HNMR (400 MHz, DMSO-d₆) δ (ppm) 11.20 (d, J=5.8 Hz, 1H), 8.84 (s, 1H), 8.67 (d, J=6.5 Hz, 1H), 8.05-7.93 (m, 2H), 7.61 (d, J=6.5 Hz, 1H), 7.14 (d, J=5.8 Hz, 1H), 5.24 (d, J=4.5 Hz, 1H), 5.22-5.10 (m, 1H), 4.56-4.48 (m, 1H), 4.47-4.37 (m, 1H), 4.08 (s, 1H), 2.44-2.15 (m, 3H), 2.06-1.92 (m, 1H), 1.50 (t, J=6.9 Hz, 3H); MS (ESI, m/z) 336.3 [M+H-H₂O]⁺.

Example 15

4-(2-Hydroxybut-3-yn-2-yl)-6-(((S)-5-oxopyrrolidin-2-yl)methoxy)pyrido[3,4-g]isoquinolin-1(2H)-one (I-37)

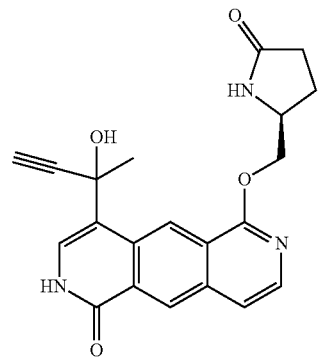 [SMILES: C#CC(C)(O)c1c[nH]c(=O)c2cc3ccnc(OC[C@@H]4CCC(=O)N4)c3cc12]

To a solution of (S)-4-acetyl-6-((5-oxopyrrolidin-2-yl)methoxy)pyrido[3,4-g]isoquinolin-1(2H)-one (10.2 mg, 0.029 mmol) in anhydrous tetrahydrofuran (1 mL) at 0° C. was added ethynylmagnesium bromide solution (0.5M in tetrahydrofuran, 0.3 mL, 0.145 mmol). Reaction solution warmed up to room temperature and stirred for 3 hours. Additional ethynylmagnesium bromide solution (0.5M in tetrahydrofuran, 0.6 mL, 0.29 mmol), and stirred at room temperature for 2 days. Reaction was quenched with water and neutralized with aqueous hydrogen chloride solution (2N) until pH was around 8). Solution was extracted with ethyl acetate. Organic layer was dried over anhydrous magnesium sulfate, filtered, and concentrated under the reduced pressure. Crude product was purified by silica gel chromatography (0 to 5% methanol in dichloromethane gradient) to afford 4-(2-hydroxybut-3-yn-2-yl)-6-(((S)-5-oxopyrrolidin-2-yl)methoxy)pyrido[3,4-g]isoquinolin-1(2H)-one (5.0 mg, 46%) as a pale yellow solid. ¹HNMR (400 MHz, DMSO-d₆) δ (ppm) 11.26 (d, J=5.8 Hz, 1H), 9.35-9.22 (m, 1H), 8.85 (s, 1H), 8.00 (d, J=5.6 Hz, 1H), 7.78 (d, J=5.6 Hz, 1H), 7.61 (d, J=5.8 Hz, 1H), 7.36-7.28 (m, 1H), 6.29-6.24 (m, 1H), 4.58-4.40 (m, 2H), 4.05 (dd, J=8.0, 4.1 Hz, 1H), 3.60-3.52 (m, 1H), 2.60-2.51 (m, 1H), 2.37-2.04 (m, 3H), 1.90-1.83 (m, 3H); MS (ESI, m/z) 360.3 [M+H-H₂O]⁺.

Example 16

Typical Procedure for Negishi Coupling Reaction with Intermediate II

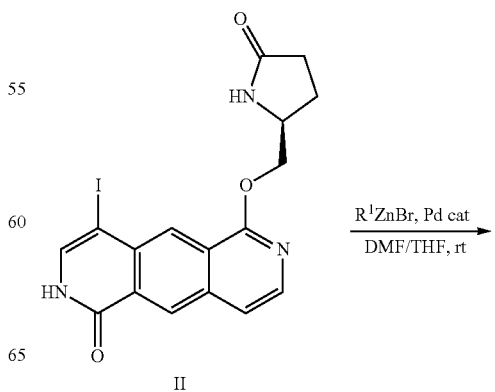

-continued

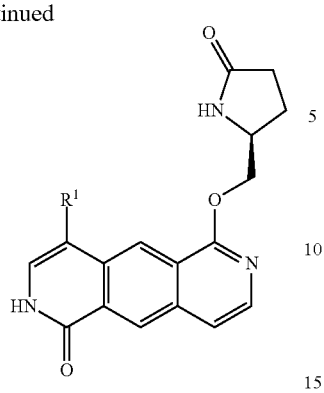

To a solution of (S)-4-iodo-6-((5-oxopyrrolidin-2-yl)methoxy)pyrido[3,4-g]isoquinolin-1(2H)-one intermediate II (0.1 mmol) in anhydrous N,N-dimethylformamide (1 mL) was added tetrakis(triphenylphosphine)palladium(0) (0.01 mmol) or combination of palladium acetate (0.01 mmol) and 2'-(dicyclohexylphosphanyl)-$N^2,N^2,N^6,N^6$-tetramethyl [1,1'-biphenyl]-2,6-diamine (CPhos) (0.02 mmol), then purged with nitrogen for 1 minute, then the corresponding solution of organozinc reagent in tetrahydrofuran (2 mmol) was added and the solution became clear. The resulting solution was further purged with nitrogen for 1 minute and stirred at room temperature between 4 hours and 2 days. Reaction solution was carefully quenched with the mixture solution of 10% sodium sulfite and saturated sodium bicarbonate solution (1/1, 10 mL). The solution was extracted with ethyl acetate (3×40 mL), washed with brine (10 mL), dried over anhydrous magnesium sulfate, filtered, and concentrated under the reduced pressure. Crude product was purified by silica gel chromatography (eluent: 0 to 10% methanol in dichloromethane gradient) or reverse HPLC (acetonitrile in water with 0.1% formic acid gradient as the mobile phase).

(S)-4-Cyclopropyl-6-((5-oxopyrrolidin-2-yl)methoxy)pyrido[3,4-g]isoquinolin-1(2H)-one (I-14)

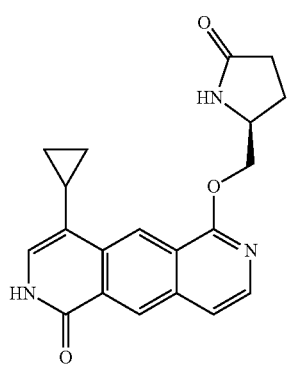 [SMILES: O=C1CC[C@@H](COc2nccc3cc4c(=O)[nH]cc(C5CC5)c4cc23)N1]

$^1$HNMR (400 MHz, DMSO-$d_6$) δ (ppm) 11.14 (d, J=5.3 Hz, 1H), 8.82 (s, 2H), 8.01 (d, J=6.0 Hz, 1H), 7.97 (s, 1H), 7.63 (d, J=6.0 Hz, 1H), 6.93 (d, J=5.3 Hz, 1H), 4.55-4.40 (m, 2H), 4.08 (dd, J=8.1, 3.9 Hz, 1H), 2.43 (ddd, J=16.2, 9.6, 6.3 Hz, 1H), 2.35-2.16 (m, 2H), 2.08-1.92 (m, 2H), 0.99 (dtt, J=13.5, 9.1, 4.2 Hz, 2H), 0.63 (dq, J=9.1, 5.0 Hz, 1H), 0.53 (td, J=8.5, 5.0 Hz, 1H); MS (ESI, m/z) 350.3 [M+H]$^+$.

(S)-4-Isopropyl-6-((5-oxopyrrolidin-2-yl)methoxy)pyrido[3,4-g]isoquinolin-1(2H)-one (I-15)

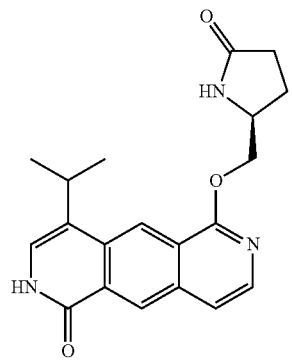 [SMILES: CC(C)c1c[nH]c(=O)c2cc3ccnc(OC[C@@H]4CCC(=O)N4)c3cc12]

$^1$HNMR (400 MHz, DMSO-$d_6$) δ (ppm) 11.19 (d, J=5.8 Hz, 1H), 8.85 (s, 1H), 8.57 (s, 1H), 8.06 (s, 1H), 8.00 (d, J=6.0 Hz, 1H), 7.62 (d, J=6.0 Hz, 1H), 6.93 (d, J=5.8 Hz, 1H), 4.51 (dd, J=11.0, 3.9 Hz, 1H), 4.43 (dd, J=11.0, 5.4 Hz, 1H), 4.12-4.02 (m, 1H), 3.40 (p, J=6.9 Hz, 1H), 2.42-2.17 (m, 3H), 2.04-1.90 (m, 1H), 1.31 (t, J=7.3 Hz, 6H); MS (ESI, m/z) 352.4 [M+H]$^+$.

(S)-4-Cyclobutyl-6-((5-oxopyrrolidin-2-yl)methoxy)pyrido[3,4-g]isoquinolin-1(2H)-one (I-12)

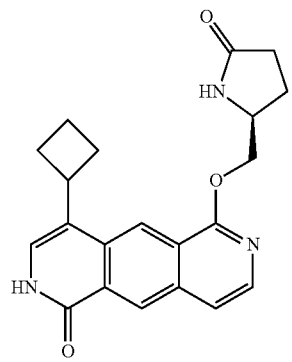 [SMILES: O=C1CC[C@@H](COc2nccc3cc4c(=O)[nH]cc(C5CCC5)c4cc23)N1]

$^1$HNMR (400 MHz, DMSO-$d_6$) δ (ppm) 11.18 (d, J=5.8 Hz, 1H), 8.82 (s, 1H), 8.37 (s, 1H), 8.03 (s, 1H), 7.99 (d, J=6.0 Hz, 1H), 7.61 (d, J=6.0 Hz, 1H), 6.88 (d, J=5.8 Hz, 1H), 4.46 (d, J=4.5 Hz, 2H), 4.08 (dq, J=8.7, 4.5 Hz, 1H), 3.79 (p, J=8.1 Hz, 1H), 2.49-2.37 (m, 2H), 2.36-2.19 (m, 3H), 2.19-1.97 (m, 4H), 1.86 (dq, J=10.4, 5.7 Hz, 1H); MS (ESI, m/z) 364.4 [M+H]$^+$.

(S)-4-Cyclopentyl-6-((5-oxopyrrolidin-2-yl)
methoxy)pyrido[3,4-g]isoquinolin-1(2H)-one (I-13)

tert-Butyl (S)-2-(1-oxo-6-((5-oxopyrrolidin-2-yl)
methoxy)-1,2-dihydropyrido[3,4-g]isoquinolin-4-yl)
acetate (I-39)

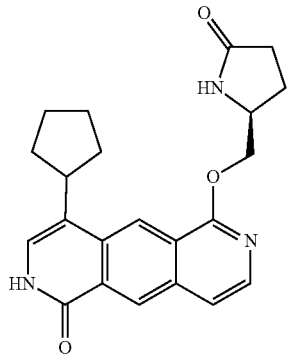

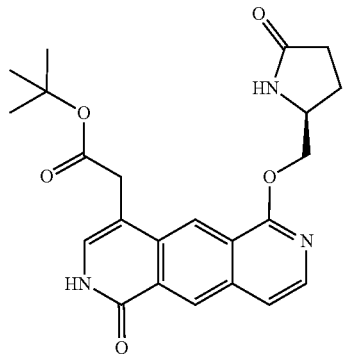

MS (ESI, m/z) 424.5 [M+H]$^+$.

Example 17

(S)-2-(1-Oxo-6-((5-oxopyrrolidin-2-yl)methoxy)-1,
2-dihydropyrido[3,4-g]isoquinolin-4-yl)acetic acid
(I-40)

$^1$HNMR (400 MHz, DMSO-d$_6$) δ (ppm) 11.12 (d, J=5.8 Hz, 1H), 8.81 (s, 1H), 8.55 (s, 1H), 8.01-7.95 (m, 2H), 7.59 (d, J=6.0 Hz, 1H), 6.92 (d, J=5.8 Hz, 1H), 4.52-4.38 (m, 2H), 4.05 (dq, J=7.9, 4.1 Hz, 1H), 3.37 (q, J=8.2 Hz, 1H), 2.38-2.18 (m, 3H), 2.15-2.04 (m, 2H), 2.04-1.93 (m, 1H), 1.74 (h, J=6.0 Hz, 4H), 1.67-1.46 (m, 2H); MS (ESI, m/z) 378.4 [M+H]$^+$.

tert-Butyl (S)-3-(1-oxo-6-((5-oxopyrrolidin-2-yl)
methoxy)-1,2-dihydropyrido[3,4-g]isoquinolin-4-yl)
azetidine-1-carboxylate (I-38)

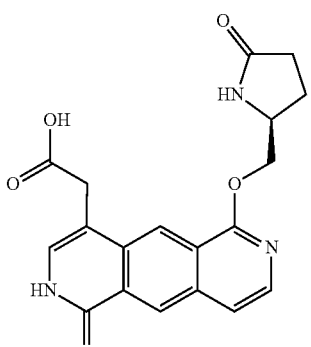

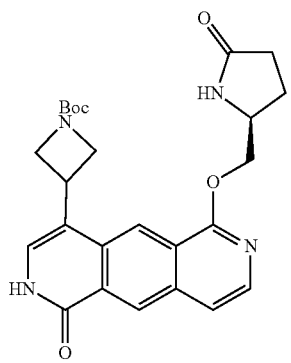 [SMILES: CC(C)(C)OC(=O)N1CC(c2c[nH]c(=O)c3cc4ccnc(OC[C@@H]5CCC(=O)N5)c4cc23)C1]

To a solution of tert-butyl (S)-2-(1-oxo-6-((5-oxopyrrolidin-2-yl)methoxy)-1,2-dihydropyrido[3,4-g] isoquinolin-4-yl)acetate (8.2 mg, 0.0194 mmol) in anhydrous dichloromethane (2 mL) was added trifluoroacetic acid (0.2 mL). The resulting solution was stirred at room temperature for 1 day. 1,2-Dichloroethane (2 mL) was added, and all solvents were removed under the reduced pressure. Crude product of (S)-2-(1-oxo-6-((5-oxopyrrolidin-2-yl)methoxy)-1,2-dihydropyrido[3,4-g]isoquinolin-4-yl)acetic acid was directly used in next step. MS (ESI, m/z) 368.4 [M+H]$^+$.

MS (ESI, m/z) 465.4 [M+H]$^+$.

Example 18

(S)-2-(1-Oxo-6-((5-oxopyrrolidin-2-yl)methoxy)-1,2-dihydropyrido[3,4-g]isoquinolin-4-yl)acetamide (I-41)

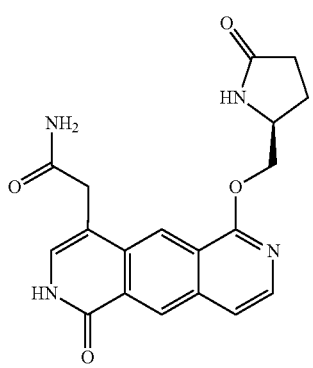 [SMILES: NC(=O)Cc1c[nH]c(=O)c2cc3ccnc(OC[C@@H]4CCC(=O)N4)c3cc12]

To crude product of (S)-2-(1-oxo-6-((5-oxopyrrolidin-2-yl)methoxy)-1,2-dihydropyrido[3,4-g]isoquinolin-4-yl)acetic acid (0.0194 mmol) in anhydrous N,N-dimethylacetamide (1 mL) was added ammonium chloride (1.1 mg, 0.0213 mmol) and N,N-diisopropyl ethylamine (10 mg, 0.0776 mmol) followed by HATU (1-[bis(dimethylamino)methylene]-1H-1,2,3-triazolo[4,5-b]pyridinium 3-oxide hexafluoro phosphate) (8.1 mg, 0.0213 mmol). The resulting solution was stirred at room temperature for 2 days. A drop of water was added. Crude reaction solution was filtered and purified by reverse HPLC (5 to 30% acetonitrile in water with 0.1% formic acid gradient). Desired fractions were combined and diluted with ethyl acetate (100 mL). Solution was added drops of sodium bicarbonate aqueous solution until pH was around 8. Organic layer was separated, dried over anhydrous magnesium sulfate, filtered, and concentrated under the reduced pressure to afford (S)-2-(1-oxo-6-((5-oxopyrrolidin-2-yl)methoxy)-1,2-dihydropyrido[3,4-g]isoquinolin-4-yl)acetamide (1.6 mg, 23% over 2 steps). $^1$HNMR (400 MHz, DMSO-$d_6$) δ (ppm) 11.20 (d, J=5.3 Hz, 1H), 8.80 (s, 1H), 8.47 (s, 1H), 7.96 (d, J=5.9 Hz, 1H), 7.93 (s, 1H), 7.59 (d, J=5.9 Hz, 1H), 7.52 (s, 1H), 7.08 (d, J=5.3 Hz, 1H), 6.97 (s, 1H), 4.51-4.31 (m, 2H), 4.08-3.97 (m, 1H), 3.63-3.49 (m, 2H), 2.28-2.11 (m, 3H), 2.01-1.93 (m, 1H); MS (ESI, m/z) 367.4 [M+H]$^+$.

Example 19

(S)-4-(Azetidin-3-yl)-6-((5-oxopyrrolidin-2-yl)methoxy)pyrido[3,4-g]isoquinolin-1(2H)-one (I-23)

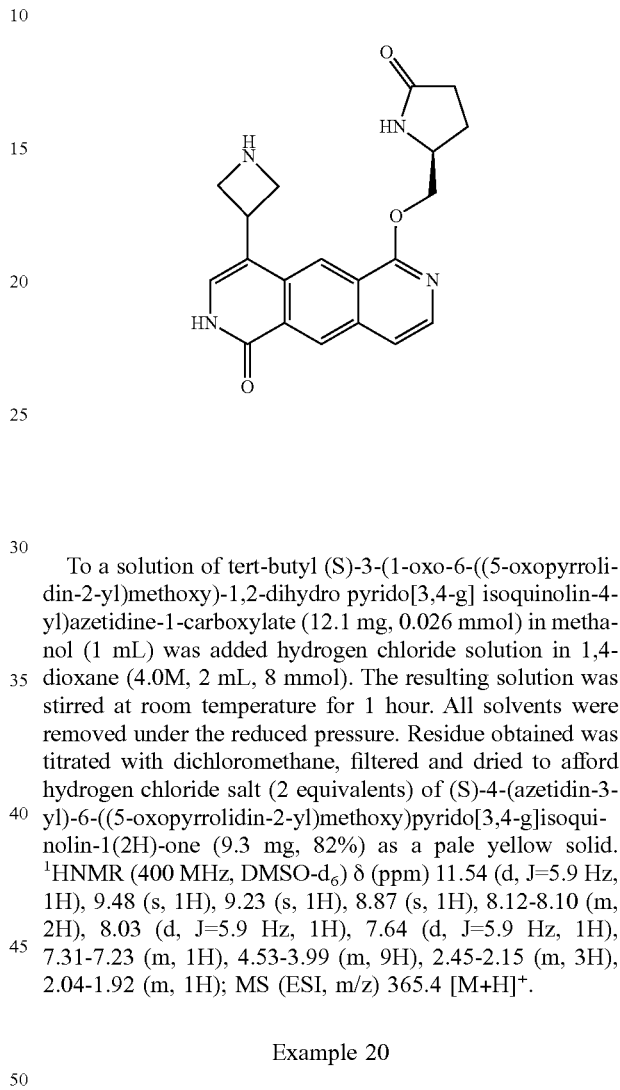

To a solution of tert-butyl (S)-3-(1-oxo-6-((5-oxopyrrolidin-2-yl)methoxy)-1,2-dihydro pyrido[3,4-g] isoquinolin-4-yl)azetidine-1-carboxylate (12.1 mg, 0.026 mmol) in methanol (1 mL) was added hydrogen chloride solution in 1,4-dioxane (4.0M, 2 mL, 8 mmol). The resulting solution was stirred at room temperature for 1 hour. All solvents were removed under the reduced pressure. Residue obtained was titrated with dichloromethane, filtered and dried to afford hydrogen chloride salt (2 equivalents) of (S)-4-(azetidin-3-yl)-6-((5-oxopyrrolidin-2-yl)methoxy)pyrido[3,4-g]isoquinolin-1(2H)-one (9.3 mg, 82%) as a pale yellow solid. $^1$HNMR (400 MHz, DMSO-$d_6$) δ (ppm) 11.54 (d, J=5.9 Hz, 1H), 9.48 (s, 1H), 9.23 (s, 1H), 8.87 (s, 1H), 8.12-8.10 (m, 2H), 8.03 (d, J=5.9 Hz, 1H), 7.64 (d, J=5.9 Hz, 1H), 7.31-7.23 (m, 1H), 4.53-3.99 (m, 9H), 2.45-2.15 (m, 3H), 2.04-1.92 (m, 1H); MS (ESI, m/z) 365.4 [M+H]$^+$.

Example 20

Typical Procedure for Sonogashira Coupling Reaction with Intermediate II

To a suspension solution of II (0.1 mmol) and substituted alkyne (0.2 to 0.5 mmol) in anhydrous N,N-dimethylformamide (1 mL) was added tetrakis(triphenylphosphine)palladium(0) (0.01 mmol), copper (I) iodide (0.01 mmol) and triethylamine (0.4 mmol). The resulting solution was purged with nitrogen for 1 min, then heated at 70° C. under nitrogen for 16 hours. The reaction solution was cooled to room temperature and diluted with ethyl acetate (100 mL). The solution was washed with brine, dried over anhydrous magnesium sulfate, filtered, and concentrated under the reduced pressure. Crude product was purified by silica gel chromatography (eluent: 0 to 10% methanol in dichloromethane gradient) or reverse HPLC (acetonitrile in water with 0.1% formic acid gradient as the mobile phase).

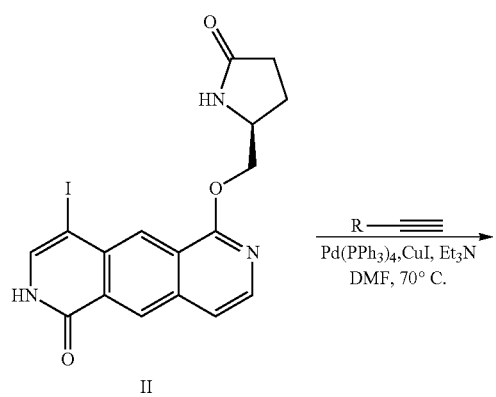

II

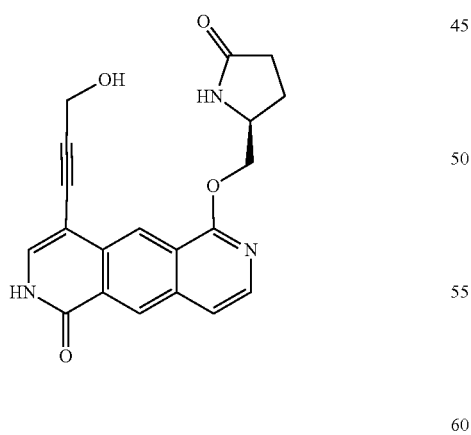

(S)-4-(3-Hydroxyprop-1-yn-1-yl)-6-((5-oxopyrrolidin-2-yl)methoxy)pyrido[3,4-g]isoquinolin-1(2H)-one (I-21)

¹HNMR (400 MHz, DMSO-d$_6$) δ (ppm) 11.59 (s, 1H), 8.85 (s, 1H), 8.66 (s, 1H), 8.04 (d, J=6.0 Hz, 1H), 8.02 (s, 1H), 7.67 (d, J=6.0 Hz, 1H), 7.52 (s, 1H), 5.56 (t, J=6.0 Hz, 1H), 4.57-4.39 (m, 4H), 4.16-4.06 (m, 1H), 2.40-2.20 (m, 3H), 2.12-2.03 (m, 1H); MS (ESI, m/z) 346.3 [M−H$_2$O+H]$^+$.

tert-Butyl (S)-(3-(1-oxo-6-((5-oxopyrrolidin-2-yl)methoxy)-1,2-dihydropyrido[3,4-g] isoquinolin-4-yl)prop-2-yn-1-yl)carbamate (I-42)

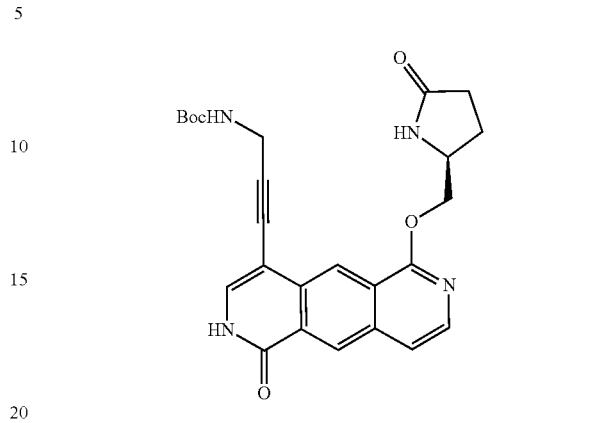

MS (ESI, m/z) 363.3 [M+H-CO$_2$C$_4$H$_9$]$^+$.

(S)-6-((5-Oxopyrrolidin-2-yl)methoxy)-4-((triisopropylsilyl)ethynyl)pyrido[3,4-g]isoquinolin-1(2H)-one (I-43)

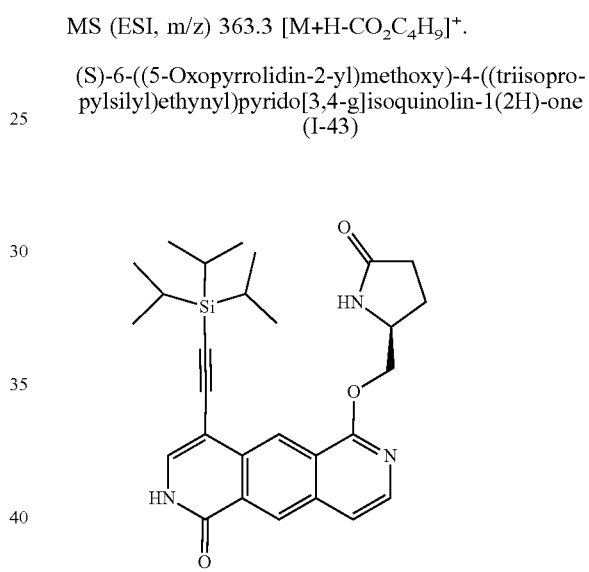

MS (ESI, m/z) 490.4 [M+H]$^+$.

Example 21

(S)-4-Ethynyl-6-((5-oxopyrrolidin-2-yl)methoxy)pyrido[3,4-g]isoquinolin-1(2H)-one (I-18)

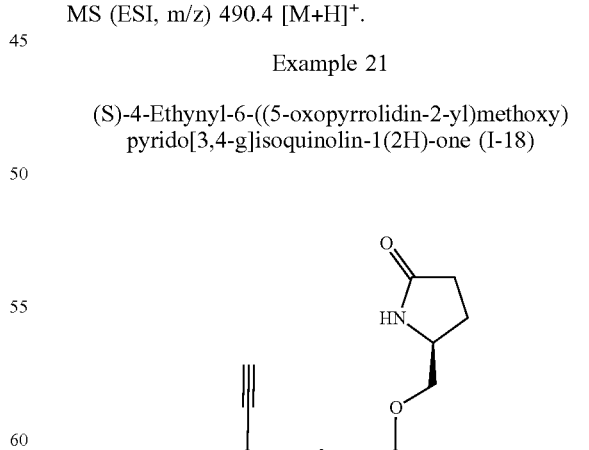

To a solution of (S)-6-((5-oxopyrrolidin-2-yl)methoxy)-4-((triisopropylsilyl)ethynyl) pyrido[3,4-g]isoquinolin-1(2H)-one (42 mg, 0.086 mmol) in THF (1 mL) was added acetic acid (5.2 mg, 5 uL, 0.086 mmol) followed by tetra-n-butylammonium fluoride solution (1.0M in THF, 0.26 mL, 0.26 mmol). The resulting solution was stirred at room temperature for 20 hours. Reaction solution was diluted with ethyl acetate (100 mL), washed with water, brine, dried over anhydrous magnesium sulfate, filtered, and concentrated under the reduced pressure. Crude product obtained was purified by silica gel chromatography (0 to 5% methanol in dichloromethane gradient) to afford (S)-4-ethynyl-6-((5-oxopyrrolidin-2-yl)methoxy)pyrido[3,4-g]isoquinolin-1(2H)-one (14.7 mg, 51%) as a pale yellow solid. $^1$HNMR (400 MHz, DMSO-d$_6$) δ (ppm) 11.64 (d, J=6.0 Hz, 1H), 8.83 (s, 1H), 8.69 (s, 1H), 8.03 (d, J=5.9 Hz, 1H), 7.94 (s, 1H), 7.65 (d, J=5.9 Hz, 1H), 7.60 (d, J=6.0 Hz, 1H), 4.57-4.45 (m, 2H), 4.42 (s, 1H), 4.10-4.03 (m, 1H), 2.49-2.40 (m, 1H), 2.34-2.16 (m, 2H), 2.08-2.00 (m, 1H); MS (ESI, m/z) 334.3 [M+H]$^+$.

Example 22

(S)-4-(3-Aminoprop-1-yn-1-yl)-6-((5-oxopyrrolidin-2-yl)methoxy)pyrido[3,4-g]isoquinolin-1(2H)-one
(I-29)

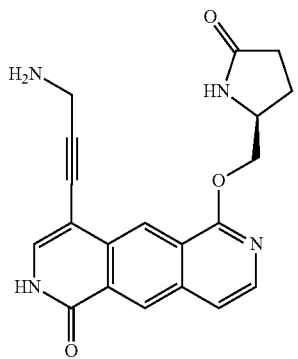 [SMILES: NCC#Cc1c[nH]c(=O)c2cc3ccnc(OC[C@@H]4CCC(=O)N4)c3cc12]

To a solution of tert-butyl (S)-(3-(1-oxo-6-((5-oxopyrrolidin-2-yl)methoxy)-1,2-dihydropyrido[3,4-g]isoquinolin-4-yl)prop-2-yn-1-yl)carbamate (3.2 mg, 0.007 mmol) in anhydrous dichloro-methane (1 mL) was added trifluoroacetic acid (0.1 mL). The reaction solution was stirred at room temperature for 30 minutes. 1,2-Dichloroethane (3 mL) was added, and all solvents were removed under the reduced pressure. Residue obtained was purified by reverse HPLC (5 to 28% acetonitrile in water with 0.1% formic acid gradient). Desired fractions were combined, and aqueous hydrogen chloride solution (1N, 0.13 mL) was added. The solution was lyophilized to afford hydrogen chloride salt (2 equivalents) of (S)-4-(3-aminoprop-1-yn-1-yl)-6-((5-oxopyrrolidin-2-yl)methoxy)pyrido [3,4-g]isoquinolin-1(2H)-one (2 mg, 72%) as a pale yellow solid. $^1$HNMR (400 MHz, DMSO-d$_6$) δ (ppm) 11.71 (d, J=6.1 Hz, 1H), 8.85 (s, 1H), 8.56 (s, 1H), 8.49 (s, 3H), 8.20 (s, 1H), 8.03 (d, J=5.9 Hz, 1H), 7.66 (d, J=5.9 Hz, 1H), 7.56 (d, J=6.1 Hz, 1H), 4.58 (dd, J=11.3, 2.9 Hz, 1H), 4.35 (dd, J=11.3, 2.9 Hz, 1H), 4.23-4.06 (m, 3H), 2.65-2.52 (m, 1H), 2.43-2.22 (m, 2H), 2.03 (t, J=10.9 Hz, 1H); MS (ESI, m/z) 363.2 [M+H]$^+$.

Example 23

(S)-1-Oxo-6-((5-oxopyrrolidin-2-yl)methoxy)-1,2-dihydropyrido[3,4-g]isoquinoline-4-carbonitrile
(I-16)

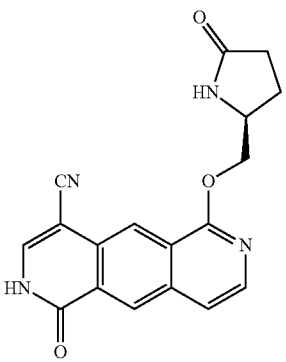

To a solution of (S)-4-iodo-6-((5-oxopyrrolidin-2-yl)methoxy)pyrido[3,4-g]isoquinolin-1(2H)-one intermediate II (30.1 mg, 0.069 mmol) in anhydrous dimethyl sulfoxide (1 mL) was added copper(I) cyanide (18.6 mg, 0.208 mmol). The reaction solution was purged with nitrogen for 1 minute and heated at 120° C. under nitrogen for 14 hours. Reaction solution was diluted with 2-methyl tetrahydrofuran (40 mL). Water (10 mL) was added followed by drops of 30% ammonium hydroxide and drops of hydrogen chloride aqueous (6N) until pH was around 7. Organic layer was separated, aqueous layer was extracted with 2-methyl tetrahydrofuran (2×40 mL). Combined organic layer was dried over anhydrous magnesium sulfate, filtered, and concentrated under the reduced pressure. Crude product obtained was purified by silica gel chromatography (0 to 8% methanol in dichloromethane gradient) to afford (S)-1-oxo-6-((5-oxopyrrolidin-2-yl)methoxy)-1,2-dihydropyrido[3,4-g] isoquinoline-4-carbonitrile (19 mg, 82%) as a pale yellow solid. $^1$HNMR (400 MHz, DMSO-d$_6$) δ (ppm) 12.20 (s, 1H), 8.85 (s, 1H), 8.48 (s, 1H), 8.22 (s, 1H), 8.11-8.02 (m, 2H), 7.67 (d, J=5.7 Hz, 1H), 4.54 (dd, J=10.9, 4.4 Hz, 1H), 4.45 (dd, J=10.9, 5.8 Hz, 1H), 4.15-4.05 (m, 1H), 2.42-2.15 (m, 3H), 2.05-1.94 (m, 1H); MS (ESI, m/z) 335.3 [M+H]$^+$.

Example 24

(S)-1-Oxo-6-((5-oxopyrrolidin-2-yl)methoxy)-1,2-dihydropyrido[3,4-g]isoquinoline-4-carboxamide (I-27)

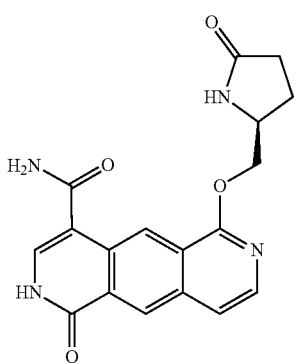 [SMILES: NC(=O)c1c[nH]c(=O)c2cc3ccnc(OC[C@@H]4CCC(=O)N4)c3cc12]

(S)-1-Oxo-6-((5-oxopyrrolidin-2-yl)methoxy)-1,2-dihydropyrido[3,4-g]isoquinoline-4-carbonitrile (10 mg, 0.0299 mmol) in concentrated sulfuric acid (1 mL) was heated at 90° C. for 90 minutes. The reaction solution was cooled to 0° C. and potassium hydroxide aqueous solution (5N) was added slowly until pH was about 6. Cloudy solution was filtered and washed with water. Solid obtained was dissolved in methanol and filtered. Filtrate was concentrated. Residue obtained was titrated with ethyl acetate and dried to afford (S)-1-oxo-6-((5-oxopyrrolidin-2-yl)methoxy)-1,2-dihydropyrido[3,4-g]isoquinoline-4-carboxamide (6.8 mg, 65%) as a pale yellow solid. $^1$HNMR (400 MHz, DMSO-$d_6$) δ (ppm) 11.62 (s, 1H), 9.36 (s, 1H), 8.83 (s, 1H), 8.01 (d, J=5.9 Hz, 1H), 7.84 (s, 2H), 7.68-7.54 (m, 2H), 7.33 (s, 1H), 4.57-4.38 (m, 2H), 4.06 (dd, J=8.0, 4.5 Hz, 1H), 2.36-2.09 (m, 2H), 2.09-1.97 (m, 1H); MS (ESI, m/z) 353.3 [M+H]$^+$.

Example 25

(S)-6-((5-Oxopyrrolidin-2-yl)methoxy)-4-(2,2,2-trifluoroethyl)pyrido[3,4-g]isoquinolin-1(2H)-one (I-19)

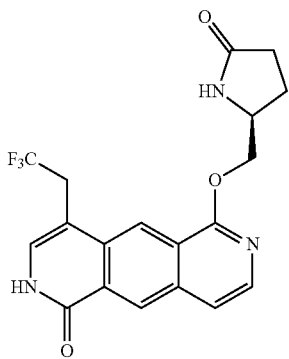 [SMILES: O=C1CC[C@@H](COc2nccc3cc4c(=O)[nH]cc(CC(F)(F)F)c4cc23)N1]

(S)-4-iodo-6-((5-oxopyrrolidin-2-yl)methoxy)pyrido[3,4-g]isoquinolin-1(2H)-one intermediate II (14.9 mg, 0.036 mmol), nickel(II) diiodide (1.1 mg, 0.0036 mmol), 4,4'-di-tert-butyl-2,2'-bipyridine (dtbpy) (0.8 mg, 0.0036 mmol) and 1,1'-bis(diphenylphosphino) ferrocene (dppf) (2 mg, 0.0036 mmol) in anhydrous N,N-dimethylacetamide (0.5 mL) was purged with nitrogen for 1 minute, then manganese (0) (6.9 mg, 0.126 mmol) and 1,1,1-trifluoro-2-iodoethane (22.7 mg, 11 µL, 0.108 mmol) were added. The resulting solution was purged with nitrogen for additional 1 minute and heated at 80° C. under nitrogen for 24 hours. Reaction solution was cooled to room temperature and diluted with ethyl acetate (100 mL). Organic layer was separated, washed with water, brine, dried over anhydrous magnesium sulfate, filtered, and concentrated under the reduced pressure. Crude product obtained was first purified by reverse HPLC (5 to 39% acetonitrile in water with 0.1% formic acid gradient). Desired fractions were combined to provide desired product, which was not pure enough and further purified by silica gel chromatography (0 to 10% methanol in dichloromethane gradient) to afford (S)-6-((5-oxopyrrolidin-2-yl)methoxy)-4-(2,2,2-trifluoroethyl)pyrido[3,4-g]isoquinolin-1(2H)-one (1.3 mg, 9%) as a pale yellow solid. $^1$HNMR (400 MHz, DMSO-$d_6$) δ (ppm) 11.46 (d, J=5.8 Hz, 1H), 8.86 (s, 1H), 8.57 (s, 1H), 8.07 (s, 1H), 8.02 (d, J=6.0 Hz, 1H), 7.64 (d, J=6.0 Hz, 1H), 7.32 (d, J=5.8 Hz, 1H), 4.53 (dd, J=10.9, 3.9 Hz, 1H), 4.37 (dd, J=10.9, 6.2 Hz, 1H), 4.11-3.94 (m, 2H), 3.94-3.78 (m, 1H), 2.42-2.10 (m, 3H), 2.02-1.95 (m, 1H); MS (ESI, m/z) 392.4 [M+H]$^+$.

Example 26

(S)-6-((5-Oxopyrrolidin-2-yl)methoxy)-4-(trifluoromethyl)pyrido[3,4-g]isoquinolin-1(2H)-one (I-30)

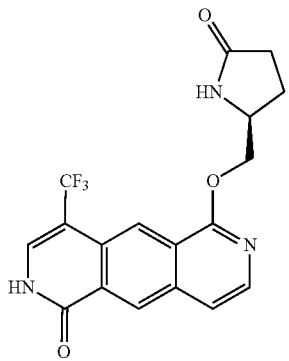 [SMILES: O=C1CC[C@@H](COc2nccc3cc4c(=O)[nH]cc(C(F)(F)F)c4cc23)N1]

The solution of (S)-4-iodo-6-((5-oxopyrrolidin-2-yl)methoxy)pyrido[3,4-g]isoquinolin-1(2H)-one intermediate II (15.8 mg, 0.038 mmol) and (1,10-Phenanthroline) (trifluoromethyl)copper(I) (20.0 mg, 0.064 mmol) in anhydrous N,N-dimethylformamide (1 mL) was purged with nitrogen for 1 minute, then heated at 110° C. under nitrogen for 24 hours. Reaction solution was cooled to room temperature, diluted with ethyl acetate (100 mL), washed with water, brine, brine, dried over anhydrous magnesium sulfate, filtered, and concentrated under the reduced pressure. Crude product was purified by reverse HPLC (5 to 39% acetonitrile in water with 0.1% formic acid gradient). Desired fractions were combined and diluted with ethyl acetate. The solution was washed with a little diluted sodium bicarbonate solution until pH was around 6, brine, dried over anhydrous magnesium sulfate, filtered, and concentrated under the reduced pressure to afford (S)-6-((5-oxopyrrolidin-2-yl)methoxy)-4-(trifluoromethyl)pyrido[3,4-g]isoquinolin-1(2H)-one (4.1 mg, 29%) as a pale yellow solid. $^1$HNMR (400 MHz, DMSO-$d_6$) δ (ppm) 11.90 (d, J=5.8 Hz, 1H), 8.94 (s, 1H), 8.53 (s, 1H), 8.08 (d, J=5.9 Hz, 1H), 7.91 (s, 1H), 7.79 (d, J=5.9 Hz, 1H), 7.69 (d, J=5.8 Hz, 1H), 4.50 (d, J=3.5 Hz, 2H), 4.27-4.10 (m, 1H), 2.42-2.11 (m, 3H), 2.07-1.98 (m, 1H); MS (ESI, m/z) 378.3 [M+H]$^+$.

Example 27

6-(((2S,3S,4S)-3-Ethyl-4-fluoro-5-oxopyrrolidin-2-yl)methoxy)-4-iodopyrido[3,4-g]isoquinolin-1(2H)-one (I-44)

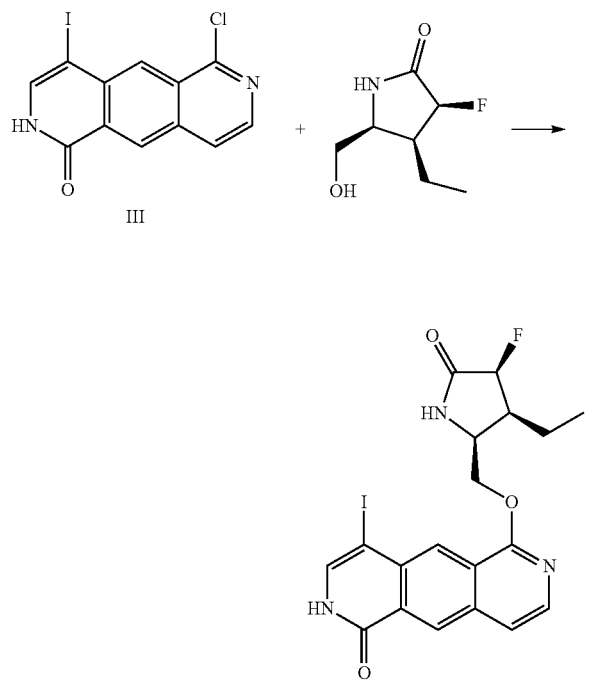

To a solution of 6-chloro-4-iodopyrido[3,4-g]isoquinolin-1(2H)-one intermediate III (71 mg, 0.2 mmol) and (3S,4S,5S)-4-ethyl-3-fluoro-5-(hydroxymethyl)pyrrolidin-2-one (81 mg, 0.5 mmol) in anhydrous N,N-dimethylformamide (2 mL), cooled to −10 to 0° C., was added potassium bis(trimethylsilyl)amide solution in tetrahydrofuran (1.0M, 1.2 mL, 1.2 mmol). The resulting solution was stirred at this temperature for 1 hour and quenched with sodium dihydrogen phosphate aqueous solution (10%, 20 mL). The solution was extracted with ethyl acetate (3×40 mL). Combined organic layer was washed with brine (10 mL), dried over anhydrous magnesium sulfate, filtered, and concentrated under the reduced pressure. Crude product obtained was purified by silica gel chromatography (0 to 3% methanol in dichloromethane gradient) to afford 6-(((2S,3S,4S)-3-ethyl-4-fluoro-5-oxopyrrolidin-2-yl)methoxy)-4-iodopyrido[3,4-g] isoquinolin-1(2H)-one (48 mg, 50%) as a pale yellow solid. $^1$HNMR (400 MHz, DMSO-$d_6$) δ (ppm) 11.52 (d, J=6.1 Hz, 1H), 8.83 (s, 1H), 8.81 (s, 1H), 8.54 (s, 1H), 8.06 (d, J=5.9 Hz, 1H), 7.68 (d, J=5.9 Hz, 1H), 7.64 (d, J=6.1 Hz, 1H), 4.88 (dd, J=5.6, 53.6 Hz, 1H), 4.58 (q, J=5.7 Hz, 2H), 4.18-4.08 (m, 1H), 2.70-2.53 (m, 1H), 1.71 (p, J=7.3 Hz, 2H), 1.06 (t, J=7.3 Hz, 3H); MS (ESI, m/z) 482.2 [M+H]$^+$.

Example 28

6-(((2S,3S,4S)-3-Ethyl-4-fluoro-5-oxopyrrolidin-2-yl)methoxy)-4-methylpyrido[3,4-g]isoquinolin-1(2H)-one (I-45) and 6-(((2S,3S,4S)-3-ethyl-4-fluoro-5-oxopyrrolidin-2-yl)methoxy)pyrido[3,4-g]isoquinolin-1(2H)-one (I-46)

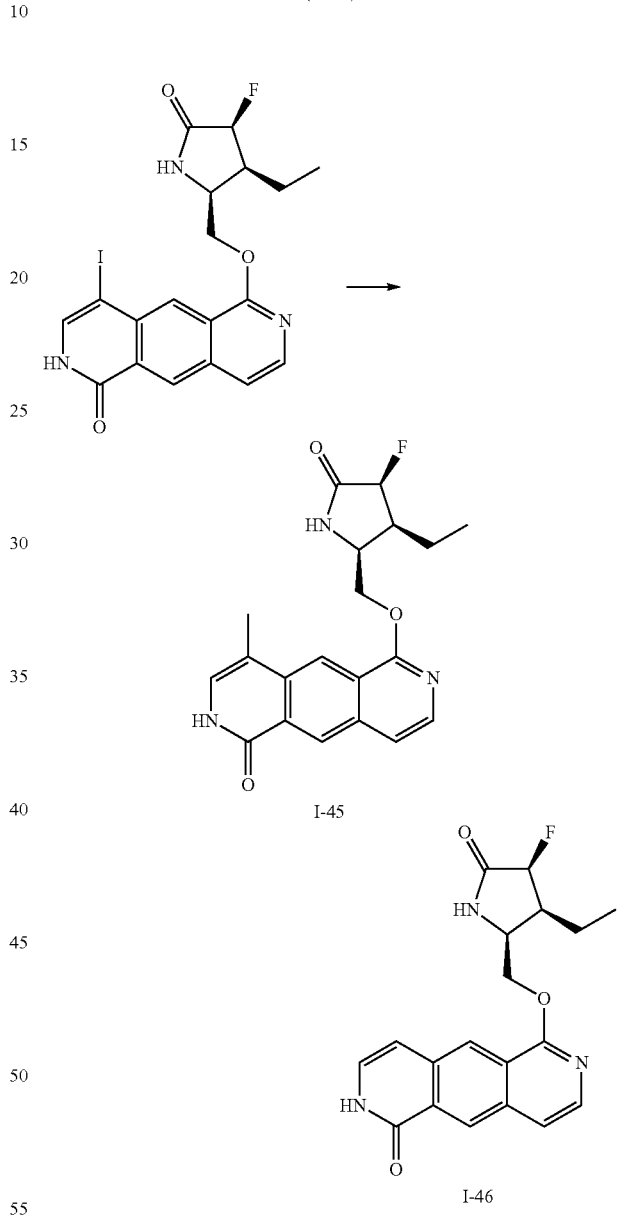

To a solution of 6-(((2S,3S,4S)-3-ethyl-4-fluoro-5-oxopyrrolidin-2-yl)methoxy)-4-iodo pyrido[3,4-g] isoquinolin-1 (2H)-one (47.4 mg, 0.099 mmol) in anhydrous N,N-dimethylformamide (2 mL) were added tetramethyltin (177.0 mg, 0.990 mmol), bis(triphenylphosphine)palladium chloride (13.9 mg, 0.0198 mmol) and lithium chloride (84 mg, 1.98 mmol). The resulting solution was purged with nitrogen for 1 minute and heated at 100° C. under nitrogen for 16 hours. The reaction solution was cooled to room temperature and diluted with ethyl acetate (120 mL). The solution was washed with 10% potassium fluoride aqueous solution, brine, dried over anhydrous magnesium sulfate, filtered, and concentrated under the reduced pressure. Crude product obtained was first purified by silica gel chromatography (0 to 4% methanol in dichloromethane gradient) to afford the mixture of two products (30 mg) which was further purified by HPLC (methanol as a mobile phase) to afford 6-(((2S, 3S,4S)-3-ethyl-4-fluoro-5-oxopyrrolidin-2-yl)methoxy)-4-methylpyrido[3,4-g]isoquinolin-1(2H)-one (I-45) (12.0 mg, 33%) as a pale yellow solid. $^1$HNMR (400 MHz, DMSO-d$_6$) δ (ppm) 11.12 (d, J=5.6 Hz, 1H), 8.85 (s, 1H), 8.82 (s, 1H), 8.55 (s, 1H), 8.00 (d, J=5.9 Hz, 1H), 7.62 (d, J=5.9 Hz, 1H), 7.03 (d, J=5.6 Hz, 1H), 4.91 (dd, J=5.6, 53.6 Hz, 1H), 4.58 (dd, J=11.4, 3.7 Hz, 1H), 4.37 (dd, J=11.4, 5.8 Hz, 1H), 4.16-4.10 (m, 1H), 2.72-2.54 (m, 1H), 2.32 (d, J=0.9 Hz, 3H), 1.64 (dp, J=13.5, 7.2 Hz, 2H), 1.03 (t, J=7.2 Hz, 3H); MS (ESI, m/z) 370.4 [M+H]$^+$.

6-(((2S,3S,4S)-3-ethyl-4-fluoro-5-oxopyrrolidin-2-yl)methoxy)pyrido[3,4-g]isoquinolin-1(2H)-one (I-46) (10 mg, 28%) as a pale yellow solid. $^1$HNMR (400 MHz, DMSO-d$_6$) δ (ppm) 11.27 (d, J=5.9 Hz, 1H), 8.96 (s, 1H), 8.78 (s, 1H), 8.68 (s, 1H), 7.98 (d, J=6.0 Hz, 1H), 7.61 (d, J=6.0 Hz, 1H), 7.20 (dd, J=7.3, 5.9 Hz, 1H), 6.65 (d, J=7.3 Hz, 1H), 4.89 (dd, J=5.6, 53.6 Hz, 1H), 4.66 (dd, J=10.6, 3.7 Hz, 1H), 4.26-4.17 (m, 1H), 4.17-4.07 (m, 1H), 2.72-2.52 (m, 1H), 1.61 (q, J=7.5 Hz, 2H), 1.03 (t, J=7.5 Hz, 3H); MS (ESI, m/z) 356.3 [M+H]$^+$.

Example 29

6-(((2S,3S,4S)-3-ethyl-4-fluoro-5-oxopyrrolidin-2-yl)methoxy)-1-oxo-1,2-dihydro pyrido[3,4-g]isoquinoline-4-carbonitrile (I-47)

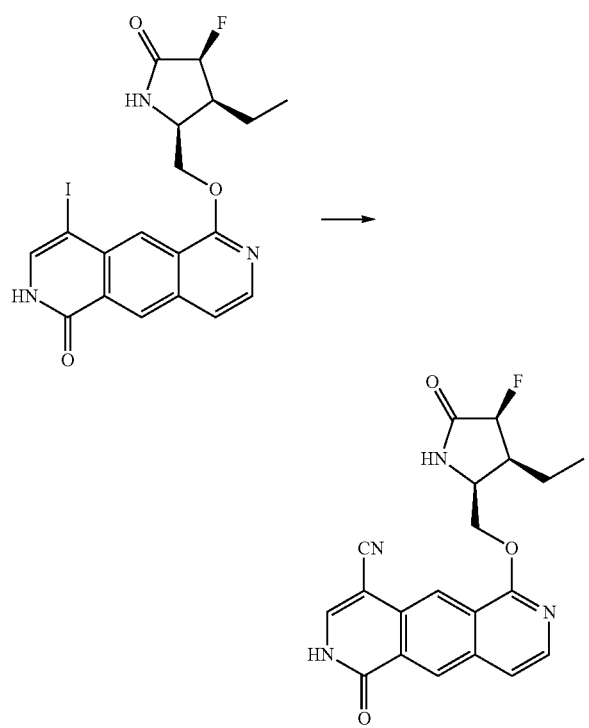

To a solution of 6-(((2S,3S,4S)-3-ethyl-4-fluoro-5-oxopyrrolidin-2-yl)methoxy)-4-iodo pyrido[3,4-g] isoquinolin-1(2H)-one (10 mg, 0.021 mmol) in anhydrous dimethyl sulfoxide 0.6 mL) was added copper(I) cyanide (6 mg, 0.062 mmol). The resulting solution was purged with nitrogen for 1 minute and heated at 120° C. under nitrogen for 16 hours. Reaction was cooled to room temperature and diluted with ethyl acetate (100 mL). The solution was washed with water, brine, dried over anhydrous magnesium sulfate, filtered, and concentrated under the reduced pressure. Crude product obtained was purified by silica gel chromatography (0 to 5% methanol in dichloromethane gradient) to afford 6-(((2S,3S, 4S)-3-ethyl-4-fluoro-5-oxopyrrolidin-2-yl)methoxy)-1-oxo-1,2-dihydro pyrido[3,4-g]isoquinoline-4-carbonitrile (8 mg, 97%) as a pale yellow solid. $^1$HNMR (400 MHz, DMSO-d$_6$) δ (ppm) 12.18 (s, 1H), 8.92 (s, 1H), 8.89 (s, 1H), 8.61 (s, 1H), 8.23 (s, 1H), 8.08 (d, J=5.8 Hz, 1H), 7.70 (d, J=5.8 Hz, 1H), 4.87 (dd, J=5.6, 53.6 Hz, 1H), 4.64 (dd, J=11.0, 4.8 Hz, 1H), 4.48 (dd, J=11.0, 7.1 Hz, 1H), 4.16-4.10 (m, 1H), 2.68-2.55 (m, 1H), 1.74-1.59 (m, 2H), 1.05 (t, J=7.3 Hz, 3H); MS (ESI, m/z) 381.4 [M+H]$^+$.

Example 30

LPS Induced IL23p19 in THP-1 Cells (with IFNγ Primed) Assay

Materials and Equipment

THP-1 Cells (ATCC, Cat #TIB-202), Dimethyl Sulfoxide (DMSO) (Sigma-Aldrich, Cat #D2650), RPMI 1640 (Cellgro, Cat #10-040-CM), Fetal Bovine Serum (Sigma, Cat #F4135), Albumin From Bovine Serum (BSA) (Sigma-Aldrich, Cat #A7906), LPS (Serotype K-235, Sigma, Product Number L 2143), IFNγ (Peprotech, Cat #300-02), Capture antibody: Human IL-23p19 ELISA (e-Bioscience, Cat. #14-7238-85), Detection antibody: Primary Mouse Biotinylated anti-human IL-12(p40/p70) (e-Bioscience, Cat. #13-7129-85), Secondary HRP-conjugated Streptavidin (R&D Systems, Cat #DY998), 1×PBST Washing Buffer (PBS-Tween tablet) (VWR International, Cat #80058-558), ELISA Blocking Buffer (PBS with 1% BSA), ELISA Dilution Buffer (PBS with 1% BSA), 384 Well Flat-Bottom, MaxiSorp Black Immuno Plates (Thermo Scientific, Cat #12-565-346), 384 Well Flat-Bottom, White Tissue Culture Plates (Thermo Scientific, Cat #12-565-343), Super Signal ELISA Pico Chemiluminescent Substrate (Thermo Scientific, Cat #37070), Cell Titer Glo reagent (Promega, Cat #G7573), Positive control, IKK2VI inhibitor (Calbiochem, Cat #401483), AquaMax 4000 plate washer (Molecular Devices), Luminometer, Wallac Victor2 1420 Multilabel Counter.

Method

THP-1 Cells Stimulation:

On day 1, 50K/well THP-1 cells were seeded and primed with IFNγ (50 ng/mL) in 384-well plates for about 18 hours in RPMI media with 10% FBS. On day 2, the compound was serially diluted in DMSO from 5 mM in 3-fold dilutions, and then diluted 1:125 in RPMI media with 10% FBS. 50 μL/well 2× compound was added to 50 μL/well THP-1 cells (with IFNγ primed) in duplicate in 384 well tissue culture plates. The cells were pre-incubated with compound for 1 hour at 37° C., 5% CO$_2$ before addition of 10 μL/well 11×LPS to give a final concentration of 1 μg/mL LPS. Day 3, after stimulation for 18 hours at 37° C., 5% CO$_2$, the assay plate was centrifuged and 70 μL/well supernatant was harvested. IL-23p19 protein in 70 μL/well of supernatant was measured by sandwich ELISA, and 25 μl/well Cell Titer Glo reagent was added to the remaining cells to measure compound toxicity.

Human IL-23p19 Sandwich ELISA:

Maxisorp immuno ELISA plates were pre-coated with 25 µL/well of anti-IL-23p19 capture antibody (2.5 ug/mL) in PBS overnight at room temperature. After washing with 1×PBST, the plates were blocked using 100 µL/well of 1% BSA in PBS for 2 hours at room temperature. The plates were washed three times with 1×PBST and 70 µL/well supernatant were added. The plates were incubated at room temperature for 2 hours with shaking and washed three times with 1×PBST. 25 µL/well of biotin labeled anti-IL-12(p40/p70) detection antibody (100 ng/mL) in PBS with 1% BSA was added and the plates were incubated at room temperature for 2 hours with shaking. After washing three times with 1×PBST, 25 µL/well of streptavidin-HRP (1:200) in PBS with 1% BSA was added and the plates were incubated at room temperature for 20 minutes with shaking. The plates were washed three times with 1×PBST and 25 µL/well of Super Signal ELISA Pico Chemiluminescent Substrate were added. The plates were read with a luminometer, and the chemiluminescence values were entered into Athena (Rigel) for curve fitting, $EC_{50}$ calculation, and database storage. The results are shown in Table 1.

Example 31

Compound Screening Using DC Cells

Materials
  Human PBMC cells (All Cells, Cat No. PB002)
  RPMI growth media containing 10% FBS
  IFNγ (Peprotech, Cat No. 300-02)
  GMCSF (Peprotech, Cat No. 300-03) and IL4 (Peprotech Cat No. 200-04)
  White clear bottom 96 well plates (Fisher, Cat No. 07-200-587, Corning #3903)
  LPS (Make 2.5 mg/ml Stock in PBS) from Sigma Aldrich (Cat No. L2018-5MG)
  Cell Titer Glo reagent (Promega, Cat No. G7573)
  Positive controls, IKK2VI inhibitor (Calbiochem, Cat No. 401483)
Protocol
1. Differentiation of PBMC's to DC Cells:

Human PBMC cells (400 million) obtained from the vendor were transferred into a T-175 flask containing 15 ml RPMI media (10% FBS) and incubate for 2 hours at 37° C. After 2 hours, the media including floating cells was aspirated out carefully and 12 ml of fresh RPMI media (10% FBS) containing GMCSF (100 ng/ml) and IL4 (20 ng/ml) was added, and the flask was kept in a 37° C. incubator for 7 days.

After 3 days, fresh GMCSF (100 ng/ml) and IL4 (20 ng/ml) were added to the flask and the incubation continued. After 7 days, the fully differentiated cells were harvested by spinning down (1200 rpm/5 min) and aspirating the media. The cells were suspended in fresh RPMI media (10% FBS) containing 50 ng/ml IFNγ (1000 U/ml) and then plated (50K/well in 100 µl) onto a white clear bottom 96 well plate and left in a 37° C. incubator for 24 hours.
2. Addition of Compounds:

After 24 hours incubation, 100 µl of RPMI media was added containing 2× concentrated test compound per well to the above cell-culture media (final concentration becomes 1×) and the plates were pre-incubated for 1 hour at 37° C. before stimulating with LPS.

After 1 hour compound pre-incubation, 10 µl per well of 20× concentrated LPS solution in RPMI media was added to give a final concentration of 1 µg/ml. The mixture was shaken and incubated the plates at 37° C. for an additional 18 hours.

155 µl of the supernatant was harvested from each well carefully (without the tip touching the bottom of the well) and to the remaining 50 µl/well of the cell culture plate was added 50 µl of Cell Titer Glo reagent. The mixture was incubated for 1-2 minutes on a shaker and the plate was read for luminescence intensity to determine the compound cytotoxicity. The cell culture supernatant collected above was used to carry out IL23 ELISA (65 µl—Supernatant) and IL10 ELISA (90 µl—Supernatant) as described below.

Example 32

Human IL-23 (p19/p40) ELISA Protocol
(e-Biosciences)

Materials:
  96-well high binding opaque white plates (from Pierce, Cat No. 15042);
  1×PBS; 1×TBST washing buffer;
  Blocking Solution: 0.5% Casein in PBS (from BDH, Cat No. 440203H);
  Dilution Solution: 1% BSA in PBS (10% BSA from Fisher, Cat No. 37525);
  Capture antibody: Rat anti-human IL-23 (p19) (e-Biosciences, Cat. No. 14-7238-85);
  Detection antibody: Primary Mouse Biotinylated anti-human IL-12 (p40/p70) (e-biosciences, Cat No. 13-7129-85);
  Secondary HRP-conjugated Streptavidin (R&D Systems, Cat No. DY998);
  rHuman-IL-23 (e-biosciences, Cat No. 34-8239) (Suggested starting concentration=5 ng/ml in RPMI cell culture media);
  Cell Culture Supernatant (65 µl from THP-1 cells primed with IFNγ (50 ng/ml-1000 U/ml) and stimulated with 0.01% SAC);
  SuperSignal ELISA Pico Chemiluminescent substrate [Pierce, Cat No. 37069].
Coating Plates:
  To 10.5 ml PBS add 50 µl of anti-IL23 (p19) was added capture antibody (2.5 µg/ml).

The mixture was mixed well and 100 µl of the coating solution was added to each well of the 96 well white plates from Pierce. The wells were covered and incubated overnight at 4° C.
Blocking the Plates:
  The anti-IL23 (p19)-antibody-coated plates were washed 2× using TBST (use plate washer) and blocked using 200 µl of 0.5% Casein for 1.5-2 hours at room temperature with shaking.
Addition of Supernatant and Detection:
  The plates were washed 2× using TBST and the supernatant was transferred (65 µl/well) to the above pre-blocked/IL23(p19)-antibody-coated 96 well plate, and incubated at room temperature for 1.5 hours with shaking.

The plates were washed 4× using TBST (plate washer) and 100 µl/well detection antibody solution prepared from 2 µl of biotin labeled anti-IL-12 (p40/p70) antibody in 11 ml 1% BSA/PBS solution (1-5000 dilution) was added. The plates were incubated for 1 hour with shaking at room temperature.

Again, the plates were washed 4× with TBST and 100 µl of HRP labeled Streptavidin (R&D Systems) solution (10

µl/10 ml 1% BSA solution) was added, and the plates were incubated at room temperature for another 45 minutes with shaking.

After 45 minutes, the plates were washed with TBST 4× and 100 ul/well Super Signal ELISA Pico Chemiluminescent Substrate from Pierce (3.5 ml A+3.5 ml B+3.5 ml MQ water) was added. The plates were shaken for 1-2 minutes then read on a plate reader.

Example 33

IRAK4 ADP-Glo Assay

Materials
IRAK4 Kinase Enzyme (Signalchem, I12-10G-20); 0.1M DTT (Signalchem, D86-09B); MBP Substrate (Signalchem, M42-51N); ADP Glo (Promega, V9101); 1M $MgCl_2$ (Teknova, M03304); 1M Tris-HCl pH7.4 (Teknova, T1074); BSA (Sigma (A3059); Distilled $H_2O$
Equipment
Wallac Victor2 1420 Multilabel Counter
Method The ADP-Glo™ reagents were thawed at ambient temperature. The Kinase Detection Reagent was prepared by mixing kinase detection buffer with the lyophilized kinase detection substrate, and set aside.

A stock volume of 5× Reaction Kinase Buffer was made with a final concentration of 100 mM $MgCl_2$, 200 mM Tris-HCl, and 0.5 mg/ml of BSA, in distilled $H_2O$ with a final pH7.4. A 2× working stock volume of Reaction Kinase Buffer was made containing a final concentration of 100 M DTT.

The components of IRAK4 Enzyme were thawed on ice. Diluted IRAK4 in 1× Kinase Reaction Buffer (diluted from 2× buffer) was prepared at 5.0 ng/l. A 250 M working stock ATP Assay Solution was prepared in 1× Kinase Reaction Buffer (diluted from 2× buffer).

The compound was diluted in DMSO from 250 M in 4-fold series dilutions for 8 points. Then diluted 1:5 in 2× Reaction Buffer in a 96 well plate. 1.01 was transferred to a 384 well plate in duplicate. 2 d of diluted Active IRAK4 was added (do not add to column 1) and 2× reaction buffer was added to column 1. 1 µl of 1 mg/ml stock solution of MBP substrate was added NOTE: MBP can be combined with ATP mix with equal volume and then added at 2 d/well. Final reaction volume was 5 µl.

The plate was centrifuged and the reaction mixture was incubated at room temperature for 60 minutes or at 30° C. for 30 minutes.

The reaction was terminated and the remaining ATP was depleted by adding 5 µl of ADP-Glo™ Reagent. The 384-well plate was centrifuged and then the reaction mixture was incubated for another 40 minutes at ambient temperature.

10 µl of the Kinase Detection Reagent was added. The plate was centrifuged and then the reaction mixture was incubated for another 30 minutes at ambient temperature.

The 384-well reaction plate was read using the WALLAC plate reader (Luminescence 0.1s).

Results from the assays are shown in Tables 1 and 2

TABLE 1

|  | IL23-p19 ELISA, THP1-IFNy, LPS, 10 pt | IRAK1 ADP-Glo Kinase, 8 pt |
|---|---|---|
| I-2 | ND* | 3.84 |
| I-5 | ND* | ND* |
| I-6 | ND* | ND* |
| I-7 | ND* | 4.281 |
| I-8 | ND* | 7.232 |
| I-9 | ND* | 6.863 |
| I-10 | ND* | 11.11 |
| I-11 | ND* | 6.491 |
| I-12 | ND* | 7.864 |
| I-13 | 8.467 | 6.261 |
| I-14 | 0.9559 | 4.766 |
| I-15 | 0.5012 | 8.375 |
| I-16 | ND* | 10.32 |
| I-17 | 16.06 | 10.63 |
| I-18 | ND* | 11.98 |
| I-19 | ND* | 14.78 |
| I-20 | 38.74 | ND* |
| I-21 | 0.7779 | 0.7773 |
| I-22 | 6.982 | 9.076 |
| I-23 | ND* | 5008 |
| I-24 | 0.3767 | ND* |
| I-25 | 0.0796 | ND* |
| I-26 | ND* | ND* |
| I-27 | ND* | ND* |
| I-28 | ND* | ND* |
| I-29 | 13.98 | 34.6 |
| I-30 | 2.256 | ND* |
| I-33 |  | 3.007 |
| I-36 |  | 11.28 |
| I-37 |  | 10.96 |
| I-41 |  | ND* |
| I-44 |  | 0.0277 |
| I-45 |  | 0.018 |
| I-46 |  | 1.124 |
| I-47 |  | 0.5308 |
| I-48 |  | ND* |
| I-50 |  | ND* |
| I-51 |  | 0.0774 |

*ND indicates that an accurate inhibition curve may not have been produced due to compound insolubility, artifacts in the assay, and/or other factors.

TABLE 2

|  | IRAK4 ADP-Glo Kinase, 8 pt | TNFa ELISA, Dendritic, Gardiquimod, 10 pt | TNFa ELISA, PBMC, Resiquimod (R848), 10 pt | TNFa ELISA, THP1-IFNy, LTA, 10 pt |
|---|---|---|---|---|
| I-2 | 0.0067 |  | 0.1349 | 0.2741 |
| I-5 | 0.1598 | 5.682 | 4.392 |  |
| I-6 | 0.0031 | 0.0458 | 0.0322 |  |
| I-7 | 0.0048 | 0.2151 | 0.1925 |  |
| I-8 | 0.0085 | 0.1479 | 0.1117 |  |
| I-9 | 0.0145 | 0.4192 | 0.3761 |  |
| I-10 | 0.0742 | 0.6134 | 0.3691 |  |
| I-11 | 0.0078 |  | 0.075 |  |
| I-12 | 0.0396 | 11.67 | 0.2034 |  |
| I-13 | 0.0559 |  | 0.3035 |  |
| I-14 | 0.0049 | 0.1964 | 0.1867 |  |
| I-15 | 0.0062 |  | 0.0683 |  |
| I-16 | 0.0222 |  | 1.664 |  |
| I-17 | 0.0214 | 0.6067 | 0.3599 |  |
| I-18 | 0.0144 | 0.3581 | 0.3367 |  |
| I-19 | 0.1048 | 0.1774 | 0.2082 |  |
| I-20 | 0.3035 |  | 6.969 |  |
| I-21 | 0.0058 | 1.497 | 0.4221 |  |
| I-22 | 0.0104 | 2.008 | 4.469 |  |
| I-23 | 2.397 | ND* | ND* |  |
| I-24 | 0.0557 | 0.3163 | 0.283 |  |
| I-25 | 0.0692 | 6.216 | 0.3925 |  |
| I-26 | 5.346 | ND* | 1.784 |  |
| I-27 | 0.9877 | ND* | ND* |  |
| I-28 | 0.0273 | 5003 | 5.652 |  |
| I-29 | 1.432 | 9.087 | 1.46 |  |
| I-30 | 0.212 | 18.27 | 2.019 |  |
| I-33 | 0.028 | 25.61 | ND |  |

TABLE 2-continued

| | IRAK4 ADP-Glo Kinase, 8 pt | TNFa ELISA, Dendritic, Gardiquimod, 10 pt | TNFa ELISA, PBMC, Resiquimod (R848), 10 pt | TNFa ELISA, THP1-IFNy, LTA, 10 pt |
|---|---|---|---|---|
| I-36 | 0.0627 | 63.76 | 1.028 | |
| I-37 | 1.211 | 44 | | |
| I-41 | 2.536 | ND* | | |
| I-44 | 0.0042 | 0.002 | 0.0052 | |
| I-45 | 0.0055 | 0.0034 | 0.0027 | |
| I-46 | 0.0065 | 0.2391 | 0.2954 | |
| I-47 | 0.035 | 0.0782 | 0.0788 | |
| I-48 | 13.78 | ND* | 10.11 | |
| I-49 | | | | 1.437 |
| I-50 | 2.194 | | | |
| I-51 | 0.01 | | 0.004 | |

*ND indicates that an accurate inhibition curve may not have been produced due to compound insolubility, artifacts in the assay, and/or other factors.

Alternative Assays for Assessing Compound Activity

Example 34

IRAK1 ADAPTA Assay
Materials
  Bar-coded Corning, low volume, white 384-well plate (Corning Cat. #4512)
  Test Compounds: The Test Compounds are screened in 1% DMSO (final) in the well. For 10 point titrations, 3-fold serial dilutions 10 M.
  Substrate/Kinase Mixture: The 2×IRAK1/Histone H3 (1-20) peptide mixture is prepared in 50 mM HEPES pH 7.5, 0.01% BRIJ-35, 10 mM MgCl₂, 1 mM EGTA.
  ATP Solution: All ATP Solutions are diluted to a 4× working concentration in water.
  ATP Km apparent is previously determined using a radiometric assay except when no substrate is available in which case an Adapta assay is conducted.
  Detection Mix: The Detection Mix is prepared in TR-FRET Dilution Buffer. The Detection mix consists of EDTA (30 mM), Eu-anti-ADP antibody (6 nM) and ADP tracer. The detection mix contains the EC$_{60}$ concentration of tracer for 5-150 μM ATP.
IRAK1 Method
  1. 100 nL—100× Test Compound in 100% DMSO
  2. 2.4 μL—30 mM HEPES
  3. 2.5 μL—4×ATP Solution
  4. 5 μL—2× Substrate/Kinase Mixture
  The final 10 μL Kinase Reaction consists of 3.17-42 ng IRAK1 and 100 μM Histone H3 (1-20) peptide in 32.5 mM HEPES pH 7.5, 0.005% BRIJ-35, 5 mM MgCl₂, 0.5 mM EGTA.
  5. 30-second plate shake
  6. 1-minute centrifuge at 1000×g
  7. 60-minute Kinase Reaction incubation at room temperature
  8. 5 μL—Detection Mix
  9. 30-second plate shake
  10. 1-minute centrifuge at 1000×g
  11. 60-minute Detection Mix equilibration at room temperature
  12. Read on fluorescence plate reader and analyze the data Example 35

IRAK4 Z'-Lyte Assay
Materials
  Bar-coded Corning, low volume NBS, black 384-well plate (Corning Cat. #4514)
  Test Compounds: The Test Compounds are screened in 1% DMSO (final) in the well. For 10 point titrations, 3-fold serial dilutions are conducted from 10 LM.
  Peptide/Kinase Mixture: The 2×IRAK4/Ser/Thr 07 mixture is prepared in 50 mM HEPES pH 7.5, 0.01% BRIJ-35, 10 mM MnCl₂, 1 mM EGTA, 2 mM DTT, 0.02% NaN₃.
  ATP Solution: All ATP Solutions are diluted to a 4× working concentration in Kinase Buffer (50 mM HEPES pH 7.5, 0.01% BRIJ-35, 10 mM MgCl₂, 1 mM EGTA). ATP Km apparent is previously determined using a Z'-LYTE® assay.
  Development Reagent Solution: The Development Reagent is diluted 1:45000 in Development Buffer.
General Method
  1. 100 nL—100× Test Compound in 100% DMSO
  2. 2.4 μL—Kinase buffer
  3. 5 μL—2× Peptide/Kinase Mixture
  4. 2.5 μL—4×ATP Solution
  The final 10 μL Kinase Reaction consists of 3.45-63.6 ng IRAK4 and 2 μM Ser/Thr 07 in 50 mM HEPES pH 7.5, 0.01% BRIJ-35, 5 mM MgCl₂, 5 mM MnCl₂, 1 mM EGTA, 1 mM DTT, 0.01% NaN₃.
  5. 30-second plate shake
  6. 60-minute Kinase Reaction incubation at room temperature
  7. 5 μL—Development Reagent Solution
  8. 30-second plate shake
  9. 60-minute Development Reaction incubation at room temperature
  10. Read on fluorescence plate reader and analyze the data In view of the many possible embodiments to which the principles of the disclosed technology may be applied, it should be recognized that the illustrated embodiments are only preferred examples of the technology and should not be taken as limiting the scope of the technology. Rather, the scope of the disclosure is defined by the following claims. We therefore claim as our technology all that comes within the scope and spirit of these claims.

We claim:
1. A compound according to Formula I

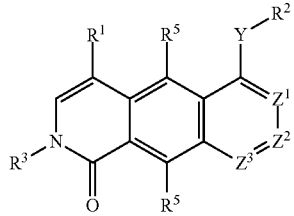

Formula I or a pharmaceutically acceptable salt or solvate thereof, wherein:
Y is $O(CH_2)_n$;
n is 1, or 2;
$Z^1$ is N;
$Z^2$ and $Z^3$ are $CR^5$;

R[1] is H, halo, cyano, —SO$_2$alkyl, N$_3$, Si(C$_{1-6}$alkyl)$_3$, heterocycloalkyl, heteroaryl, or R$^a$;

R[2] is pyrrolidi-2-one, optionally substituted with a halogen and/or C$_1$-C$_4$ alkyl;

R[3] is H or R$^a$;

each R[5] is H;

each R$^a$ is independently selected from C$_{1-6}$ alkyl, C$_{2-6}$ alkenyl, C$_{2-6}$ alkynyl, C$_{1-6}$ haloalkyl, aralkyl, or C$_{3-8}$ cycloalkyl, and may be optionally substituted with 1, 2, or 3 R$^b$;

each R$^b$ is independently selected from OH, —OR$^a$, halo, oxo, —NR$^c$R$^c$, —C(O)OR$^d$, —C(O)NR$^c$R$^c$, —N(R$^d$)C(O)OR$^a$, or —N(R$^d$)C(O)NR$^c$R$^c$;

each R$^c$ is independently selected from R$^d$ or two R$^c$, together, with the nitrogen atom to which they are attached, form a C$_{2-8}$ heterocyclyl optionally having one or two additional heteroatoms selected from O and NR$^d$ and optionally substituted with one or more of the same or different R$^a$ or R$^b$, and each R$^d$ is independently selected from hydrogen and C$_{1-6}$ alkyl.

2. The compound or a pharmaceutically acceptable salt or solvate thereof of claim 1, wherein the compound has a structure according to Formula II

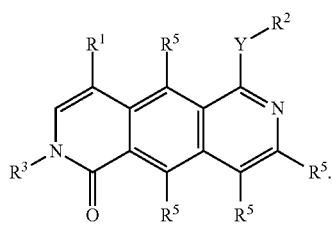

Formula II

3. The compound of claim 1, wherein:

R[1] is R$^a$;

R[3] is H;

each R[5] is H;

or a combination thereof.

4. The compound of claim 1, wherein R[1] is C$_{1-6}$alkyl optionally substituted with 1, 2 or 3 R$^b$.

5. The compound of claim 1, wherein Y is —OCH$_2$—.

6. The compound or a pharmaceutically acceptable salt or solvate thereof of claim 1, wherein the compound has a structure according to Formula III

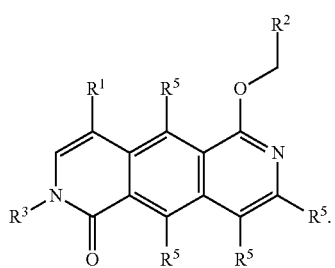

Formula III

7. The compound of claim 1, wherein:

R[2] is

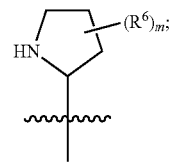

m is 0, 1, 2 or 3; and each R[6] independently is R$^a$ or R$^b$.

8. The compound of claim 1, wherein:

R[2] is

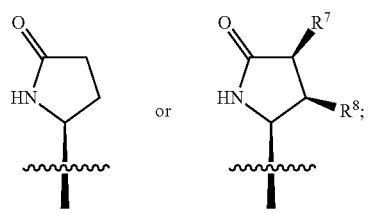

and each of R[7] and R[8] independently is halo or C$_{1-6}$alkyl.

9. The compound of claim 8, wherein the compound has a structure selected from Formulas IV-B, IV-C, or IV-D

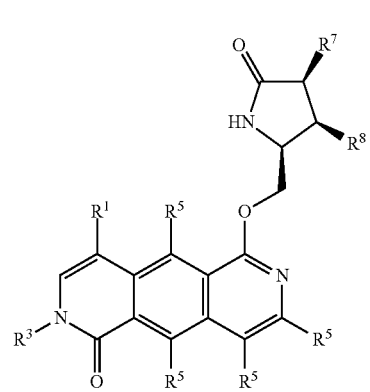

Formula IV-B

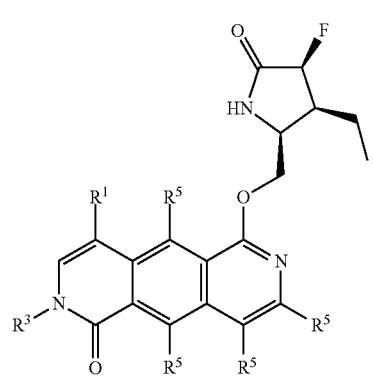

Formula IV-C

Formula IV-D

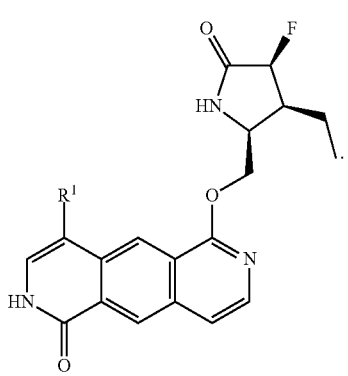

10. The compound or a pharmaceutically acceptable salt or solvate thereof of claim 1, selected from:

I-1: (S)-6-((5-oxopyrrolidin-2-yl)methoxy)-4-(thiazol-5-yl)pyrido[3,4-g]isoquinolin-1(2H)-one;
I-2: (S)-4-methyl-6-((5-oxopyrrolidin-2-yl)methoxy)pyrido[3,4-g]isoquinolin-1(2H)-one formic acid salt;
I-3: (S)-6-((5-oxopyrrolidin-2-yl)methoxy)-4-(pyridin-3-yl)pyrido[3,4-g]isoquinolin-1(2H)-one;
I-4: 4-cyclopropyl-6-(((2S,3S,4S)-3-ethyl-4-fluoro-5-oxopyrrolidin-2-yl)methoxy)pyrido[3,4-g]isoquinolin-1(2H)-one;
I-5: (S)-6-((5-oxopyrrolidin-2-yl)methoxy)pyrido[3,4-g]isoquinolin-1(2H)-one;
I-6: (S)-4-iodo-6-((5-oxopyrrolidin-2-yl)methoxy)pyrido[3,4-g]isoquinolin-1(2H)-one;
I-7: (S)-6-((5-oxopyrrolidin-2-yl)methoxy)-4-vinylpyrido[3,4-g]isoquinolin-1(2H)-one;
I-8: (S)-4-ethyl-6-((5-oxopyrrolidin-2-yl)methoxy)pyrido[3,4-g]isoquinolin-1(2H)-one;
I-9: (S)-4-allyl-6-((5-oxopyrrolidin-2-yl)methoxy)pyrido[3,4-g]isoquinolin-1(2H)-one;
I-10: (S)-6-((5-oxopyrrolidin-2-yl)methoxy)-4-propylpyrido[3,4-g]isoquinolin-1(2H)-one;
I-11: (S)-6-((5-oxopyrrolidin-2-yl)methoxy)-4-(prop-1-en-2-yl)pyrido[3,4-g]isoquinolin-1(2H)-one;
I-12: (S)-4-cyclobutyl-6-((5-oxopyrrolidin-2-yl)methoxy)pyrido[3,4-g]isoquinolin-1(2H)-one;
I-13: (S)-4-cyclopentyl-6-((5-oxopyrrolidin-2-yl)methoxy)pyrido[3,4-g]isoquinolin-1(2H)-one;
I-14: (S)-4-cyclopropyl-6-((5-oxopyrrolidin-2-yl)methoxy)pyrido[3,4-g]isoquinolin-1(2H)-one;
I-15: (S)-4-isopropyl-6-((5-oxopyrrolidin-2-yl)methoxy)pyrido[3,4-g]isoquinolin-1(2H)-one;
I-16: (S)-1-oxo-6-((5-oxopyrrolidin-2-yl)methoxy)-1,2-dihydropyrido[3,4-g]isoquinoline-4-carbonitrile;
I-17: (S)-4-(2,2-difluoroethyl)-6-((5-oxopyrrolidin-2-yl)methoxy)pyrido[3,4-g]isoquinolin-1(2H)-one;
I-18: (S)-4-ethynyl-6-((5-oxopyrrolidin-2-yl)methoxy)pyrido[3,4-g]isoquinolin-1(2H)-one;
I-19: (S)-6-((5-oxopyrrolidin-2-yl)methoxy)-4-(2,2,2-trifluoroethyl)pyrido[3,4-g]isoquinolin-1(2H)-one;
I-20: (S)-4-(2-hydroxypropan-2-yl)-6-((5-oxopyrrolidin-2-yl)methoxy)pyrido[3,4-g]isoquinolin-1(2H)-one;
I-21: (S)-4-(3-hydroxyprop-1-yn-1-yl)-6-((5-oxopyrrolidin-2-yl)methoxy)pyrido[3,4-g]isoquinolin-1(2H)-one;
I-22: (S)-4-(2-hydroxyethyl)-6-((5-oxopyrrolidin-2-yl)methoxy)pyrido[3,4-g]isoquinolin-1(2H)-one;
I-23: (S)-4-(azetidin-3-yl)-6-((5-oxopyrrolidin-2-yl)methoxy)pyrido[3,4-g]isoquinolin-1(2H)-one;
I-24: (S)-6-((5-oxopyrrolidin-2-yl)methoxy)-4-(prop-1-yn-1-yl)pyrido[3,4-g]isoquinolin-1(2H)-one;
I-25: (S)-4-methyl-6-((5-oxopyrrolidin-2-yl)methoxy)pyrido[3,4-g]isoquinolin-1(2H)-one;
I-26: (S)-4-(2-aminopropan-2-yl)-6-((5-oxopyrrolidin-2-yl)methoxy)pyrido[3,4-g]isoquinolin-1(2H)-one;
I-27: (S)-1-oxo-6-((5-oxopyrrolidin-2-yl)methoxy)-1,2-dihydropyrido[3,4-g]isoquinoline-4-carboxamide;
I-28: (S)-4-acetyl-6-((5-oxopyrrolidin-2-yl)methoxy)pyrido[3,4-g]isoquinolin-1(2H)-one;
I-29: (S)-4-(3-aminoprop-1-yn-1-yl)-6-((5-oxopyrrolidin-2-yl)methoxy)pyrido[3,4-g]isoquinolin-1(2H)-one;
I-30: (S)-6-((5-oxopyrrolidin-2-yl)methoxy)-4-(trifluoromethyl)pyrido[3,4-g]isoquinolin-1(2H)-one;
I-31: (S,Z)-4-(2-ethoxyvinyl)-6-((5-oxopyrrolidin-2-yl)methoxy)pyrido[3,4-g]isoquinolin-1(2H)-one;
I-32: (S)-4-(1-ethoxyvinyl)-6-((5-oxopyrrolidin-2-yl)methoxy)pyrido[3,4-g]isoquinolin-1(2H)-one;
I-33: (S)-6-((5-oxopyrrolidin-2-yl)methoxy)-4-(1H-pyrazol-4-yl)pyrido[3,4-g]isoquinolin-1(2H)-one;
I-34: (S)-2-(1-oxo-6-((5-oxopyrrolidin-2-yl)methoxy)-1,2-dihydropyrido[3,4-g]isoquinolin-4-yl)acetaldehyde;
I-36: 4-(1-hydroxyethyl)-6-(((S)-5-oxopyrrolidin-2-yl)methoxy)pyrido[3,4-g]isoquinolin-1(2H)-one;
I-37: 4-(2-hydroxybut-3-yn-2-yl)-6-(((S)-5-oxopyrrolidin-2-yl)methoxy)pyrido[3,4-g]isoquinolin-1(2H)-one;
I-38: tert-butyl(S)-3-(1-oxo-6-((5-oxopyrrolidin-2-yl)methoxy)-1,2-dihydropyrido[3,4-g]isoquinolin-4-yl)azetidine-1-carboxylate;
I-39: tert-butyl(S)-2-(1-oxo-6-((5-oxopyrrolidin-2-yl)methoxy)-1,2-dihydropyrido[3,4-g]isoquinolin-4-yl)acetate;
I-40: (S)-2-(1-oxo-6-((5-oxopyrrolidin-2-yl)methoxy)-1,2-dihydropyrido[3,4-g]isoquinolin-4-yl)acetic acid;
I-41: (S)-2-(1-oxo-6-((5-oxopyrrolidin-2-yl)methoxy)-1,2-dihydropyrido[3,4-g]isoquinolin-4-yl)acetamide;
I-42: tert-butyl(S)-(3-(1-oxo-6-((5-oxopyrrolidin-2-yl)methoxy)-1,2-dihydropyrido[3,4-g]isoquinolin-4-yl)prop-2-yn-1-yl)carbamate;
I-44: 6-(((2S,3S,4S)-3-ethyl-4-fluoro-5-oxopyrrolidin-2-yl)methoxy)-4-iodopyrido[3,4-g]isoquinolin-1(2H)-one;
I-45: 6-(((2S,3S,4S)-3-ethyl-4-fluoro-5-oxopyrrolidin-2-yl)methoxy)-4-methylpyrido[3,4-g]isoquinolin-1(2H)-one;
I-46: 6-(((2S,3S,4S)-3-ethyl-4-fluoro-5-oxopyrrolidin-2-yl)methoxy)pyrido[3,4-g]isoquinolin-1(2H)-one;
I-47: 6-(((2S,3S,4S)-3-ethyl-4-fluoro-5-oxopyrrolidin-2-yl)methoxy)-1-oxo-1,2-dihydropyrido[3,4-g]isoquinoline-4-carbonitrile; or
I-48: (S)-4-(methylsulfonyl)-6-((5-oxopyrrolidin-2-yl)methoxy)pyrido[3,4-g]isoquinolin-1(2H)-one;
I-49: (S)-4-(3-hydroxy-3-methylbut-1-yn-1-yl)-6-((5-oxopyrrolidin-2-yl)methoxy)pyrido[3,4-g]isoquinolin-1(2H)-one;
I-50: (S)-4-isobutyl-6-((5-oxopyrrolidin-2-yl)methoxy)pyrido[3,4-g]isoquinolin-1(2H)-one; and
I-51: 6-(((2S,3S,4S)-3-ethyl-4-fluoro-5-oxopyrrolidin-2-yl)methoxy)-4-isopropylpyrido[3,4-g]isoquinolin-1(2H)-one.

11. The compound of claim 1, wherein the compound is in the form of a pharmaceutically acceptable salt.

12. A pharmaceutical composition, comprising the compound or a pharmaceutically acceptable salt or solvate thereof of claim 1 and a pharmaceutically acceptable excipient.

13. A compound selected from:

I-35: (S)-4-(2-azidopropan-2-yl)-6-((5-oxopyrrolidin-2-yl)methoxy)pyrido[3,4-g]isoquinolin-1(2H)-one and I-43: (S)-6-((5-oxopyrrolidin-2-yl)methoxy)-4-((triisopropylsilyl)ethynyl)pyrido[3,4-g]isoquinolin-1(2H)-one.

\* \* \* \* \*